US010498511B2

United States Patent
Qin et al.

(10) Patent No.: US 10,498,511 B2
(45) Date of Patent: Dec. 3, 2019

(54) INFORMATION TRANSMISSION METHOD AND DEVICE

(71) Applicant: HUAWEI TECHNOLOGIES CO., LTD., Shenzhen, Guangdong (CN)

(72) Inventors: Yi Qin, Kista (SE); Zhongfeng Li, Munich (DE); Yi Ren, Shenzhen (CN); Yu Sun, Shanghai (CN); Shengyue Dou, Shanghai (CN); Haibao Ren, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/289,121

(22) Filed: Feb. 28, 2019

(65) Prior Publication Data
US 2019/0199496 A1 Jun. 27, 2019

Related U.S. Application Data

(63) Continuation of application No. PCT/CN2017/108398, filed on Oct. 30, 2017.

(30) Foreign Application Priority Data

Nov. 3, 2016 (CN) .......................... 2016 1 0974102
Jan. 5, 2017 (CN) .......................... 2017 1 0007820
Aug. 11, 2017 (CN) .......................... 2017 1 0686460

(51) Int. Cl.
*H04L 5/00* (2006.01)
*H04B 7/06* (2006.01)
*H04W 72/04* (2009.01)

(52) U.S. Cl.
CPC ......... *H04L 5/0048* (2013.01); *H04B 7/0617* (2013.01); *H04W 72/042* (2013.01)

(58) Field of Classification Search
CPC ... H04B 7/0617; H04L 5/0048; H04W 72/042
See application file for complete search history.

(56) References Cited

U.S. PATENT DOCUMENTS 8,331,297 B2 12/2012 Teo et al.
9,722,681 B2 * 8/2017 Ro ........................ H04B 7/0684
(Continued)

FOREIGN PATENT DOCUMENTS

| CN | 103036663 A | 4/2013 |
| CN | 103138817 A | 6/2013 |

(Continued)

OTHER PUBLICATIONS

E. Shin and J. Shin, "Sounding reference signal measurement in LTE system," 2016 18th International Conference on Advanced Communication Technology (ICACT), Pyeongchang, 2016, pp. 755-758. (Year: 2016).*
M. Giordani, M. Polese, A. Roy, D. Castor and M. Zorzi, "A Tutorial on Beam Management for 3GPP NR at mmWave Frequencies," in IEEE Communications Surveys & Tutorials, vol. 21, No. 1, pp. 173-196, Firstquarter 2019. (Year: 2019).*
(Continued)

*Primary Examiner* — Nader Bolourchi
(74) *Attorney, Agent, or Firm* — Huawei Technologies Co., Ltd.

(57) ABSTRACT

Embodiments of the present invention relate to the communications field, and disclose an information transmission method and device to implement beamforming on an SRS. A specific solution is as follows: A base station configures at least one first resource for a UE, where the first resource is used by the UE to transmit a target channel and/or signal; and the base station transmits first indication information to the UE, where the first indication information is used to indicate a correspondence between the first resource and a beam, or the first indication information is used to indicate a correspondence between the first resource and a second resource. The embodiments of the present invention are used in a beamforming process.

20 Claims, 13 Drawing Sheets

(56) References Cited

U.S. PATENT DOCUMENTS

| | | | |
|---|---|---|---|
| 2009/0316756 A1 | 12/2009 | Ro et al. | |
| 2016/0352403 A1* | 12/2016 | Kishiyama | H04B 7/0695 |
| 2017/0141823 A1* | 5/2017 | Fodor | H04B 7/0404 |
| 2017/0359734 A1 | 12/2017 | Lee et al. | |
| 2018/0184321 A1 | 6/2018 | Kim et al. | |

FOREIGN PATENT DOCUMENTS

| | | |
|---|---|---|
| CN | 104937869 A | 9/2015 |
| CN | 104956606 A | 9/2015 |
| CN | 105025579 A | 11/2015 |
| CN | 105207708 A | 12/2015 |
| CN | 105940699 A | 9/2016 |
| CN | 108391315 A | 8/2018 |

OTHER PUBLICATIONS

S. Lagen, A. Agustin and J. Vidal, "Decentralized Beamforming with Coordinated Sounding for Inter-Cell Interference Management," European Wireless 2014; 20th European Wireless Conference, Barcelona, Spain, 2014, pp. 1-6. (Year: 2014).*

Huawei, HiSilicon, "CSI enhancements for CS/CB with FD-MIMO", 3GPP TSG-RAN WG1 #87 R1-1611179, Reno, USA, Nov. 14-18, 2016, total 3 pages. (Year: 2016).*

Intel Corporation, "Reference Signal and Procedure for Beam Management P-2 and P-3", 3GPP TSG-RAN WG1 #87 R1-1611986, Reno, USA, Nov. 14-18, 2016, total 3 pages.

Nokia, Alcatel-Lucent Shanghai Bell, "Beam Management—Beam Reporting", 3GPP TSG-RAN WG1#87 R1-1612864, Reno, U.S.A., Nov. 14-18, 2016, total 3 pages.

* cited by examiner

INFORMATION TRANSMISSION METHOD AND DEVICE

CROSS-REFERENCE TO RELATED APPLICATIONS

This application is a continuation of International Application No. PCT/CN2017/108398, filed on Oct. 30, 2017, which claims priority to Chinese Patent Application No. 201610974102.2, filed on Nov. 3, 2016 and Chinese Patent Application No. 201710007820.7, filed on Jan. 5, 2017, and Chinese Patent Application No. 201710686460.8, filed on Aug. 11, 2017, all of which are hereby incorporated by reference in their entireties.

TECHNICAL FIELD

Embodiments of the present invention relate to the communications field, and in particular, to an information transmission method and device.

BACKGROUND

In a Long Term Evolution (LTE) system, a user equipment (UE) may transmit a sounding reference signal (SRS) to a base station, so that the base station performs an operation such as uplink channel quality estimation based on the received SRS.

In addition, with continuous development of the mobile Internet, low-frequency spectrum resources are increasingly insufficient. To satisfy growing communication rate and capacity requirements, the 3rd Generation Partnership Project (3GPP) incorporates high frequencies with rich frequency resources into a spectrum range used in a next-generation wireless communications system. However, compared with a wireless communications system using a low frequency as an operating frequency, a wireless communications system using a high frequency as an operating frequency has a relatively high transmission loss. In other words, at same transmit power, coverage of a wireless communications system using a high frequency as an operating frequency is far narrower than coverage of a wireless communications system using a low frequency as an operating frequency. Therefore, to enhance coverage of a wireless communications system using a high frequency as an operating frequency, a beamforming technology is introduced in the industry.

In conclusion, in a wireless communications system using a high frequency as an operating frequency, if a UE needs to transmit an SRS, beamforming processing needs to be performed on the SRS. However, because the LTE system uses a low frequency as an operating frequency, when a UE transmits an SRS in the LTE system, beamforming processing is not required. In other words, the prior art has no solution for performing beamforming on the SRS.

SUMMARY

Embodiments of the present invention provide an information transmission method and device to implement beamforming on an SRS.

To achieve the foregoing objective, the embodiments of the present invention use the following technical solutions:

According to a first aspect, an embodiment of the present invention provides an information transmission method, including:

configuring, by a base station, at least one first resource for a UE, where the first resource is used by the UE to transmit a target channel and/or signal; and transmitting, by the base station, first indication information to the UE, where the first indication information is used to indicate a correspondence between the first resource and a beam, and the beam is an uplink transmitting beam, or a downlink receiving beam, or a downlink transmitting beam, or an uplink receiving beam.

In the information transmission method provided by this embodiment of the present invention, the base station configures the at least one first resource used to transmit the target channel and/or signal for the UE, and transmits the first indication information used to indicate the correspondence between the first resource and the beam to the UE, so that the UE can determine, based on the first resource and the first indication information, a beam required for transmitting the target channel and/or signal. Therefore, when the target channel or signal or both are an SRS, the UE can transmit the SRS by using the determined beam required for transmitting the target channel and/or signal, so as to implement beamforming on the SRS.

With reference to the first aspect, in a possible implementation, the at least one first resource may be included in a resource group, and the resource group may include at least one resource subgroup.

With reference to the first aspect and the foregoing possible implementation, in another possible implementation, the target channel and/or signal may include at least one of the following: an SRS, a physical random access channel (PRACH), a physical uplink shared channel (PUSCH), a physical uplink control channel (PUCCH), an uplink tracking signal, an uplink discovery signal, an uplink beam reference signal, an uplink mobility reference signal, an uplink demodulation reference signal, and an uplink phase tracking reference signal.

With reference to the first aspect and the foregoing possible implementation, in another possible implementation, the beam may be identified by using at least one of the following: a port, a precoding matrix, and a spatial feature parameter; or the beam may be a spatial filter.

With reference to the first aspect and the foregoing possible implementation, in another possible implementation, the first resource may include at least one of the following: a time domain resource, a frequency domain resource, a code domain resource, and an antenna port.

With reference to the first aspect and the foregoing possible implementation, in another possible implementation, the correspondence between the first resource and the beam may be indicated in the following different manners:

manner 1: the first indication information may include an identity of each first resource in the resource subgroup, and a number of a beam corresponding to the identity of each first resource;

manner 2: the first indication information may include an identity of each resource subgroup, and a number of a beam corresponding to the identity of each resource subgroup;

manner 3: the first indication information may include an identity of each resource subgroup, and a number of each beam in a beam group corresponding to the identity of each resource subgroup, and the beam group includes at least one beam (different resource subgroups may correspond to a same beam group);

manner 4: the first indication information may include an identity of each resource subgroup, and a number of a beam group corresponding to the identity of each resource subgroup (identities of different resource subgroups may correspond to a number of a same beam group);

manner 5: the first indication information may include a number of each beam in a beam group;

manner 6: the first indication information may include a number of a beam group;

manner 7: the first indication information may include an identity of each resource subgroup, and an optional range of beams corresponding to the identity of each resource subgroup;

manner 8: the first indication information may include an identity of each first resource, and a number of a beam corresponding to the identity of each first resource;

manner 9: the first indication information may include an identity of each first resource, and a number of each beam in a beam group corresponding to the identity of each first resource, where the beam group includes at least one beam (different first resources may correspond to a same beam group);

manner 10: the first indication information may include an identity of each first resource, and a number of a beam group corresponding to the identity of each first resource (identities of different first resources may correspond to a number of a same beam group); and manner 11: the first indication information may include an identity of each first resource, and an optional range of beams corresponding to the identity of each first resource.

In the manner 1, the base station uses the first indication information to indicate that, on first resources in a same resource subgroup, the UE needs to transmit target channels and/or signals by using different transmitting beams. In this case, correspondingly, a pre-definition or pre-configuration manner may be used so that, on all the first resources in the same resource subgroup, the base station receives the target channels and/or signals by using a same receiving beam.

In the manner 2 to the manner 6, the base station uses the first indication information to indicate that, on all first resources in a same resource subgroup, the UE needs to transmit target channels and/or signals by using a same transmitting beam. In this case, correspondingly, a pre-definition or pre-configuration manner may be used so that, on the first resources in the same resource subgroup, the base station receives the target channels and/or signals by using different receiving beams.

In the manner 2, if the beam is a downlink transmitting beam or an uplink receiving beam, the user equipment transmits, on each resource subgroup, a target channel and/or signal by using an uplink transmitting beam paired with the downlink transmitting beam or the uplink receiving beam.

Optionally, the first indication information may be configuration information. The configuration information may be carried in higher layer signaling.

Alternatively, the first indication information may be configuration information or a configuration indication. The configuration information is used to indicate the correspondence between the first resource and the beam (the configuration information may include a plurality of configurations), and the configuration information may be carried in higher layer signaling. The configuration indication is used to indicate which configuration in the plurality of configurations is to be used when the UE transmits the target channel and/or signal, and the configuration indication may be carried in a downlink control indicator (DCI).

With reference to the first aspect and the foregoing possible implementation, in another possible implementation, before the transmitting, by the base station, first indication information to the UE, the information transmission method may further include: transmitting, by the base station, configuration information used to indicate a correspondence between the beam and a number of the beam to the UE, where the number of the beam may be a sequence number of the beam selected by the base station.

With reference to the first aspect and the foregoing possible implementation, in another possible implementation, before the transmitting, by the base station, first indication information to the UE, the information transmission method may further include: transmitting, by the base station to the UE, second indication information that is used by the UE to divide the resource group into the at least one resource subgroup.

With reference to the first aspect and the foregoing possible implementation, in another possible implementation, to enable the base station to configure a resource for the UE based on a capability of the UE, before the configuring, by a base station, at least one first resource for the UE, the information transmission method may further include: receiving, by the base station, capability indication information transmitted by the UE, where the capability indication information includes a maximum quantity of beams supported by the UE in a capability type, or the capability indication information includes a quantized value of a maximum quantity of beams supported by the UE in a capability type; and correspondingly, the configuring, by a base station, at least one first resource for the UE may specifically include: configuring, by the base station, the at least one first resource for the UE based on the capability indication information.

With reference to the first aspect and the foregoing possible implementation, in another possible implementation, the capability type may include a beam management stage and/or an optional range of beams. The capability type may be predefined, or may be configured by the base station.

With reference to the first aspect and the foregoing possible implementation, the beam may also be a spatial filter, precoding matrix, or a spatial weight.

According to a second aspect, an embodiment of the present invention provides an information transmission method, including:

configuring, by a base station, at least one first resource for a UE, where the first resource is used by the UE to transmit a target channel and/or signal; and transmitting, by the base station, first indication information to the UE, where the first indication information is used to indicate a correspondence between the first resource and a second resource, and the correspondence between the first resource and the second resource may include at least one of the following:

a quasi co-location QCL relationship exists between an antenna port for the target channel and/or signal and an antenna port for a channel and/or signal transmitted on the second resource;

the target channel and/or signal is transmitted by using a same beam as a channel and/or signal transmitted on the second resource; and the target channel and/or signal is transmitted by using a same spatial filter as a channel and/or signal transmitted on the second resource.

In the information transmission method provided by this embodiment of the present invention, the base station configures the at least one first resource used to transmit the target channel and/or signal for the UE, and transmits the first indication information used to indicate the correspondence between the first resource and the second resource to the UE, so that the UE can determine, based on the first resource, the first indication information, and the second resource, a beam required for transmitting the target channel and/or signal; or so that the UE can determine, based on the first indication information and the second resource, a beam required for transmitting the target channel and/or signal; or so that the UE can determine, based on the second resource and the first indication information, a beam used by the base station to receive the target channel and/or signal, so as to further determine, based on the beam used by the base station to receive the target channel and/or signal, a beam required for transmitting the target channel and/or signal by the UE. Therefore, when the target channel or signal or both are an SRS, the UE can transmit the SRS by using the determined beam required for transmitting the target channel and/or signal, so as to implement beamforming on the SRS.

With reference to the second aspect, in a possible implementation, the beam may also be a spatial filter, precoding, or a spatial weight.

With reference to the second aspect, in a possible implementation, the at least one first resource is included in a resource group, and the resource group may include at least one resource subgroup.

With reference to the second aspect and the foregoing possible implementation, in another possible implementation, the target channel and/or signal may include at least one of the following: an SRS, a PRACH, a PUSCH, a PUCCH, an uplink tracking signal, an uplink discovery signal, an uplink beam reference signal, an uplink mobility reference signal, an uplink demodulation reference signal, and an uplink phase tracking reference signal.

With reference to the second aspect and the foregoing possible implementation, in another possible implementation, the first resource may include at least one of the following: a time domain resource, a frequency domain resource, a code domain resource, and an antenna port.

With reference to the second aspect and the foregoing possible implementation, in another possible implementation, the second resource may include at least one of: a time domain resource, a frequency domain resource, a code domain resource, and an antenna port that are used by the UE to transmit information to the base station before the UE transmits the target channel and/or signal; or the second resource may include at least one of: a time domain resource, a frequency domain resource, a code domain resource, and an antenna port that are used by the base station to transmit information to the UE before the UE transmits the target channel and/or signal. The second resource may be a resource used to transmit at least one of the following channels and/or signals: an SRS, a PRACH, a PUSCH, a PUCCH, an uplink tracking signal, an uplink discovery signal, an uplink beam reference signal, an uplink mobility reference signal, an uplink demodulation reference signal, a primary synchronization signal, a secondary synchronization signal, a synchronization signal block, a demodulation reference signal of a physical broadcast channel, a CSI-RS, a tracking reference signal (TRS), a phase tracking reference signal (PT-RS), a demodulation reference signal of a physical downlink control channel, and a demodulation reference signal of a physical downlink shared channel. Optionally, the physical downlink control channel may be a control resource set (CORESET), or may be a physical downlink control channel carrying a random access response or control information of system information.

Optionally, the physical downlink shared channel may be a physical downlink shared channel carrying system information.

With reference to the second aspect and the foregoing possible implementation, in another possible implementation, the first indication information may include a correspondence between each first resource in the resource subgroup and the second resource.

The base station uses the first indication information to indicate that first resources in the resource subgroup correspond to different second resources. In other words, on the first resources in the same resource subgroup, the UE needs to transmit target channels and/or signals by using different transmitting beams. In this case, correspondingly, a pre-definition or pre-configuration manner may be used so that, on all the first resources in the same resource subgroup, the base station receives the target channels and/or signals by using a same receiving beam.

With reference to the second aspect and the foregoing possible implementation, in another possible implementation, the first indication information may specifically include an identity of each first resource in the resource subgroup, and an identity of a second resource corresponding to the identity of each first resource; or the first indication information specifically includes information used to indicate that a quasi co-location (QCL) relationship exists between an antenna port for a signal on each first resource and an antenna port for a signal on a second resource; or the first indication information specifically includes an identity of a second resource corresponding to each first resource. Optionally, when the first indication information includes the identity of the second resource corresponding to each first resource, the first indication information may include one or more identities of second resources, where a quantity of identities of second resources is the same as a quantity of first resources, and a correspondence between the first resource and each of the second resources indicated by the first indication information may be predefined.

With reference to the second aspect and the foregoing possible implementation, in another possible implementation, the first indication information may further include a correspondence between each first resource and an optional range of beams.

With reference to the second aspect and the foregoing possible implementation, in another possible implementation, the first indication information may include a correspondence between each resource subgroup and the second resource.

The base station uses the first indication information to indicate that all first resources in a same resource subgroup correspond to a same second resource. In other words, on all the first resources in the same resource subgroup, the UE needs to transmit target channels and/or signals by using a same transmitting beam. In this case, correspondingly, a pre-definition or pre-configuration manner may be used so that, on the first resources in the same resource subgroup, the base station receives the target channels and/or signals by using different receiving beams.

With reference to the second aspect and the foregoing possible implementation, in another possible implementation, the first indication information may specifically include an identity of each resource subgroup, and an identity of a second resource corresponding to the identity of each resource subgroup; or the first indication information may specifically include information used to indicate that a QCL relationship exists between an antenna port for a signal on each resource subgroup and an antenna port for a signal on a second resource; or the first indication information may specifically include an identity of a second resource corresponding to each resource subgroup.

With reference to the second aspect and the foregoing possible implementation, in another possible implementation, the first indication information may include a correspondence between each resource subgroup and a second-resource group, and the second-resource group includes at least one second resource. The base station uses the first indication information to indicate that all first resources in a same resource subgroup correspond to a same second resource. In other words, on all the first resources in the same resource subgroup, the UE needs to transmit target channels and/or signals by using a same transmitting beam. In this case, correspondingly, a pre-definition or pre-configuration manner may be used so that, on the first resources in the same resource subgroup, the base station receives the target channels and/or signals by using different receiving beams.

With reference to the second aspect and the foregoing possible implementation, in another possible implementation, the first indication information may specifically include an identity of each resource subgroup, and an identity of each second resource in a second-resource group corresponding to the identity of each resource subgroup; or the first indication information may specifically include an identity of each resource subgroup, and an identity of a second-resource group corresponding to the identity of each resource subgroup; or the first indication information may specifically include information used to indicate that a QCL relationship exists between an antenna port for a signal on each resource subgroup and an antenna port for a signal on a second-resource group.

With reference to the second aspect and the foregoing possible implementation, in another possible implementation, the first indication information may include an identity of each second resource in a second-resource group; or the first indication information may include an identity of a second-resource group. Optionally, when the first indication information includes the identity of the second-resource group, a quantity of second resources in the second-resource group is the same as a quantity of first-resource subgroups in the first-resource group, and a correspondence between a second resource in the second-resource group and a first-resource subgroup in the first-resource group as indicated in the first indication information is predefined. The base station uses the first indication information to indicate that all first resources in a same resource subgroup correspond to a same second resource. In other words, on all the first resources in the same resource subgroup, the UE needs to transmit target channels and/or signals by using a same transmitting beam. In this case, correspondingly, a pre-definition or pre-configuration manner may be used so that, on the first resources in the same resource subgroup, the base station receives the target channels and/or signals by using different receiving beams.

With reference to the second aspect and the foregoing possible implementation, in another possible implementation, the first indication information may further include a correspondence between each resource subgroup and an optional range of beams.

With reference to the second aspect and the foregoing possible implementation, in another possible implementation, the first indication information may include a correspondence between each first resource and the second resource.

With reference to the second aspect and the foregoing possible implementation, in another possible implementation, the first indication information may specifically include an identity of each first resource, and an identity of a second resource corresponding to the identity of each first resource; or the first indication information may specifically include information used to indicate that a QCL relationship exists between an antenna port for a signal on each first resource and an antenna port for a signal on a second resource.

With reference to the second aspect and the foregoing possible implementation, in another possible implementation, in a correspondence between each first resource and a second-resource group, the second-resource group includes at least one second resource.

With reference to the second aspect and the foregoing possible implementation, in another possible implementation, the first indication information may specifically include an identity of each first resource, and an identity of each second resource in a second-resource group corresponding to the identity of each first resource; or the first indication information may specifically include an identity of each first resource, and an identity of a second-resource group corresponding to the identity of each first resource; or the first indication information may specifically include information used to indicate that a QCL relationship exists between an antenna port for a signal on each first resource and an antenna port for a signal on a second-resource group; or the first indication information may specifically include an identity of each second resource in a second-resource group corresponding to each first resource; or the first indication information may specifically include an identity of a second-resource group corresponding to each first resource.

With reference to the second aspect and the foregoing possible implementation, in another possible implementation, the first indication information may further include a correspondence between each first resource and an optional range of beams.

With reference to the second aspect and the foregoing possible implementation, in another possible implementation, the second-resource group includes one or more second resources.

With reference to the second aspect and the foregoing possible implementation, in another possible implementation, existence of a QCL relationship means having a same antenna port parameter.

Alternatively, existence of a QCL relationship means that a same parameter exists in reference signals corresponding to antenna ports, or existence of a QCL relationship means that the user equipment may determine, based on a parameter of an antenna port, a parameter of an antenna port having the QCL relationship with the antenna port, or existence of a QCL relationship means that two antenna ports have a same parameter, or existence of a QCL relationship means that a difference between parameters of two antenna ports is less than a threshold. The parameter may be at least one of: a delay spread, a Doppler spread, a Doppler frequency shift, an average delay, an average gain, an angle of arrival (AOA), an average AOA, an AOA spread, an angle of departure (AOD), an average angle of departure AOD, an AOD spread, a receive antenna spatial correlation parameter, a transmit antenna spatial correlation parameter, a transmitting beam, a receiving beam, a resource identity, a transmit end power azimuth spectrum (PAS), a receive end PAS, and a PAS. The beam includes at least one of the following: precoding, a weight sequence number, a beam sequence number, and a spatial filter. The azimuth may be a decomposition value in different dimensions, or a combination of decomposition values in different dimensions. The antenna ports are antenna ports having different antenna port numbers, and/or antenna ports having a same antenna port number and transmitting or receiving information in different time and/or frequency and/or code domain resources, and/or antenna ports having different antenna port numbers and transmitting or receiving information in different time and/or frequency and/or code domain resources. The resource identity includes a resource identity of a channel state information reference signal (CSI-RS), or a resource identity of an SRS, used to indicate a beam on a resource, or a resource identity of a synchronization signal or a synchronization signal block, or a resource identity of a preamble sequence transmitted on a PRACH, or a resource identity of a DMRS, used to indicate a beam on a resource. For example, a spatial QCL relationship between a port for a downlink signal and another port for a downlink signal or between a port for an uplink signal and another port for an uplink signal may be that the two signals may have a same AOA or AOD, used to indicate that the two signals have a same receiving beam or transmitting beam. For another example, a QCL relationship between a downlink signal and an uplink signal or between a port for an uplink signal and a port for a downlink signal may be that a correspondence exists between an AOA of one signal and an AOD of the other signal in the two signals, or that a correspondence exists between an AOD of one signal and an AOA of the other signal in the two signals. In other words, by using a beam correspondence, an uplink transmitting beam may be determined based on a downlink receiving beam, or a downlink receiving beam may be determined based on an uplink transmitting beam.

Signals transmitted on ports having the QCL relationship may also be understood as having a corresponding beam, where the corresponding beam includes at least one of the following: a same receiving beam, a same transmitting beam, a transmitting beam corresponding to a receiving beam (corresponding to a reciprocity scenario), and a receiving beam corresponding to a transmitting beam (corresponding to a reciprocity scenario).

Signals transmitted on ports having the QCL relationship may also be understood as signals received or transmitted by using a same spatial filter. The spatial filter may be at least one of the following: precoding, a weight of an antenna port, phase deflection of an antenna port, and an amplitude gain of an antenna port.

Signals transmitted on ports having the QCL relationship may also be understood as having a corresponding beam pair link (BPL), where the corresponding BPL includes at least one of the following: a same downlink BPL, a same uplink BPL, an uplink BPL corresponding to a downlink BPL, and a downlink BPL corresponding to an uplink BPL.

Optionally, the QCL relationship may have another name, without changing the technical essence, for example, may also be referred to as a spatial QCL relationship or a reciprocal QCL relationship.

With reference to the second aspect and the foregoing possible implementation, in another possible implementation, the first indication information may be configuration information. The configuration information may be carried in higher layer signaling.

Alternatively, the first indication information may be configuration information or a configuration indication. The configuration information is used to indicate the correspondence between the first resource and the beam or the second resource (the configuration information may include a plurality of configurations simultaneously), and the configuration information may be carried in higher layer signaling. The configuration indication is used to indicate which configuration in the plurality of configurations is to be used when the UE transmits the target channel and/or signal, and the configuration indication may be carried in DCI.

With reference to the second aspect and the foregoing possible implementation, in another possible implementation, a time offset between a time unit in which a channel carrying the first indication information is located and the second resource is predefined, or is determined based on third configuration information of the base station. Optionally, the time offset may be a positive value, a negative value, or 0. The time unit may be a timeslot, a subframe, a symbol, or a mini-timeslot.

With reference to the second aspect and the foregoing possible implementation, in another possible implementation, a time offset between the first resource and the second resource is predefined, or is determined based on third configuration information of the base station. Optionally, the time offset may be a positive value, a negative value, or 0. The time unit may be a timeslot, a subframe, a symbol, or a mini-timeslot.

With reference to the second aspect and the foregoing possible implementation, in another possible implementation, a time offset between the second resource and a time unit in which a channel carrying the first indication information is located is predefined, or is determined based on fourth configuration information of the base station. Optionally, the time offset may be a positive value or 0. The time unit may be a timeslot, a subframe, a symbol, or a mini-timeslot.

With reference to the second aspect and the foregoing possible implementation, in another possible implementation, a time offset between the second resource and the first resource is predefined, or is determined based on third configuration information of the base station. Optionally, the time offset may be a positive value, a negative value, or 0. The time unit may be a timeslot, a subframe, a symbol, or a mini-timeslot.

With reference to the second aspect and the foregoing possible implementation, in another possible implementation, before the transmitting, by the base station, first indication information to the UE, the information transmission method may further include: transmitting, by the base station, second indication information that is used by the UE to divide the resource group into the at least one resource subgroup.

With reference to the second aspect and the foregoing possible implementation, in another possible implementation, to enable the base station to configure a resource for the UE based on a capability of the UE, before the configuring, by a base station, at least one first resource for the UE, the information transmission method may further include: receiving, by the base station, capability indication information transmitted by the UE, where the capability indication information includes a maximum quantity of beams supported by the UE in a capability type, or the capability indication information includes a quantized value of a maximum quantity of beams supported by the UE in a capability type; and correspondingly, the configuring, by a base station, at least one first resource for the UE may specifically include: configuring, by the base station, the at least one first resource for the UE based on the capability indication information.

With reference to the second aspect and the foregoing possible implementation, in another possible implementation, the capability type may include a beam management stage and/or an optional range of beams. The capability type may be predefined, or may be configured by the base station.

According to a third aspect, an embodiment of the present invention provides an information transmission method, including:

obtaining, by a UE, at least one first resource configured by a base station for the UE, where the first resource is used by the UE to transmit a target channel and/or signal; and receiving, by the UE, first indication information transmitted by the base station, where the first indication information is used to indicate a correspondence between the first resource and a beam, and the beam is an uplink transmitting beam, or a downlink receiving beam, or a downlink transmitting beam, or an uplink receiving beam.

In the information transmission method provided by this embodiment of the present invention, the UE obtains the at least one first resource that is configured by the base station for the UE and used to transmit the target channel and/or signal, and receives the first indication information that is transmitted by the base station and used to indicate the correspondence between the first resource and the beam. Therefore, the UE can determine, based on the first resource and the first indication information, a beam required for transmitting the target channel and/or signal, and can transmit the target channel and/or signal on the first resource and on the beam required for transmitting the target channel and/or signal. When the target channel or signal or both are an SRS, the UE transmits the SRS by using the determined beam required for transmitting the target channel and/or signal, so as to implement beamforming on the SRS.

With reference to the third aspect, in a possible implementation, the at least one first resource may be included in a resource group, and the resource group may include at least one resource subgroup.

With reference to the third aspect and the foregoing possible implementation, in another possible implementation, after the receiving, by the UE, first indication information transmitted by the base station, the information transmission method may further include:

determining, by the UE based on the first resource and the first indication information, a beam required for transmitting the target channel and/or signal, namely, an uplink transmitting beam, and transmitting the target channel and/or signal on the first resource and on the uplink transmitting beam.

When the beam is an uplink transmitting beam, the UE may directly determine, based on the first resource and the correspondence between the first resource and the beam, the uplink transmitting beam; when the beam is a downlink receiving beam, the UE may first determine, based on the first resource and the correspondence between the first resource and the beam, the downlink receiving beam, and then determine the uplink transmitting beam based on the downlink receiving beam by using a correspondence between uplink and downlink beams (the correspondence between the uplink and downlink beams may be obtained from reciprocity of uplink and downlink channels); or when the beam is a downlink transmitting beam, the UE may first determine, based on the first resource and the correspondence between the first resource and the beam, the downlink transmitting beam, then determine a downlink receiving beam based on the downlink transmitting beam by using a correspondence between uplink and downlink beams, and finally determine the uplink transmitting beam based on the downlink receiving beam by using the correspondence between the uplink and downlink beams.

With reference to the third aspect and the foregoing possible implementation, in another possible implementation, the target channel and/or signal may include at least one of the following: an SRS, a PRACH, a PUSCH, a PUCCH, an uplink tracking signal, an uplink discovery signal, an uplink beam reference signal, an uplink mobility reference signal, an uplink demodulation reference signal, and an uplink phase tracking reference signal.

With reference to the third aspect and the foregoing possible implementation, in another possible implementation, the beam may be a port, or may be precoding.

With reference to the third aspect and the foregoing possible implementation, in another possible implementation, the first resource may include at least one of the following: a time domain resource, a frequency domain resource, a code domain resource, and an antenna port.

With reference to the third aspect and the foregoing possible implementation, in another possible implementation, the first indication information may include an identity of each first resource in the resource subgroup, and a number of a beam corresponding to the identity of each first resource; and correspondingly, the determining, by the UE, an uplink transmitting beam based on the first resource and the first indication information may be specifically: determining, by the UE, a number of a beam corresponding to an identity of the first resource, and then determining the uplink transmitting beam based on the beam corresponding to the number of the beam; or the first indication information may include an identity of each resource subgroup, and a number of a beam corresponding to the identity of each resource subgroup; and correspondingly, the determining, by the UE, an uplink transmitting beam based on the first resource and the first indication information may be specifically: determining, by the UE, an identity of a resource subgroup to which the first resource belongs, determining a number of a beam corresponding to the identity of the resource subgroup, and then determining the uplink transmitting beam based on the beam corresponding to the number of the beam; or the first indication information may include an identity of each resource subgroup, and a number of each beam in a beam group corresponding to the identity of each resource subgroup, where the beam group includes at least one beam; and correspondingly, the determining, by the UE, an uplink transmitting beam based on the first resource and the first indication information may be specifically: determining, by the UE, an identity of a resource subgroup to which the first resource belongs, determining a number of each beam in a beam group corresponding to the identity of the resource subgroup, and then determining the uplink transmitting beam based on a beam in the beam group; or the first indication information may include an identity of each resource subgroup, and a number of a beam group corresponding to the identity of each resource subgroup; and correspondingly, the determining, by the UE, an uplink transmitting beam based on the first resource and the first indication information may be specifically: determining, by the UE, an identity of a resource subgroup to which the first resource belongs, determining a number of a beam group corresponding to the identity of the resource subgroup, and then determining the uplink transmitting beam based on a beam in the beam group; or the first indication information may include a number of each beam in a beam group, or the first indication information may include a number of a beam group; and correspondingly, the determining, by the UE, an uplink transmitting beam based on the first resource and the first indication information may be specifically: determining, by the UE, the uplink transmitting beam based on a beam in the beam group, where a resource subgroup to which the first resource belongs corresponds to a beam; or the first indication information may include an identity of each resource subgroup, and an optional range of beams corresponding to the identity of each resource subgroup; and correspondingly, the determining, by the UE, an uplink transmitting beam based on the first resource and the first indication information may be specifically: determining, by the UE, an identity of a resource subgroup to which the first resource belongs, determining an optional range of beams corresponding to the identity of the resource subgroup, and then determining the uplink transmitting beam based on the optional range of beams; or the first indication information may include an identity of each first resource, and a number of a beam corresponding to the identity of each first resource; or the first indication information may include an identity of each first resource, and a number of each beam in a beam group corresponding to the identity of each first resource, where the beam group includes at least one beam; or the first indication information may include an identity of each first resource, and a number of a beam group corresponding to the identity of each first resource; or the first indication information may include an identity of each first resource, and an optional range of beams corresponding to the identity of each first resource.

With reference to the third aspect and the foregoing possible implementation, in another possible implementation, before the receiving, by the UE, first indication information transmitted by the base station, the information transmission method may further include: receiving, by the UE, configuration information that is transmitted by the base station and used to indicate a correspondence between the beam and a number of the beam. Correspondingly, when the UE determines the number of the beam based on the first indication information, the UE may determine, based on the configuration information, the beam corresponding to the number, where the number of the beam may be a sequence number of the beam selected by the base station.

With reference to the third aspect and the foregoing possible implementation, in another possible implementation, before the receiving, by the UE, first indication information transmitted by the base station, the information transmission method may further include: receiving, by the UE, second indication information that is transmitted by the base station and used by the UE to divide the resource group into the at least one resource subgroup, and dividing the resource group into the at least one resource subgroup based on the second indication information.

With reference to the third aspect and the foregoing possible implementation, in another possible implementation, to enable the base station to configure a resource for the UE based on a capability of the UE, before the obtaining, by the UE, at least one first resource configured by a base station for the UE, the information transmission method may further include: transmitting, by the UE, capability indication information to the base station, where the capability indication information includes a maximum quantity of beams supported by the UE in a capability type, or the capability indication information includes a quantized value of a maximum quantity of beams supported by the UE in a capability type.

With reference to the third aspect and the foregoing possible implementation, in another possible implementation, the capability type includes a beam management stage and/or an optional range of beams. The capability type may be predefined, or may be configured by the base station.

According to a fourth aspect, an embodiment of the present invention provides an information transmission method, including:

obtaining, by a UE, at least one first resource configured by a base station for the UE, where the first resource is used by the UE to transmit a target channel and/or signal; and receiving, by the UE, first indication information transmitted by the base station, where the first indication information is used to indicate a correspondence between the first resource and a second resource, and the correspondence between the first resource and the second resource may include at least one of the following:

a quasi co-location QCL relationship exists between an antenna port for the target channel and/or signal and an antenna port for a channel and/or signal transmitted on the second resource;

the target channel and/or signal is transmitted by using a same beam as a channel and/or signal transmitted on the second resource; and the target channel and/or signal is transmitted by using a same spatial filter as a channel and/or signal transmitted on the second resource.

In the information transmission method provided by this embodiment of the present invention, the UE obtains the at least one first resource that is configured by the base station for the UE and used to transmit the target channel and/or signal, and receives the first indication information that is transmitted by the base station and used to indicate the correspondence between the first resource and the second resource. Therefore, the UE can determine, based on the first resource and the first indication information, a beam required for transmitting the target channel and/or signal, or determine, based on the first indication information and the second resource, a beam required for transmitting the target channel and/or signal, and can transmit the target channel and/or signal on the first resource and on the beam required for transmitting the target channel and/or signal. When the target channel or signal or both are an SRS, the UE transmits the SRS by using the determined beam required for transmitting the target channel and/or signal, so as to implement beamforming on the SRS.

With reference to the fourth aspect, in a possible implementation, the beam may also be a spatial filter, precoding, or a spatial weight.

With reference to the fourth aspect, in a possible implementation, the at least one first resource may be included in a resource group, and the resource group may include at least one resource subgroup.

With reference to the fourth aspect and the foregoing possible implementation, in another possible implementation, after the receiving, by the UE, first indication information transmitted by the base station, the information transmission method may further include: determining, by the UE, the second resource based on the first resource and the first indication information, and determining, based on a beam corresponding to the second resource, a beam required for transmitting the target channel and/or signal, namely, an uplink transmitting beam; and transmitting, by the UE, the target channel and/or signal on the first resource and on the uplink transmitting beam.

With reference to the fourth aspect and the foregoing possible implementation, in another possible implementation, the target channel and/or signal may include at least one of the following: an SRS, a PRACH, a PUSCH, a PUCCH, an uplink tracking signal, an uplink discovery signal, an uplink beam reference signal, an uplink mobility reference signal, an uplink demodulation reference signal, and an uplink phase tracking reference signal.

With reference to the fourth aspect and the foregoing possible implementation, in another possible implementation, the first resource may include at least one of the following: a time domain resource, a frequency domain resource, a code domain resource, and an antenna port.

With reference to the fourth aspect and the foregoing possible implementation, in another possible implementation, the second resource may include at least one of: a time domain resource, a frequency domain resource, a code domain resource, and an antenna port that are used by the UE to transmit information to the base station before the UE transmits the target channel and/or signal; or the second resource may include at least one of: a time domain resource, a frequency domain resource, a code domain resource, and an antenna port that are used by the base station to transmit information to the UE before the UE transmits the target channel and/or signal.

The second resource may be a resource used to transmit at least one of the following channels and/or signals: an SRS, a PRACH, a PUSCH, a PUCCH, an uplink tracking signal, an uplink discovery signal, an uplink beam reference signal, an uplink mobility reference signal, an uplink demodulation reference signal, a primary synchronization signal, a secondary synchronization signal, a synchronization signal block, a demodulation reference signal of a physical broadcast channel, a CSI-RS, a tracking reference signal (TRS), a phase tracking reference signal (PT-RS), a demodulation reference signal of a physical downlink control channel, and a demodulation reference signal of a physical downlink shared channel. Optionally, the physical downlink control channel may be a control resource set (CORESET), or may be a physical downlink control channel carrying a random access response or control information of system information. Optionally, the physical downlink shared channel may be a physical downlink shared channel carrying system information.

With reference to the fourth aspect and the foregoing possible implementation, in another possible implementation, the first indication information may include a correspondence between each first resource in the resource subgroup and the second resource.

With reference to the fourth aspect and the foregoing possible implementation, in another possible implementation, the first indication information may specifically include an identity of each first resource in the resource subgroup, and an identity of a second resource corresponding to the identity of each first resource; or the first indication information specifically includes information used to indicate that a QCL relationship exists between an antenna port for a signal on each first resource and an antenna port for a signal on a second resource; or the first indication information specifically includes an identity of a second resource corresponding to each first resource. Optionally, when the first indication information includes the identity of the second resource corresponding to each first resource, the first indication information may include one or more identities of second resources, where a quantity of identities of second resources is the same as a quantity of first resources, and a correspondence between the first resource and each of the second resources indicated by the first indication information may be predefined.

With reference to the fourth aspect and the foregoing possible implementation, in another possible implementation, the first indication information may further include a correspondence between each first resource and an optional range of beams.

With reference to the fourth aspect and the foregoing possible implementation, in another possible implementation, the first indication information may include a correspondence between each resource subgroup and the second resource.

With reference to the fourth aspect and the foregoing possible implementation, in another possible implementation, the first indication information may specifically include an identity of each resource subgroup, and an identity of a second resource corresponding to the identity of each resource subgroup; or the first indication information may specifically include information used to indicate that a QCL relationship exists between an antenna port for a signal on each resource subgroup and an antenna port for a signal on a second resource; or the first indication information may specifically include an identity of a second resource corresponding to each resource subgroup.

With reference to the fourth aspect and the foregoing possible implementation, in another possible implementation, the first indication information may include a correspondence between each resource subgroup and a second-resource group, and the second-resource group includes at least one second resource.

With reference to the fourth aspect and the foregoing possible implementation, in another possible implementation, the first indication information may specifically include an identity of each resource subgroup, and an identity of each second resource in a second-resource group corresponding to the identity of each resource subgroup; or the first indication information may specifically include an identity of each resource subgroup, and an identity of a second-resource group corresponding to the identity of each resource subgroup; or the first indication information may specifically include information used to indicate that a QCL relationship exists between an antenna port for a signal on each resource subgroup and an antenna port for a signal on a second-resource group.

With reference to the fourth aspect and the foregoing possible implementation, in another possible implementation, the first indication information may include an identity of each second resource in a second-resource group; or the first indication information may include an identity of a second-resource group. Optionally, when the first indication information includes the identity of the second-resource group, a quantity of second resources in the second-resource group is the same as a quantity of first-resource subgroups in the first-resource group, and a correspondence between a second resource in the second-resource group and a first-resource subgroup in the first-resource group as indicated in the first indication information is predefined.

With reference to the fourth aspect and the foregoing possible implementation, in another possible implementation, the first indication information may further include a correspondence between each resource subgroup and an optional range of beams.

With reference to the fourth aspect and the foregoing possible implementation, in another possible implementation, the first indication information may include a correspondence between each first resource and the second resource.

With reference to the fourth aspect and the foregoing possible implementation, in another possible implementation, the first indication information may specifically include an identity of each first resource, and an identity of a second resource corresponding to the identity of each first resource; or the first indication information may specifically include information used to indicate that a QCL relationship exists between an antenna port for a signal on each first resource and an antenna port for a signal on a second resource.

With reference to the fourth aspect and the foregoing possible implementation, in another possible implementation, in a correspondence between each first resource and a second-resource group, the second-resource group includes at least one second resource.

With reference to the fourth aspect and the foregoing possible implementation, in another possible implementation, the first indication information may specifically include an identity of each first resource, and an identity of each second resource in a second-resource group corresponding to the identity of each first resource; or the first indication information may specifically include an identity of each first resource, and an identity of a second-resource group corresponding to the identity of each first resource; or the first indication information may specifically include information used to indicate that a QCL relationship exists between an antenna port for a signal on each first resource and an antenna port for a signal on a second-resource group; or the first indication information may specifically include an identity of each second resource in a second-resource group corresponding to each first resource; or the first indication information may specifically include an identity of a second-resource group corresponding to each first resource.

With reference to the fourth aspect and the foregoing possible implementation, in another possible implementation, the first indication information may further include a correspondence between each first resource and an optional range of beams.

With reference to the fourth aspect and the foregoing possible implementation, in another possible implementation, the second-resource group includes one or more second resources.

With reference to the fourth aspect and the foregoing possible implementation, in another possible implementation, existence of a QCL relationship means having a same antenna port parameter.

Alternatively, existence of a QCL relationship means that a same parameter exists in reference signals corresponding to antenna ports, or existence of a QCL relationship means that the user equipment may determine, based on a parameter of an antenna port, a parameter of an antenna port having the QCL relationship with the antenna port, or existence of a QCL relationship means that two antenna ports have a same parameter, or existence of a QCL relationship means that a difference between parameters of two antenna ports is less than a threshold. The parameter may be at least one of: a delay spread, a Doppler spread, a Doppler frequency shift, an average delay, an average gain, an angle of arrival (AOA), an average AOA, an AOA spread, an angle of departure (AOD), an average angle of departure AOD, an AOD spread, a receive antenna spatial correlation parameter, a transmit antenna spatial correlation parameter, a transmitting beam, a receiving beam, a resource identity, a transmit end power azimuth spectrum (PAS), a receive end PAS, and a PAS. The beam includes at least one of the following: precoding, a weight sequence number, a beam sequence number, and a spatial filter. The azimuth may be a decomposition value in different dimensions, or a combination of decomposition values in different dimensions. The antenna ports are antenna ports having different antenna port numbers, and/or antenna ports having a same antenna port number and transmitting or receiving information in different time and/or frequency and/or code domain resources, and/or antenna ports having different antenna port numbers and transmitting or receiving information in different time and/or frequency and/or code domain resources. The resource identity includes a resource identity of a CSI-RS, or a resource identity of an SRS, used to indicate a beam on a resource, or a resource identity of a synchronization signal or a synchronization signal block, or a resource identity of a preamble sequence transmitted on a PRACH, or a resource identity of a DMRS, used to indicate a beam on a resource. For example, a spatial QCL relationship between a port for a downlink signal and another port for a downlink signal or between a port for an uplink signal and another port for an uplink signal may be that the two signals may have a same AOA or AOD, used to indicate that the two signals have a same receiving beam or transmitting beam. For another example, a QCL relationship between a downlink signal and an uplink signal or between a port for an uplink signal and a port for a downlink signal may be that a correspondence exists between an AOA of one signal and an AOD of the other signal in the two signals, or that a correspondence exists between an AOD of one signal and an AOA of the other signal in the two signals. In other words, by using a beam correspondence, an uplink transmitting beam may be determined based on a downlink receiving beam, or a downlink receiving beam may be determined based on an uplink transmitting beam.

Signals transmitted on ports having the spatial QCL relationship may also be understood as having a corresponding beam, where the corresponding beam includes at least one of the following: a same receiving beam, a same transmitting beam, a transmitting beam corresponding to a receiving beam (corresponding to a reciprocity scenario), and a receiving beam corresponding to a transmitting beam (corresponding to a reciprocity scenario).

Signals transmitted on ports having the spatial QCL relationship may also be understood as signals received or transmitted by using a same spatial filter. The spatial filter may be at least one of the following: precoding, a weight of an antenna port, phase deflection of an antenna port, and an amplitude gain of an antenna port.

Signals transmitted on ports having the spatial QCL relationship may also be understood as having a corresponding beam pair link (BPL), where the corresponding BPL includes at least one of the following: a same downlink BPL, a same uplink BPL, an uplink BPL corresponding to a downlink BPL, and a downlink BPL corresponding to an uplink BPL.

Optionally, the QCL relationship may have another name, without changing the technical essence, for example, may also be referred to as a spatial QCL relationship or a reciprocal QCL relationship.

With reference to the fourth aspect and the foregoing possible implementation, in another possible implementation, before the receiving, by the UE, first indication information transmitted by the base station, the information transmission method may further include: receiving, by the UE, second indication information that is transmitted by the base station and used by the UE to divide the resource group into the at least one resource subgroup, and dividing the resource group into the at least one resource subgroup based on the second indication information.

With reference to the fourth aspect and the foregoing possible implementation, in another possible implementation, to enable the base station to configure a resource for the UE based on a capability of the UE, before the obtaining, by the UE, at least one first resource configured by a base station for the UE, the information transmission method may further include: transmitting, by the UE, capability indication information to the base station, where the capability indication information includes a maximum quantity of beams supported by the UE in a capability type, or the capability indication information includes a quantized value of a maximum quantity of beams supported by the UE in a capability type.

With reference to the fourth aspect and the foregoing possible implementation, in another possible implementation, the capability type may include a beam management stage and/or an optional range of beams. The capability type may be predefined, or may be configured by the base station.

With reference to the fourth aspect and the foregoing possible implementation, in another possible implementation, a time offset between a time unit in which a channel carrying the first indication information is located and the second resource is predefined, or is determined based on third configuration information of the base station. Optionally, the time offset may be a positive value, a negative value, or 0. The time unit may be a timeslot, a subframe, a symbol, or a mini-timeslot.

With reference to the fourth aspect and the foregoing possible implementation, in another possible implementation, a time offset between the first resource and the second resource is predefined, or is determined based on third configuration information of the base station. Optionally, the time offset may be a positive value, a negative value, or 0. The time unit may be a timeslot, a subframe, a symbol, or a mini-timeslot.

With reference to the fourth aspect and the foregoing possible implementation, in another possible implementation, a time offset between the second resource and a time unit in which a channel carrying the first indication information is located is predefined, or is determined based on fourth configuration information of the base station. Optionally, the time offset may be a positive value or 0. The time unit may be a timeslot, a subframe, a symbol, or a mini-timeslot.

With reference to the fourth aspect and the foregoing possible implementation, in another possible implementation, a time offset between the second resource and the first resource is predefined, or is determined based on third configuration information of the base station. Optionally, the time offset may be a positive value, a negative value, or 0. The time unit may be a timeslot, a subframe, a symbol, or a mini-timeslot.

According to a fifth aspect, an embodiment of the present invention provides a base station, including:

a configuration unit, configured to configure at least one first resource for a UE, where the first resource is used by the UE to transmit a target channel and/or signal; and a transmitting unit, configured to transmit first indication information to the UE, where the first indication information is used to indicate a correspondence between the first resource and a beam, and the beam is an uplink transmitting beam, or a downlink receiving beam, or a downlink transmitting beam, or an uplink receiving beam.

With reference to the fifth aspect, in a possible implementation, the at least one first resource may be included in a resource group, and the resource group may include at least one resource subgroup.

With reference to the fifth aspect and the foregoing possible implementation, in another possible implementation, the target channel and/or signal may include at least one of the following: an SRS, a PRACH, a PUSCH, a PUCCH, an uplink tracking signal, an uplink discovery signal, an uplink beam reference signal, an uplink mobility reference signal, an uplink demodulation reference signal, and an uplink phase tracking reference signal.

With reference to the fifth aspect and the foregoing possible implementation, in another possible implementation, the beam may be a port, or may be precoding.

With reference to the fifth aspect and the foregoing possible implementation, in another possible implementation, the first resource may include at least one of the following: a time domain resource, a frequency domain resource, a code domain resource, and an antenna port.

With reference to the fifth aspect and the foregoing possible implementation, in another possible implementation, the correspondence between the first resource and the beam may be indicated in the following different manners:

manner 1: the first indication information may include an identity of each first resource in the resource subgroup, and a number of a beam corresponding to the identity of each first resource;

manner 2: the first indication information may include an identity of each resource subgroup, and a number of a beam corresponding to the identity of each resource subgroup;

manner 3: the first indication information may include an identity of each resource subgroup, and a number of each beam in a beam group corresponding to the identity of each resource subgroup, and the beam group includes at least one beam (different resource subgroups may correspond to a same beam group);

manner 4: the first indication information may include an identity of each resource subgroup, and a number of a beam group corresponding to the identity of each resource subgroup (identities of different resource subgroups may correspond to a number of a same beam group);

manner 5: the first indication information may include a number of each beam in a beam group;

manner 6: the first indication information may include a number of a beam group;

manner 7: the first indication information may include an identity of each resource subgroup, and an optional range of beams corresponding to the identity of each resource subgroup;

manner 8: the first indication information may include an identity of each first resource, and a number of a beam corresponding to the identity of each first resource;

manner 9: the first indication information may include an identity of each first resource, and a number of each beam in a beam group corresponding to the identity of each first resource, where the beam group includes at least one beam (different first resources may correspond to a same beam group);

manner 10: the first indication information may include an identity of each first resource, and a number of a beam group corresponding to the identity of each first resource (identities of different first resources may correspond to a number of a same beam group); and manner 11: the first indication information may include an identity of each first resource, and an optional range of beams corresponding to the identity of each first resource.

In the manner 1, the transmitting unit uses the first indication information to indicate that, on first resources in a same resource subgroup, the UE needs to transmit target channels and/or signals by using different transmitting beams. In this case, correspondingly, a pre-definition or pre-configuration manner may be used so that, on all the first resources in the same resource subgroup, the base station receives the target channels and/or signals by using a same receiving beam.

In the manner 2 to the manner 6, the transmitting unit uses the first indication information to indicate that, on all first resources in a same resource subgroup, the UE needs to transmit target channels and/or signals by using a same transmitting beam. In this case, correspondingly, a pre-definition or pre-configuration manner may be used so that, on the first resources in the same resource subgroup, the base station receives the target channels and/or signals by using different receiving beams.

In the manner 2, if the beam is a downlink transmitting beam or an uplink receiving beam, the user equipment transmits, on each resource subgroup, the target channel and/or signal by using an uplink transmitting beam paired with the downlink transmitting beam or the uplink receiving beam.

Optionally, the first indication information may be configuration information. The configuration information may be carried in higher layer signaling.

Alternatively, the first indication information may be configuration information or a configuration indication. The configuration information is used to indicate the correspondence between the first resource and the beam (the configuration information may include a plurality of configurations simultaneously), and the configuration information may be carried in higher layer signaling. The configuration indication is used to indicate which configuration in the plurality of configurations is to be used when the UE transmits the target channel and/or signal, and the configuration indication may be carried in DCI.

With reference to the fifth aspect and the foregoing possible implementation, in another possible implementation, the transmitting unit is further configured to transmit configuration information used to indicate a correspondence between the beam and a number of the beam to the UE, where the number of the beam may be a sequence number of the beam selected by the base station.

With reference to the fifth aspect and the foregoing possible implementation, in another possible implementation, the transmitting unit is further configured to transmit, to the UE, second indication information that is used by the UE to divide the resource group into the at least one resource subgroup.

With reference to the fifth aspect and the foregoing possible implementation, in another possible implementation, to enable the base station to configure a resource for the UE based on a capability of the UE, the base station may further include a receiving unit, configured to receive capability indication information transmitted by the UE, where the capability indication information includes a maximum quantity of beams supported by the UE in a capability type, or the capability indication information includes a quantized value of a maximum quantity of beams supported by the UE in a capability type; and correspondingly, the configuration unit is specifically configured to configure the at least one first resource for the UE based on the capability indication information received by the receiving unit.

With reference to the fifth aspect and the foregoing possible implementation, in another possible implementation, the capability type may include a beam management stage and/or an optional range of beams. The capability type may be predefined, or may be configured by the base station.

According to a sixth aspect, an embodiment of the present invention provides a base station, including:

a configuration unit, configured to configure at least one first resource for a UE, where the first resource is used by the UE to transmit a target channel and/or signal; and a transmitting unit, configured to transmit first indication information to the UE, where the first indication information is used to indicate a correspondence between the first resource and a second resource.

With reference to the sixth aspect, in a possible implementation, the at least one first resource may be included in a resource group, and the resource group may include at least one resource subgroup.

With reference to the sixth aspect and the foregoing possible implementation, in another possible implementation, the target channel and/or signal may include at least one of the following: an SRS, a PRACH, a PUSCH, a PUCCH, an uplink tracking signal, an uplink discovery signal, an uplink beam reference signal, an uplink mobility reference signal, an uplink demodulation reference signal, and an uplink phase tracking reference signal.

With reference to the sixth aspect and the foregoing possible implementation, in another possible implementation, the first resource may include at least one of the following: a time domain resource, a frequency domain resource, a code domain resource, and an antenna port.

With reference to the sixth aspect and the foregoing possible implementation, in another possible implementation, the second resource may include at least one of: a time domain resource, a frequency domain resource, a code domain resource, and an antenna port that are used by the UE to transmit information to the base station before the UE transmits the target channel and/or signal; or the second resource may include at least one of: a time domain resource, a frequency domain resource, a code domain resource, and an antenna port that are used by the base station to transmit information to the UE before the UE transmits the target channel and/or signal.

With reference to the sixth aspect and the foregoing possible implementation, in another possible implementation, the first indication information may include a correspondence between each first resource in the resource subgroup and the second resource.

The transmitting unit uses the first indication information to indicate that first resources in the resource subgroup correspond to different second resources. In other words, on the first resources in the same resource subgroup, the UE needs to transmit target channels and/or signals by using different transmitting beams. In this case, correspondingly, a pre-definition or pre-configuration manner may be used so that, on all the first resources in the same resource subgroup, the base station receives the target channels and/or signals by using a same receiving beam.

With reference to the sixth aspect and the foregoing possible implementation, in another possible implementation, the first indication information may specifically include an identity of each first resource in the resource subgroup, and an identity of a second resource corresponding to the identity of each first resource; or the first indication information specifically includes information used to indicate that a QCL relationship exists between an antenna port for a signal on each first resource and an antenna port for a signal on a second resource.

With reference to the sixth aspect and the foregoing possible implementation, in another possible implementation, the first indication information may further include a correspondence between each first resource and an optional range of beams.

With reference to the sixth aspect and the foregoing possible implementation, in another possible implementation, the first indication information may include a correspondence between each resource subgroup and the second resource.

The transmitting unit uses the first indication information to indicate that all first resources in a same resource subgroup correspond to a same second resource. In other words, on all the first resources in the same resource subgroup, the UE needs to transmit target channels and/or signals by using a same transmitting beam. In this case, correspondingly, a pre-definition or pre-configuration manner may be used so that, on the first resources in the same resource subgroup, the base station receives the target channels and/or signals by using different receiving beams.

With reference to the sixth aspect and the foregoing possible implementation, in another possible implementation, the first indication information may specifically include an identity of each resource subgroup, and an identity of a second resource corresponding to the identity of each resource subgroup; or the first indication information may specifically include information used to indicate that a QCL relationship exists between an antenna port for a signal on each resource subgroup and an antenna port for a signal on a second resource.

With reference to the sixth aspect and the foregoing possible implementation, in another possible implementation, the first indication information may include a correspondence between each resource subgroup and a second-resource group, and the second-resource group includes at least one second resource. The transmitting unit uses the first indication information to indicate that all first resources in a same resource subgroup correspond to a same second resource. In other words, on all the first resources in the same resource subgroup, the UE needs to transmit target channels and/or signals by using a same transmitting beam. In this case, correspondingly, a pre-definition or pre-configuration manner may be used so that, on the first resources in the same resource subgroup, the base station receives the target channels and/or signals by using different receiving beams.

With reference to the sixth aspect and the foregoing possible implementation, in another possible implementation, the first indication information may specifically include an identity of each resource subgroup, and an identity of each second resource in a second-resource group corresponding to the identity of each resource subgroup; or the first indication information may specifically include an identity of each resource subgroup, and an identity of a second-resource group corresponding to the identity of each resource subgroup; or the first indication information may specifically include information used to indicate that a QCL relationship exists between an antenna port for a signal on each resource subgroup and an antenna port for a signal on a second-resource group.

With reference to the sixth aspect and the foregoing possible implementation, in another possible implementation, the first indication information may include an identity of each second resource in a second-resource group; or the first indication information may include an identity of a second-resource group. The transmitting unit uses the first indication information to indicate that all first resources in a same resource subgroup correspond to a same second resource. In other words, on all the first resources in the same resource subgroup, the UE needs to transmit target channels and/or signals by using a same transmitting beam. In this case, correspondingly, a pre-definition or pre-configuration manner may be used so that, on the first resources in the same resource subgroup, the base station receives the target channels and/or signals by using different receiving beams.

With reference to the sixth aspect and the foregoing possible implementation, in another possible implementation, the first indication information may further include a correspondence between each resource subgroup and an optional range of beams.

With reference to the sixth aspect and the foregoing possible implementation, in another possible implementation, the first indication information may include a correspondence between each first resource and the second resource.

With reference to the sixth aspect and the foregoing possible implementation, in another possible implementation, the first indication information may specifically include an identity of each first resource, and an identity of a second resource corresponding to the identity of each first resource; or the first indication information may specifically include information used to indicate that a QCL relationship exists between an antenna port for a signal on each first resource and an antenna port for a signal on a second resource.

With reference to the sixth aspect and the foregoing possible implementation, in another possible implementation, in a correspondence between each first resource and a second-resource group, the second-resource group includes at least one second resource.

With reference to the sixth aspect and the foregoing possible implementation, in another possible implementation, the first indication information may specifically include an identity of each first resource, and an identity of each second resource in a second-resource group corresponding to the identity of each first resource; or the first indication information may specifically include an identity of each first resource, and an identity of a second-resource group corresponding to the identity of each first resource; or the first indication information may specifically include information used to indicate that a QCL relationship exists between an antenna port for a signal on each first resource and an antenna port for a signal on a second-resource group.

With reference to the sixth aspect and the foregoing possible implementation, in another possible implementation, the first indication information may further include a correspondence between each first resource and an optional range of beams.

With reference to the sixth aspect and the foregoing possible implementation, in another possible implementation, existence of a QCL relationship means having a same antenna port parameter.

Alternatively, existence of a QCL relationship means that a same parameter exists in reference signals corresponding to antenna ports, or existence of a QCL relationship means that the user equipment may determine, based on a parameter of an antenna port, a parameter of an antenna port having the QCL relationship with the antenna port, or existence of a QCL relationship means that two antenna ports have a same parameter, or existence of a QCL relationship means that a difference between parameters of two antenna ports is less than a threshold. The parameter may be at least one of: a delay spread, a Doppler spread, a Doppler frequency shift, an average delay, an average gain, an AOA, an average AOA, an AOA spread, an AOD, an average angle of departure AOD, an AOD spread, a receive antenna spatial correlation parameter, a transmitting beam, a receiving beam, and a resource identity. The beam includes at least one of the following: precoding, a weight sequence number, and a beam sequence number. The azimuth may be a decomposition value in different dimensions, or a combination of decomposition values in different dimensions. The antenna ports are antenna ports having different antenna port numbers, and/or antenna ports having a same antenna port number and transmitting or receiving information in different time and/or frequency and/or code domain resources, and/or antenna ports having different antenna port numbers and transmitting or receiving information in different time and/or frequency and/or code domain resources. The resource identity includes a resource identity of a CSI-RS or a resource identity of an SRS.

With reference to the sixth aspect and the foregoing possible implementation, in another possible implementation, the first indication information may be configuration information. The configuration information may be carried in higher layer signaling.

Alternatively, the first indication information may be configuration information or a configuration indication. The configuration information is used to indicate the correspondence between the first resource and the beam (the configuration information may include a plurality of configurations simultaneously), and the configuration information may be carried in higher layer signaling. The configuration indication is used to indicate which configuration in the plurality of configurations is to be used when the UE transmits the target channel and/or signal, and the configuration indication may be carried in DCI.

With reference to the sixth aspect and the foregoing possible implementation, in another possible implementation, the transmitting unit is further configured to transmit, to the UE, second indication information that is used by the UE to divide the resource group into the at least one resource subgroup.

With reference to the sixth aspect and the foregoing possible implementation, in another possible implementation, to enable the base station to configure a resource for the UE based on a capability of the UE, the base station may further include a receiving unit, configured to receive capability indication information transmitted by the UE, where the capability indication information includes a maximum quantity of beams supported by the UE in a capability type, or the capability indication information includes a quantized value of a maximum quantity of beams supported by the UE in a capability type; and correspondingly, the configuration unit is specifically configured to configure the at least one first resource for the UE based on the capability indication information received by the receiving unit.

With reference to the sixth aspect and the foregoing possible implementation, in another possible implementation, the capability type may include a beam management stage and/or an optional range of beams. The capability type may be predefined, or may be configured by the base station.

According to a seventh aspect, an embodiment of the present invention provides a UE, including:

an obtaining unit, configured to obtain at least one first resource configured by a base station for the UE, where the first resource is used by the UE to transmit a target channel and/or signal; and a receiving unit, configured to receive first indication information transmitted by the base station, where the first indication information is used to indicate a correspondence between the first resource and a beam, and the beam is an uplink transmitting beam, or a downlink receiving beam, or a downlink transmitting beam, or an uplink receiving beam.

With reference to the seventh aspect, in a possible implementation, the at least one first resource may be included in a resource group, and the resource group may include at least one resource subgroup.

With reference to the seventh aspect and the foregoing possible implementation, in another possible implementation, the UE may further include:

a determining unit, configured to determine, based on the first resource obtained by the obtaining unit and the first indication information received by the receiving unit, a beam required for transmitting the target channel and/or signal, namely, an uplink transmitting beam; and a transmitting unit, configured to transmit the target channel and/or signal on the first resource and on the uplink transmitting beam determined by the determining unit.

When the beam is an uplink transmitting beam, the determining unit may directly determine, based on the first resource and the correspondence between the first resource and the beam, the uplink transmitting beam; when the beam is a downlink receiving beam, the determining unit may first determine, based on the first resource and the correspondence between the first resource and the beam, the downlink receiving beam, and then determine the uplink transmitting beam based on the downlink receiving beam by using a correspondence between uplink and downlink beams (the correspondence between the uplink and downlink beams may be obtained from reciprocity of uplink and downlink channels); or when the beam is a downlink transmitting beam, the determining unit may first determine, based on the first resource and the correspondence between the first resource and the beam, the downlink transmitting beam, then determine a downlink receiving beam based on the downlink transmitting beam by using a correspondence between uplink and downlink beams, and finally determine the uplink transmitting beam based on the downlink receiving beam by using the correspondence between the uplink and downlink beams.

With reference to the seventh aspect and the foregoing possible implementation, in another possible implementation, the target channel and/or signal may include at least one of the following: an SRS, a PRACH, a PUSCH, a PUCCH, an uplink tracking signal, an uplink discovery signal, an uplink beam reference signal, an uplink mobility reference signal, an uplink demodulation reference signal, and an uplink phase tracking reference signal.

With reference to the seventh aspect and the foregoing possible implementation, in another possible implementation, the beam may be a port, or may be precoding.

With reference to the seventh aspect and the foregoing possible implementation, in another possible implementation, the first resource may include at least one of the following: a time domain resource, a frequency domain resource, a code domain resource, and an antenna port.

With reference to the seventh aspect and the foregoing possible implementation, in another possible implementation, the first indication information may include an identity of each first resource in the resource subgroup, and a number of a beam corresponding to the identity of each first resource; and correspondingly, the determining unit is specifically configured to determine a number of a beam corresponding to an identity of the first resource, and then determine the uplink transmitting beam based on the beam corresponding to the number of the beam; or the first indication information may include an identity of each resource subgroup, and a number of a beam corresponding to the identity of each resource subgroup; and correspondingly, the determining unit is specifically configured to determine an identity of a resource subgroup to which the first resource belongs, determine a number of a beam corresponding to the identity of the resource subgroup, and then determine the uplink transmitting beam based on the beam corresponding to the number of the beam; or the first indication information may include an identity of each resource subgroup, and a number of each beam in a beam group corresponding to the identity of each resource subgroup, where the beam group includes at least one beam; and correspondingly, the determining unit is specifically configured to determine an identity of a resource subgroup to which the first resource belongs, determine a number of each beam in a beam group corresponding to the identity of the resource subgroup, and then determine the uplink transmitting beam based on a beam in the beam group; or the first indication information may include an identity of each resource subgroup, and a number of a beam group corresponding to the identity of each resource subgroup; and correspondingly, the determining unit is specifically configured to determine an identity of a resource subgroup to which the first resource belongs, determine a number of a beam group corresponding to the identity of the resource subgroup, and then determine the uplink transmitting beam based on a beam in the beam group; or the first indication information may include a number of each beam in a beam group, or the first indication information may include a number of a beam group; and correspondingly, the determining unit is specifically configured to determine the uplink transmitting beam based on a beam in the beam group, where a resource subgroup to which the first resource belongs corresponds to a beam; or the first indication information may include an identity of each resource subgroup, and an optional range of beams corresponding to the identity of each resource subgroup; and correspondingly, the determining unit is specifically configured to determine an identity of a resource subgroup to which the first resource belongs, determine an optional range of beams corresponding to the identity of the resource subgroup, and then determine the uplink transmitting beam based on the optional range of beams; or the first indication information may include an identity of each first resource, and a number of a beam corresponding to the identity of each first resource; or the first indication information may include an identity of each first resource, and a number of each beam in a beam group corresponding to the identity of each first resource, where the beam group includes at least one beam; or the first indication information may include an identity of each first resource, and a number of a beam group corresponding to the identity of each first resource; or the first indication information may include an identity of each first resource, and an optional range of beams corresponding to the identity of each first resource.

With reference to the seventh aspect and the foregoing possible implementation, in another possible implementation, the receiving unit is further configured to receive configuration information that is transmitted by the base station and used to indicate a correspondence between the beam and a number of the beam. Correspondingly, when the determining unit determines the number of the beam based on the first indication information, the determining unit may determine, based on the configuration information received by the receiving unit, the beam corresponding to the number, where the number of the beam may be a sequence number of the beam selected by the base station.

With reference to the seventh aspect and the foregoing possible implementation, in another possible implementation, the receiving unit is further configured to receive second indication information that is transmitted by the base station and used by the UE to divide the resource group into the at least one resource subgroup, and divide the resource group into the at least one resource subgroup based on the second indication information.

With reference to the seventh aspect and the foregoing possible implementation, in another possible implementation, to enable the base station to configure a resource for the UE based on a capability of the UE, the transmitting unit is further configured to transmit capability indication information to the base station, where the capability indication information includes a maximum quantity of beams supported by the UE in a capability type, or the capability indication information includes a quantized value of a maximum quantity of beams supported by the UE in a capability type.

With reference to the seventh aspect and the foregoing possible implementation, in another possible implementation, the capability type includes a beam management stage and/or an optional range of beams. The capability type may be predefined, or may be configured by the base station.

According to an eighth aspect, an embodiment of the present invention provides a UE, including:

an obtaining unit, configured to obtain at least one first resource configured by a base station for the UE, where the first resource is used by the UE to transmit a target channel and/or signal; and a receiving unit, configured to receive first indication information transmitted by the base station, where the first indication information is used to indicate a correspondence between the first resource and a second resource.

With reference to the eighth aspect, in a possible implementation, the at least one first resource may be included in a resource group, and the resource group may include at least one resource subgroup.

With reference to the eighth aspect and the foregoing possible implementation, in another possible implementation, the UE may further include: a determining unit, configured to determine the second resource based on the first resource and the first indication information, and determine, based on a beam corresponding to the second resource, a beam required for transmitting the target channel and/or signal, namely, an uplink transmitting beam; and a transmitting unit, configured to transmit the target channel and/or signal on the first resource and on the uplink transmitting beam.

With reference to the eighth aspect and the foregoing possible implementation, in another possible implementation, the target channel and/or signal may include at least one of the following: an SRS, a PRACH, a PUSCH, a PUCCH, an uplink tracking signal, an uplink discovery signal, an uplink beam reference signal, an uplink mobility reference signal, an uplink demodulation reference signal, and an uplink phase tracking reference signal.

With reference to the eighth aspect and the foregoing possible implementation, in another possible implementation, the first resource may include at least one of the following: a time domain resource, a frequency domain resource, a code domain resource, and an antenna port.

With reference to the eighth aspect and the foregoing possible implementation, in another possible implementation, the second resource may include at least one of: a time domain resource, a frequency domain resource, a code domain resource, and an antenna port that are used by the transmitting unit to transmit information to the base station before the transmitting unit transmits the target channel and/or signal; or the second resource may include at least one of: a time domain resource, a frequency domain resource, a code domain resource, and an antenna port that are used by the base station to transmit information to the UE before the transmitting unit transmits the target channel and/or signal.

With reference to the eighth aspect and the foregoing possible implementation, in another possible implementation, the first indication information may include a correspondence between each first resource in the resource subgroup and the second resource.

With reference to the eighth aspect and the foregoing possible implementation, in another possible implementation, the first indication information may specifically include an identity of each first resource in the resource subgroup, and an identity of a second resource corresponding to the identity of each first resource; or the first indication information specifically includes information used to indicate that a QCL relationship exists between an antenna port for a signal on each first resource and an antenna port for a signal on a second resource.

With reference to the eighth aspect and the foregoing possible implementation, in another possible implementation, the first indication information may further include a correspondence between each first resource and an optional range of beams.

With reference to the eighth aspect and the foregoing possible implementation, in another possible implementation, the first indication information may include a correspondence between each resource subgroup and the second resource.

With reference to the eighth aspect and the foregoing possible implementation, in another possible implementation, the first indication information may specifically include an identity of each resource subgroup, and an identity of a second resource corresponding to the identity of each resource subgroup; or the first indication information may specifically include information used to indicate that a QCL relationship exists between an antenna port for a signal on each resource subgroup and an antenna port for a signal on a second resource.

With reference to the eighth aspect and the foregoing possible implementation, in another possible implementation, the first indication information may include a correspondence between each resource subgroup and a second-resource group, and the second-resource group includes at least one second resource.

With reference to the eighth aspect and the foregoing possible implementation, in another possible implementation, the first indication information may specifically include an identity of each resource subgroup, and an identity of each second resource in a second-resource group corresponding to the identity of each resource subgroup; or the first indication information may specifically include an identity of each resource subgroup, and an identity of a second-resource group corresponding to the identity of each resource subgroup; or the first indication information may specifically include information used to indicate that a QCL relationship exists between an antenna port for a signal on each resource subgroup and an antenna port for a signal on a second-resource group.

With reference to the eighth aspect and the foregoing possible implementation, in another possible implementation, the first indication information may include an identity of each second resource in a second-resource group; or the first indication information may include an identity of a second-resource group.

With reference to the eighth aspect and the foregoing possible implementation, in another possible implementation, the first indication information may further include a correspondence between each resource subgroup and an optional range of beams.

With reference to the eighth aspect and the foregoing possible implementation, in another possible implementation, the first indication information may include a correspondence between each first resource and the second resource.

With reference to the eighth aspect and the foregoing possible implementation, in another possible implementation, the first indication information may specifically include an identity of each first resource, and an identity of a second resource corresponding to the identity of each first resource; or the first indication information may specifically include information used to indicate that a QCL relationship exists between an antenna port for a signal on each first resource and an antenna port for a signal on a second resource.

With reference to the eighth aspect and the foregoing possible implementation, in another possible implementation, in a correspondence between each first resource and a second-resource group, the second-resource group includes at least one second resource.

With reference to the eighth aspect and the foregoing possible implementation, in another possible implementation, the first indication information may specifically include an identity of each first resource, and an identity of each second resource in a second-resource group corresponding to the identity of each first resource; or the first indication information may specifically include an identity of each first resource, and an identity of a second-resource group corresponding to the identity of each first resource; or the first indication information may specifically include information used to indicate that a QCL relationship exists between an antenna port for a signal on each first resource and an antenna port for a signal on a second-resource group.

With reference to the eighth aspect and the foregoing possible implementation, in another possible implementation, the first indication information may further include a correspondence between each first resource and an optional range of beams.

With reference to the eighth aspect and the foregoing possible implementation, in another possible implementation, existence of a QCL relationship means having a same antenna port parameter.

Alternatively, existence of a QCL relationship means that a same parameter exists in reference signals corresponding to antenna ports, or existence of a QCL relationship means that the user equipment may determine, based on a parameter of an antenna port, a parameter of an antenna port having the QCL relationship with the antenna port, or existence of a QCL relationship means that two antenna ports have a same parameter, or existence of a QCL relationship means that a difference between parameters of two antenna ports is less than a threshold. The parameter may be at least one of: a delay spread, a Doppler spread, a Doppler frequency shift, an average delay, an average gain, an angle of arrival AOA, an average AOA, an AOA spread, an angle of departure AOD, an average angle of departure AOD, an AOD spread, a receive antenna spatial correlation parameter, a transmitting beam, a receiving beam, and a resource identity. The beam includes at least one of the following: precoding, a weight sequence number, and a beam sequence number. The azimuth may be a decomposition value in different dimensions, or a combination of decomposition values in different dimensions. The antenna ports are antenna ports having different antenna port numbers, and/or antenna ports having a same antenna port number and transmitting or receiving information in different time and/or frequency and/or code domain resources, and/or antenna ports having different antenna port numbers and transmitting or receiving information in different time and/or frequency and/or code domain resources. The resource identity includes a resource identity of a CSI-RS or a resource identity of an SRS.

With reference to the eighth aspect and the foregoing possible implementation, in another possible implementation, the receiving unit is further configured to receive second indication information that is transmitted by the base station and used by the UE to divide the resource group into the at least one resource subgroup, and divide the resource group into the at least one resource subgroup based on the second indication information.

With reference to the eighth aspect and the foregoing possible implementation, in another possible implementation, to enable the base station to configure a resource for the UE based on a capability of the UE, the transmitting unit is further configured to transmit capability indication information to the base station, where the capability indication information includes a maximum quantity of beams supported by the UE in a capability type, or the capability indication information includes a quantized value of a maximum quantity of beams supported by the UE in a capability type.

With reference to the eighth aspect and the foregoing possible implementation, in another possible implementation, the capability type may include a beam management stage and/or an optional range of beams. The capability type may be predefined, or may be configured by the base station.

According to a ninth aspect, an embodiment of the present invention provides a capability reporting method, including:

transmitting, by a UE, capability indication information to a base station based on a capability type, where the capability indication information includes a maximum quantity of beams supported by the UE in the capability type, or the capability indication information includes a quantized value of a maximum quantity of beams supported by the UE in the capability type.

In the capability reporting method provided by this embodiment of the present invention, the UE transmits, to the base station based on the capability type, the capability indication information including the maximum quantity of beams or the quantized value of the maximum quantity of beams supported by the UE in the capability type, so that the base station can allocate a first resource to the UE based on the capability indication information of the UE. This avoids resource waste caused by allocation of excessive resources to the UE, or a problem of incomplete beam search caused by allocation of insufficient first resources to the UE.

With reference to the ninth aspect, in a possible implementation, the capability type includes a beam management stage and/or an optional range of beams, and the beam is a port or precoding. The capability type may be predefined, or may be configured by the base station.

According to a tenth aspect, an embodiment of the present invention provides a capability reporting method, including:

receiving, by a base station, capability indication information transmitted by a UE, where the capability indication information includes a maximum quantity of beams supported by the UE in a capability type, or the capability indication information includes a quantized value of a maximum quantity of beams supported by the UE in a capability type.

In the capability reporting method provided by this embodiment of the present invention, the base station receives the capability indication information transmitted by the UE and including the maximum quantity of beams or the quantized value of the maximum quantity of beams supported by the UE in the capability type, so as to allocate a first resource to the UE based on the capability indication information of the UE. This avoids resource waste caused by allocation of excessive resources to the UE, or a problem of incomplete beam search caused by allocation of insufficient first resources to the UE.

With reference to the tenth aspect, in a possible implementation, the capability type includes a beam management stage and/or an optional range of beams, and the beam is a port or precoding. The capability type may be predefined, or may be configured by the base station.

According to an eleventh aspect, an embodiment of the present invention provides a UE, including:

a transmitting unit, configured to transmit capability indication information to a base station based on a capability type, where the capability indication information includes a maximum quantity of beams supported by the UE in the capability type, or the capability indication information includes a quantized value of a maximum quantity of beams supported by the UE in the capability type.

With reference to the eleventh aspect, in a possible implementation, the capability type includes a beam management stage and/or an optional range of beams, and the beam is a port or precoding. The capability type may be predefined, or may be configured by the base station.

According to a twelfth aspect, an embodiment of the present invention provides a base station, including:

a receiving unit, configured to receive capability indication information transmitted by a UE, where the capability indication information includes a maximum quantity of beams supported by the UE in a capability type, or the capability indication information includes a quantized value of a maximum quantity of beams supported by the UE in a capability type.

With reference to the twelfth aspect, in a possible implementation, the capability type includes a beam management stage and/or an optional range of beams, and the beam is a port or precoding. The capability type may be predefined, or may be configured by the base station.

According to a thirteenth aspect, an embodiment of the present invention provides a resource indication method, including:

transmitting, by a base station, indication information to a UE, where the indication information includes a number of a beam and an identity of a resource corresponding to the number of the beam, or a number of a resource and an identity of the resource corresponding to the number of the resource.

In the resource indication method provided by this embodiment of the present invention, the base station transmits, to the UE, the indication information including the number of the beam and the identity of the resource corresponding to the number of the beam, or the base station transmits, to the UE, the indication information including the number of the resource and the identity of the resource corresponding to the number of the resource, so that the UE determines, based on the indication information, a beam or a candidate set of beams required for transmitting information, and transmits the information by using the determined beam, so as to implement beamforming. The base station may number only some resource identities, so as to reduce signaling overheads when the base station indicates the number of the beam or the number of the resource.

With reference to the thirteenth aspect, in a possible implementation, the beam may be a port, or may be precoding.

With reference to the thirteenth aspect and the foregoing possible implementation, in another possible implementation, the resource may include at least one of the following: a time domain resource, a frequency domain resource, a code domain resource, and an antenna port.

According to a fourteenth aspect, an embodiment of the present invention provides a resource indication method, including:

receiving, by a UE, indication information transmitted by a base station, where the indication information includes a number of a beam and an identity of a resource corresponding to the number of the beam, or a number of a resource and an identity of the resource corresponding to the number of the resource.

In the resource indication method provided by this embodiment of the present invention, the UE receives the indication information transmitted by the base station, where the indication information includes the number of the beam and the identity of the resource corresponding to the number of the beam, or the number of the resource and the identity of the resource corresponding to the number of the resource, so that the UE can determine, based on the indication information, a beam or a candidate set of beams required for transmitting information, and transmit the information by using the determined beam, so as to implement beamforming. The base station may number only some resource identities, so as to reduce signaling overheads when the base station indicates the number of the beam or the number of the resource.

With reference to the fourteenth aspect, in a possible implementation, the beam may be a port, or may be precoding.

With reference to the fourteenth aspect and the foregoing possible implementation, in another possible implementation, the resource may include at least one of the following: a time domain resource, a frequency domain resource, a code domain resource, and an antenna port.

According to a fifteenth aspect, an embodiment of the present invention provides a base station, including:

a transmitting unit, configured to transmit indication information to a UE, where the indication information includes a number of a beam and an identity of a resource corresponding to the number of the beam, or a number of a resource and an identity of the resource corresponding to the number of the resource.

With reference to the fifteenth aspect, in a possible implementation, the beam may be a port, or may be precoding.

With reference to the fifteenth aspect and the foregoing possible implementation, in another possible implementation, the resource may include at least one of the following: a time domain resource, a frequency domain resource, a code domain resource, and an antenna port.

According to a sixteenth aspect, an embodiment of the present invention provides a UE, including:

a receiving unit, configured to receive indication information transmitted by a base station, where the indication information includes a number of a beam and an identity of a resource corresponding to the number of the beam, or a number of a resource and an identity of the resource corresponding to the number of the resource.

With reference to the sixteenth aspect, in a possible implementation, the beam may be a port, or may be precoding.

With reference to the sixteenth aspect and the foregoing possible implementation, in another possible implementation, the resource may include at least one of the following: a time domain resource, a frequency domain resource, a code domain resource, and an antenna port.

According to a seventeenth aspect, an embodiment of the present invention provides a base station, including a processor, a memory, and a transceiver, where the memory is configured to store a computer-executable instruction; and when the base station runs, the processor executes the computer-executable instruction stored in the memory, so that the base station performs the information transmission method in any one of the first aspect and the possible implementations of the first aspect, or performs the information transmission method in any one of the second aspect and the possible implementations of the second aspect, or performs the capability reporting method in the tenth aspect or the possible implementation of the tenth aspect, or performs the resource indication transmission method in any one of the thirteenth aspect and the possible implementations of the thirteenth aspect.

According to an eighteenth aspect, an embodiment of the present invention provides a UE, including a processor, a memory, and a transceiver, where the memory is configured to store a computer-executable instruction; and when the UE runs, the processor executes the computer-executable instruction stored in the memory, so that the UE performs the information transmission method in any one of the third aspect and the possible implementations of the third aspect, or performs the information transmission method in any one of the fourth aspect and the possible implementations of the fourth aspect, or performs the capability reporting method in the ninth aspect or the possible implementation of the ninth aspect, or performs the resource indication transmission method in any one of the fourteenth aspect and the possible implementations of the fourteenth aspect.

According to a nineteenth aspect, an embodiment of the present invention provides an information transmission method, including:

configuring, by a base station, at least one first resource for a user equipment UE, where the first resource is used by the UE to transmit a first channel and/or signal on a first antenna port;

transmitting, by the base station, first indication information to the UE, where the first indication information is used to indicate a correspondence between the first resource and a second resource; and receiving, by the base station on the second resource, a second channel and/or signal transmitted by the UE on a second antenna port, and receiving, by the base station, the first channel and/or signal transmitted by the UE on the first antenna port, where a quasi co-location QCL relationship exists between the first antenna port and the second antenna port, or a beam for transmitting the first channel and/or signal by the UE is the same as a beam for transmitting the second channel and/or signal by the UE; or transmitting, by the base station, a third channel and/or signal on the second resource and on a third antenna port to the UE, and receiving, by the base station, the first channel and/or signal transmitted by the UE on the first antenna port, where a quasi co-location QCL relationship exists between the first antenna port and the third antenna port, or a beam for transmitting the first channel and/or signal by the UE corresponds to a beam for receiving the third channel and/or signal by the UE.

According to a twentieth aspect, an embodiment of the present invention provides an information transmission method, including:

obtaining, by a user equipment UE, at least one first resource configured by a base station for the UE, where the first resource is used by the UE to transmit a first channel and/or signal on a first antenna port;

receiving, by the UE, first indication information transmitted by the base station, where the first indication information is used to indicate a correspondence between the first resource and a second resource; and transmitting, by the UE, a second channel and/or signal on the second resource and on a second antenna port to the base station, and transmitting, by the UE, the first channel and/or signal on the first antenna port to the base station, where a quasi co-location QCL relationship exists between the first antenna port and the second antenna port, or a beam for transmitting the first channel and/or signal by the UE is the same as a beam for transmitting the second channel and/or signal by the UE; or receiving, by the UE, a third channel and/or signal transmitted by the base station on the second resource and on a third antenna port, and transmitting, by the UE, the first channel and/or signal on the first antenna port to the base station, where a quasi co-location QCL relationship exists between the first antenna port and the third antenna port, or a beam for transmitting the first channel and/or signal by the UE corresponds to a beam for receiving the third channel and/or signal by the UE.

According to a twenty-first aspect, an embodiment of the present invention provides a base station, including a configuration unit, a transmitting unit, and a receiving unit, where the configuration unit is configured to configure at least one first resource for a user equipment UE, where the first resource is used by the UE to transmit a first channel and/or signal on a first antenna port;

the transmitting unit is configured to transmit first indication information to the UE, where the first indication information is used to indicate a correspondence between the first resource and a second resource; and the receiving unit is configured to receive, on the second resource, a second channel and/or signal transmitted by the UE on a second antenna port, and the receiving unit is further configured to receive the first channel and/or signal transmitted by the UE on the first antenna port, where a quasi co-location QCL relationship exists between the first antenna port and the second antenna port, or a beam for transmitting the first channel and/or signal by the UE is the same as a beam for transmitting the second channel and/or signal by the UE; or the transmitting unit is configured to transmit a third channel and/or signal on the second resource and on a third antenna port to the UE, and the receiving unit is further configured to receive the first channel and/or signal transmitted by the UE on the first antenna port, where a quasi co-location QCL relationship exists between the first antenna port and the third antenna port, or a beam for transmitting the first channel and/or signal by the UE corresponds to a beam for receiving the third channel and/or signal by the UE.

According to a twenty-second aspect, an embodiment of the present invention provides a user equipment UE, including an obtaining unit, a receiving unit, and a transmitting unit, where the obtaining unit is configured to obtain at least one first resource configured by a base station for the UE, where the first resource is used by the UE to transmit a first channel and/or signal on a first antenna port;

the receiving unit is configured to receive first indication information transmitted by the base station, where the first indication information is used to indicate a correspondence between the first resource and a second resource; and the transmitting unit is configured to transmit a second channel and/or signal on the second resource and on a second antenna port to the base station, and the transmitting unit is further configured to transmit the first channel and/or signal on the first antenna port to the base station, where a quasi co-location QCL relationship exists between the first antenna port and the second antenna port, or a beam for transmitting the first channel and/or signal by the transmitting unit is the same as a beam for transmitting the second channel and/or signal by the transmitting unit; or the receiving unit is configured to receive a third channel and/or signal transmitted by the base station on the second resource and on a third antenna port, and the transmitting unit is configured to transmit the first channel and/or signal on the first antenna port to the base station, where a quasi co-location QCL relationship exists between the first antenna port and the third antenna port, or a beam for transmitting the first channel and/or signal by the transmitting unit corresponds to a beam for receiving the third channel and/or signal by the receiving unit.

According to a twenty-third aspect, an embodiment of the present invention provides a computer storage medium, configured to store a computer software instruction used by the foregoing base station, where the computer software instruction includes a program used to perform the foregoing information transmission method, capability reporting method, or resource indication method.

According to a twenty-fourth aspect, an embodiment of the present invention provides a computer storage medium, configured to store a computer software instruction used by the foregoing UE, where the computer software instruction includes a program used to perform the foregoing information transmission method, capability reporting method, or resource indication method.

BRIEF DESCRIPTION OF DRAWINGS

FIG. 5-1 is a schematic diagram of a relationship between resources and timeslots according to an embodiment of the present invention;

FIG. 5-2 is a schematic diagram of another relationship between resources and timeslots according to an embodiment of the present invention;

FIG. 5-3 is a schematic diagram of another relationship between resources and timeslots according to an embodiment of the present invention;

FIG. 5-4 is a schematic diagram of another relationship between resources and timeslots according to an embodiment of the present invention;

FIG. 5-5 is a schematic diagram of another relationship between resources and timeslots according to an embodiment of the present invention;

FIG. 5-6 is a schematic diagram of another relationship between resources and timeslots according to an embodiment of the present invention;

FIG. 6 is a flowchart of another information transmission method according to an embodiment of the present invention;

DESCRIPTION OF EMBODIMENTS

Figure 1:
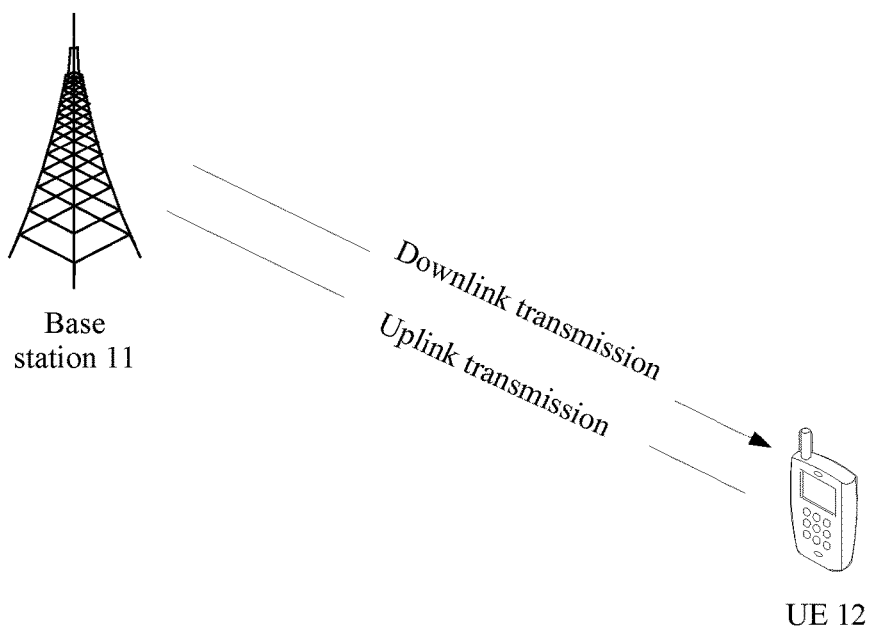
FIG. 1 is a simplified schematic diagram of a communications system to which an embodiment of the present invention may be applied according to an embodiment of the present invention.

To implement beamforming on an SRS, an embodiment of the present invention provides an information transmission method. A base station configures at least one first resource for a UE, where the first resource is used by the UE to transmit a target channel and/or signal; and the base station transmits, to the UE, first indication information used to indicate a correspondence between the first resource and a beam or used to indicate a correspondence between the first resource and a second resource, so that the UE can determine, based on the first resource and the first indication information, a beam required for transmitting the target channel and/or signal. Therefore, when the target channel or signal or both are an SRS, the UE can transmit the SRS by using the determined beam required for transmitting the target channel and/or signal, so as to implement beamforming on the SRS.

The beam may be identified by using at least one of the following: a port, a precoding matrix, and a spatial feature parameter; or the beam may be a spatial filter.

Optionally, the beam may also be understood as a spatial resource, and may be a transmit or receive precoding vector having an energy transmission direction. In addition, the transmit or receive precoding vector can be identified by using index information. The energy transmission direction may indicate that a signal that is received in a spatial position and has experienced precoding processing by using the precoding vector has relatively good receive power, for example, satisfies a receive demodulation signal-to-noise ratio. The energy transmission direction may also indicate that same signals transmitted from different spatial positions and received by using the precoding vector have different receive power.

Optionally, a same communications device (such as a terminal device or a network device) may have different precoding vectors, and different devices may also have different precoding vectors, which correspond to different beams.

With respect to a configuration or capability of a communications device, the communications device may use one or more of different precoding vectors at a same time. In other words, one or more beams may be formed at the same time. Beam information may be identified by using index information. Optionally, the index information may correspond to a resource identity (ID) configured for a UE. For example, the index information may correspond to a configured ID or resource of a channel state information reference signal (CSI-RS), or may correspond to a configured ID or resource of an uplink sounding reference signal (SRS). Alternatively, optionally, the index information may be index information explicitly or implicitly carried by a signal or channel that is carried on a beam. For example, the index information may be index information of the beam, indicated by a synchronization signal or a broadcast channel that is transmitted by using the beam.

A beam pair may include a transmitting beam of a transmit end and a receiving beam of a receive end, also referred to as an uplink beam and a downlink beam. For example, the beam pair may include a transmitting beam of the base station and a receiving beam of the UE, or a transmitting beam of the UE and a receiving beam of the base station.

The target channel and/or signal in this embodiment of the present invention may include at least one of the following: an SRS, a PRACH, a PUSCH, a PUCCH, an uplink tracking signal, an uplink discovery signal, an uplink beam reference signal, an uplink mobility reference signal, an uplink demodulation reference signal, and an uplink phase tracking reference signal. The sounding reference signal is used to obtain channel quality information and/or is used for beam management; the PRACH is used for uplink access; the PUSCH is used at least for uplink data transmission; the PUCCH is used at least for uplink control information transmission; the uplink demodulation reference signal is used for demodulation of an uplink channel; the uplink tracking signal, the uplink discovery signal, the uplink beam reference signal, and the uplink mobility reference signal are used for beam management and/or radio resource management (RRM) measurement; and the uplink phase tracking reference signal is used for phase tracking.

A quasi co-location (QCL) relationship in this embodiment of the present invention may have the following meaning:

Existence of a QCL relationship means having a same antenna port parameter; or existence of a QCL relationship means that a same parameter exists in reference signals corresponding to antenna ports, or existence of a QCL relationship means that the user equipment may determine, based on a parameter of an antenna port, a parameter of an antenna port having the QCL relationship with the antenna port, or existence of a QCL relationship means that two antenna ports have a same parameter, or existence of a QCL relationship means that a difference between parameters of two antenna ports is less than a threshold. The parameter may be at least one of: a delay spread, a Doppler spread, a Doppler frequency shift, an average delay, an average gain, an angle of arrival (AOA), an average AOA, an AOA spread, an angle of departure (AOD), an average angle of departure AOD, an AOD spread, a receive antenna spatial correlation parameter, a transmit antenna spatial correlation parameter, a transmitting beam, a receiving beam, a resource identity, a transmit end power azimuth spectrum (PAS), a receive end PAS, and a PAS. The beam includes at least one of the following: precoding, a weight sequence number, a beam sequence number, and a spatial filter. The azimuth may be a decomposition value in different dimensions, or a combination of decomposition values in different dimensions. The antenna ports are antenna ports having different antenna port numbers, and/or antenna ports having a same antenna port number and transmitting or receiving information in different time and/or frequency and/or code domain resources, and/or antenna ports having different antenna port numbers and transmitting or receiving information in different time and/or frequency and/or code domain resources. The resource identity includes a resource identity of a channel state information reference signal (CSI-RS), or a resource identity of an SRS, used to indicate a beam on a resource, or a resource identity of a synchronization signal or a synchronization signal block, or a resource identity of a preamble sequence transmitted on a PRACH, or a resource identity of a DMRS, used to indicate a beam on a resource. For example, a spatial QCL relationship between a port for a downlink signal and another port for a downlink signal or between a port for an uplink signal and another port for an uplink signal may be that the two signals may have a same AOA or AOD, used to indicate that the two signals have a same receiving beam or transmitting beam. For another example, a QCL relationship between a downlink signal and an uplink signal or between a port for an uplink signal and a port for a downlink signal may be that a correspondence exists between an AOA of one signal and an AOD of the other signal in the two signals, or that a correspondence exists between an AOD of one signal and an AOA of the other signal in the two signals. In other words, by using a beam correspondence, an uplink transmitting beam may be determined based on a downlink receiving beam, or a downlink receiving beam may be determined based on an uplink transmitting beam.

Signals transmitted on ports having the QCL relationship may also be understood as having a corresponding beam, where the corresponding beam includes at least one of the following: a same receiving beam, a same transmitting beam, a transmitting beam corresponding to a receiving beam (corresponding to a reciprocity scenario), and a receiving beam corresponding to a transmitting beam (corresponding to a reciprocity scenario).

Signals transmitted on ports having the QCL relationship may also be understood as signals received or transmitted by using a same spatial filter. The spatial filter may be at least one of the following: precoding, a weight of an antenna port, phase deflection of an antenna port, and an amplitude gain of an antenna port.

Signals transmitted on ports having the QCL relationship may also be understood as having a corresponding beam pair link (BPL), where the corresponding BPL includes at least one of the following: a same downlink BPL, a same uplink BPL, an uplink BPL corresponding to a downlink BPL, and a downlink BPL corresponding to an uplink BPL.

Optionally, the QCL relationship may have another name, without changing the technical essence, for example, may also be referred to as a spatial QCL relationship or a reciprocal QCL relationship.

The first resource in this embodiment of the present invention may include at least one of the following: a time domain resource, a frequency domain resource, a code domain resource, and an antenna port.

The second resource in this embodiment of the present invention may include at least one of: a time domain resource, a frequency domain resource, a code domain resource, and an antenna port that are used by the UE to transmit information to the base station before the UE transmits the target channel and/or signal; or the second resource may include at least one of: a time domain resource, a frequency domain resource, a code domain resource, and an antenna port that are used by the base station to transmit information to the UE before the UE transmits the target channel and/or signal.

Optionally, the second resource in this embodiment of the present invention may be a resource used to transmit at least one of the following channels and/or signals: an SRS, a PRACH, a PUSCH, a PUCCH, an uplink tracking signal, an uplink discovery signal, an uplink beam reference signal, an uplink mobility reference signal, an uplink demodulation reference signal, a primary synchronization signal, a secondary synchronization signal, a synchronization signal block, a demodulation reference signal of a physical broadcast channel, a CSI-RS, a tracking reference signal (TRS), a phase tracking reference signal (PT-RS), a demodulation reference signal of a physical downlink control channel, and a demodulation reference signal of a physical downlink shared channel. Optionally, the physical downlink control channel may be a control resource set (CORESET), or may be a physical downlink control channel carrying a random access response or control information of system information. Optionally, the physical downlink shared channel may be a physical downlink shared channel carrying system information.

The following describes the embodiments of the present invention in detail with reference to the accompanying drawings.

FIG. 1 is a simplified schematic diagram of a communications system to which an embodiment of the present invention may be applied. As shown in FIG. 1, the communications system may include a base station 11 and UE 12.

The communications system may be an LTE system, a future system evolved from an LTE system, a Wireless Fidelity (Wi-Fi) system, a Worldwide Interoperability for Microwave Access (WiMAX) system, a 3GPP related cellular system, or the like.

The base station 11 may be a wireless communications base station (BS), a base station controller, a transmission reception point (TRP), a gNB, or the like. The base station 11 is an apparatus deployed in a radio access network to provide wireless communication functions for the UE 12. Main functions of the base station 11 are: performing radio resource management, compressing an Internet Protocol (IP) header, encrypting a data stream of the user equipment, selecting a mobility management entity (MME) when the UE 12 is attached, routing use plane data to a serving gateway (SGW), organizing and transmitting a paging message, organizing and transmitting a broadcast message, performing measurement and measurement report configuration for purposes of mobility or scheduling, and the like. The base station 11 may include a macro base station, a micro base station, a relay station, an access point, and the like in various forms. In systems using different radio access technologies, a name of a device having the functions of the base station may vary. For example, the device is referred to as an evolved NodeB (eNB or eNodeB) in the LTE system, or is referred to as a NodeB in a 3rd generation telecommunications technology (3G) system, or the like. With evolution of communications technologies, the name "base station" may change. In addition, in another possible case, the base station 11 may be another apparatus providing the wireless communication functions for the UE 12. For ease of description, in this embodiment of the present invention, the apparatus providing the wireless communication functions for the UE 12 is referred to as the base station 11.

The UE 12 may include various handheld devices having wireless communication functions (such as a mobile phone, an intelligent terminal, a multimedia device, or a media streaming device), an in-vehicle device, a wearable device, a computing device, or another processing device connected to a wireless modem, a mobile station (MS) or a terminal device in various forms, and the like. For ease of description, the devices mentioned above are collectively referred to as the UE 12.

Figure 2:
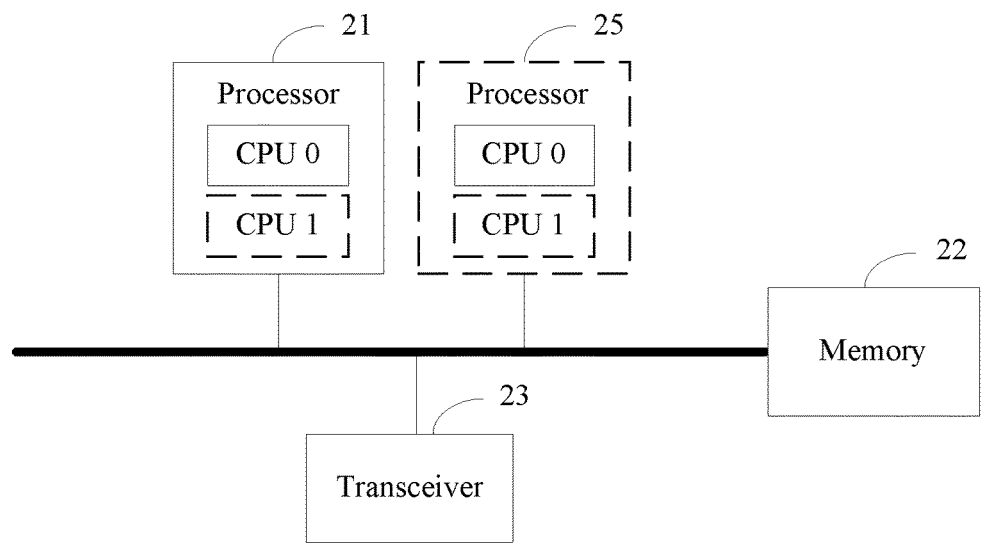
FIG. 2 is a schematic structural diagram of a base station according to an embodiment of the present invention.

FIG. 2 is a schematic structural diagram of a base station according to an embodiment of the present invention. As shown in FIG. 2, the base station may include a processor 21, a memory 22, and a transceiver 23.

The following describes each component of the base station in detail with reference to FIG. 2.

The processor 21 may be one processor, or may be a collective term for a plurality of processing elements. For example, the processor 21 may be a general-purpose central processing unit (CPU), an application-specific integrated circuit (ASIC), or one or more integrated circuits for controlling program execution in the solutions of the present invention, for example, one or more digital signal processors (DSPs), or one or more field programmable gate arrays (FPGA). The processor 21 may perform various functions of a base station by running or executing a software program stored in the memory 22 and invoking data stored in the memory 22.

In specific implementation, in an embodiment, the processor 21 may include one or more CPUs. For example, as shown in FIG. 2, the processor 21 includes a CPU 0 and a CPU 1.

In specific implementation, in an embodiment, the base station may include a plurality of processors. For example, as shown in FIG. 2, the base station includes the processor 21 and a processor 25. Each of the processors may be a single-CPU processor, or may be a multi-CPU processor. The processor herein may be one or more devices, circuits, and/or processing cores used for processing data (for example, a computer program instruction).

The memory 22 may be a read-only memory (ROM) or another type of static storage device capable of storing static information and instructions, a random access memory (RAM) or another type of dynamic storage device capable of storing information and instructions, or may be an electrically erasable programmable read-only memory (EEPROM), a compact disc read-only memory (CD-ROM), or other compact disc storage or optical disc storage (including a compressed optical disc, a laser disc, an optical disc, a digital versatile disc, a blue-ray optical disc, and the like), a magnetic disk storage medium or another magnetic storage device, or any other medium capable of carrying or storing expected program code in a form of instructions or data structures and capable of being accessed by a computer, but is not limited thereto. The memory may exist independently, and is connected to the processor by using a bus. The memory may also be integrated with the processor.

The memory 22 is configured to store application program code used to execute the solutions of the present invention, where the application program code is executed by the processor 21. The processor 21 is configured to execute the application program code stored in the memory 22.

The transceiver 23 is configured to communicate with another device or a communications network, such as an Ethernet, a radio access network (RAN), or a wireless local area network (WLAN). In this embodiment of the present invention, the transceiver 23 may include a part or an entirety of a baseband processor, and may further optionally include a radio frequency (RF) processor. The RF processor is configured to transmit and receive RF signals. The baseband processor is configured to implement processing of a baseband signal converted from an RF signal or processing of a baseband signal to be converted into an RF signal.

Figure 3:
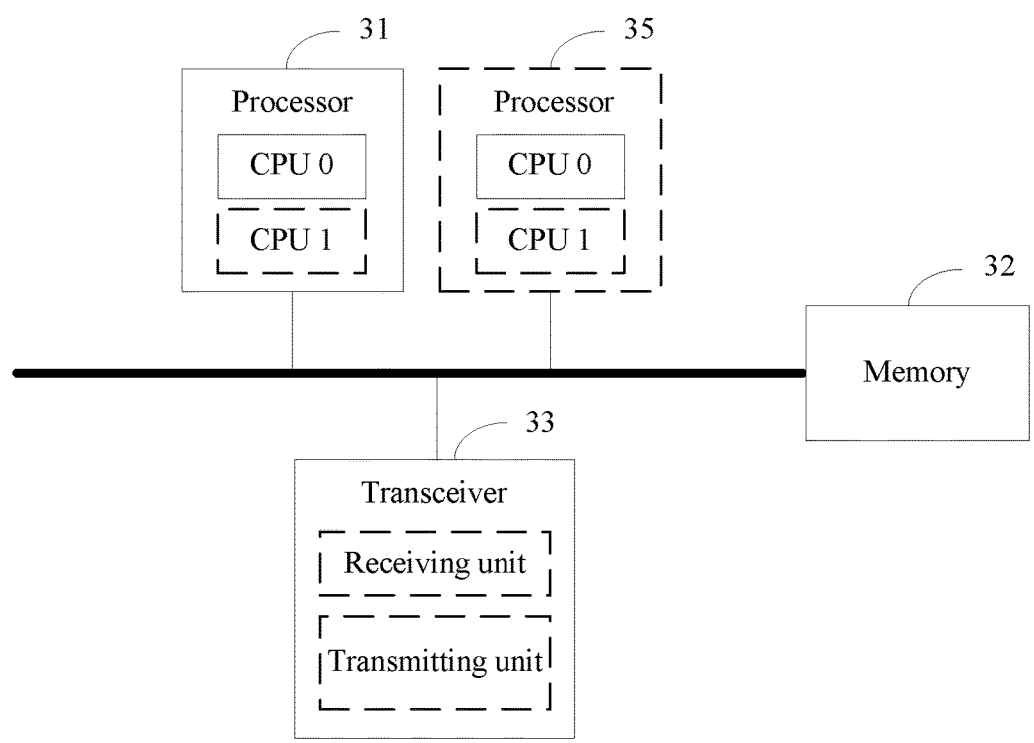
FIG. 3 is a schematic structural diagram of a UE according to an embodiment of the present invention.

FIG. 3 is a schematic structural diagram of a UE according to an embodiment of the present invention. As shown in FIG. 3, the UE may include a processor 31, a memory 32, and a transceiver 33.

The following describes each component of the UE in detail with reference to FIG. 3.

The processor 31 may be one processor, or may be a collective term for a plurality of processing elements. For example, the processor 31 may be a general-purpose CPU, an ASIC, or one or more integrated circuits for controlling program execution in the solutions of the present invention, for example, one or more DSPs, or one or more FPGAs. The processor 31 may perform various functions of the terminal by running or executing a software program stored in the memory 32 and invoking data stored in the memory 32.

In specific implementation, in an embodiment, the processor 31 may include one or more CPUs. For example, as shown in FIG. 3, the processor 31 includes a CPU 0 and a CPU 1.

In specific implementation, in an embodiment, the UE may include a plurality of processors. For example, as shown in FIG. 3, the UE includes the processor 31 and a processor 35. Each of the processors may be a single-CPU processor, or may be a multi-CPU processor. The processor herein may be one or more devices, circuits, and/or processing cores used for processing data (for example, a computer program instruction).

The memory 32 may be a ROM or another type of static storage device capable of storing static information and instructions, or a RAM or another type of dynamic storage device capable of storing information and instructions, or may be an EEPROM, a CD-ROM, or other compact disc storage or optical disc storage (including a compressed optical disc, a laser disc, an optical disc, a digital versatile disc, a Blu-ray disc, and the like), a magnetic disk storage medium or another magnetic storage device, or any other medium capable of carrying or storing expected program code in a form of instructions or data structures and capable of being accessed by a computer, but is not limited thereto. The memory may exist independently, and is connected to the processor by using a bus. The memory may also be integrated with the processor.

The transceiver 33 is configured to communicate with another device or a communications network, such as an Ethernet, an RAN, or a WLAN. The transceiver 33 may include a receiving unit for implementing a receiving function and a transmitting unit for implementing a transmitting function.

A structure of the device shown in FIG. 3 does not constitute a limitation on the UE. A quantity of components included may be greater or less than that shown in the figure, or some components are combined, or component arrangements are different. Although not shown, the UE may further include a battery, a camera, a Bluetooth module, a GPS module, a display, and the like. Details are not described herein.

Figure 4:
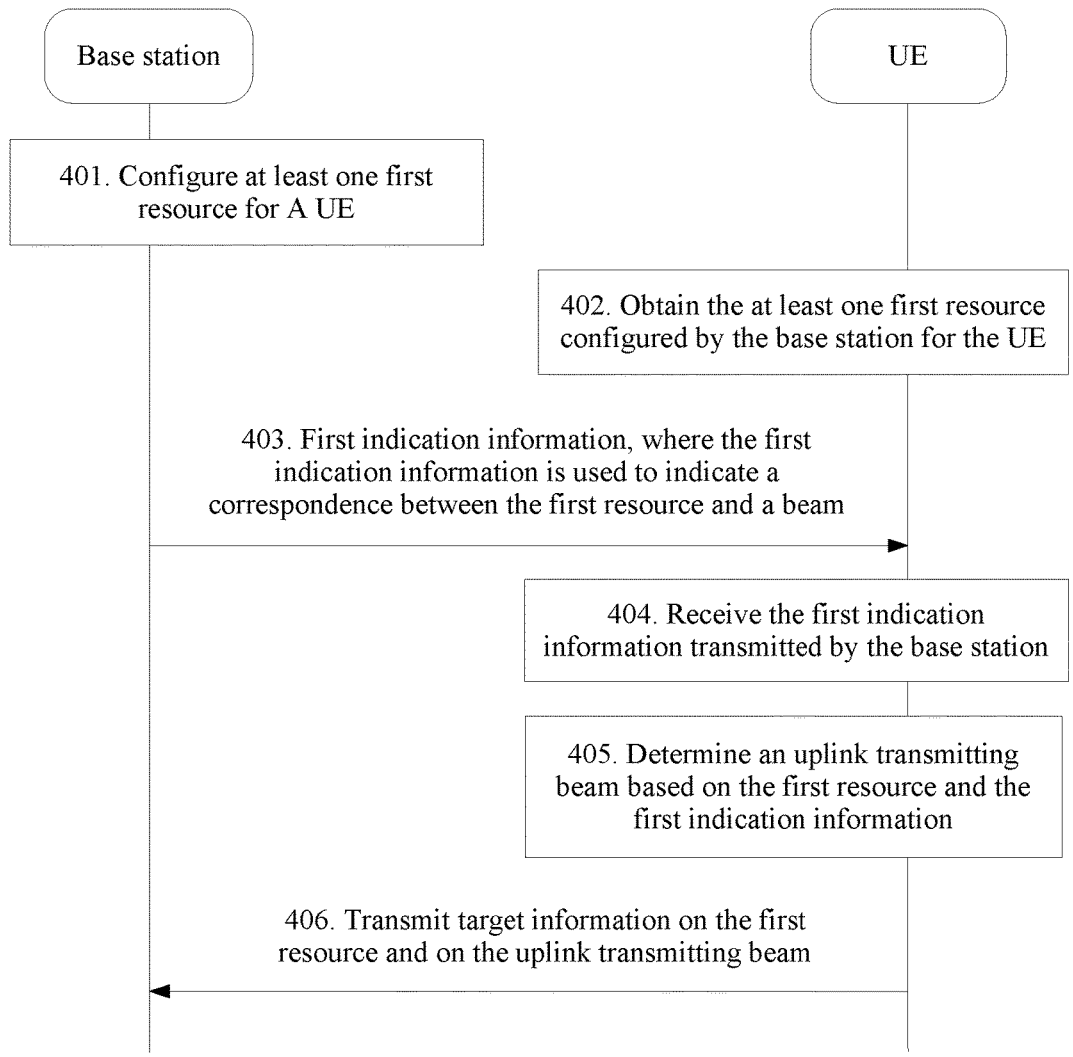
FIG. 4 is a flowchart of an information transmission method according to an embodiment of the present invention.

FIG. 4 is a flowchart of an information transmission method according to an embodiment of the present invention. As shown in FIG. 4, the method may include the following steps.

401. A base station configures at least one first resource for a UE.

The first resource is used by the UE to transmit a target channel and/or signal. To implement beamforming on the target channel and/or signal (for example, an SRS), the base station may configure the at least one first resource (for example, one or more of a time domain resource, a frequency domain resource, a code domain resource, and an antenna port) for the UE to transmit the target channel and/or signal.

The at least one first resource forms a resource group, and the resource group may include at least one resource subgroup.

Optionally, all first resources in a same resource subgroup may be a same frequency domain resource or a same code domain resource.

Further, optionally, the base station may further configure a specific resource group use manner for the UE. For example, the specific resource group use manner configured for the UE may be: periodically using the configured resource group to transmit the target channel and/or signal; or instead of periodically using the configured resource group to transmit the target channel and/or signal, using the configured resource group to transmit the target channel and/or signal after receiving DCI transmitted by the base station; or semi-persistently using the configured resource group to transmit the target channel and/or signal. In other words, activation may be triggered by using DCI or MAC CE, and deactivation may be triggered by using DCI or MAC CE; or activation may be triggered by using DCI or MAC CE, and deactivation is triggered after a period of time, where the period of time may be specified by a protocol (without being configured by the base station or locally prestored or preconfigured) or may be configured by the base station; or activation may be triggered after a period of time when configuration information is received, and deactivation is triggered by using DCI or MAC CE, or deactivation is triggered after a period of time, where the period of time between receiving the configuration information and the activation may be specified by a protocol (without being configured by the base station or locally prestored or preconfigured) or may be configured by the base station, and the period of time between the activation and the deactivation may also be specified by the protocol (without being configured by the base station or locally prestored or preconfigured) or may be configured by the base station.

Further, optionally, the base station may further indicate, to the UE, a grouping manner of the configured resource group, that is, indicate, to the UE, a grouping manner of dividing the configured resource group into the at least one resource subgroup.

402. The UE obtains the at least one first resource configured by the base station for the UE.

403. The base station transmits first indication information to the UE, where the first indication information is used to indicate a correspondence between the first resource and a beam.

The beam is an uplink transmitting beam, a downlink receiving beam, a downlink transmitting beam, or an uplink receiving beam. Based on the resource group configured by the base station for the UE, the base station may transmit, to the UE, the first indication information used to indicate the correspondence between the first resource included in the resource group and the beam.

404. The UE receives the first indication information transmitted by the base station.

405. The UE determines an uplink transmitting beam based on the first resource and the first indication information.

After the UE receives the first indication information transmitted by the base station, the UE may determine, based on the correspondence included in the first indication information and the first resource included in the configured resource group, a beam required for transmitting the target channel and/or signal, namely, the uplink transmitting beam.

For example, when the beam in the correspondence is an uplink transmitting beam, the UE may directly determine the beam corresponding to the first resource as the uplink transmitting beam; when the beam in the correspondence is a downlink receiving beam, the UE may first obtain the downlink receiving beam corresponding to the first resource, and then determine the uplink transmitting beam based on the downlink receiving beam by using a correspondence between uplink and downlink beams; or when the beam is a downlink transmitting beam, the UE may first determine, based on the first resource and the correspondence between the first resource and the beam, the downlink transmitting beam, then determine a downlink receiving beam based on the downlink transmitting beam by using a correspondence between uplink and downlink beams, and finally determine the uplink transmitting beam based on the downlink receiving beam by using the correspondence between the uplink and downlink beams.

406. The UE transmits a target channel and/or signal on the first resource and on the uplink transmitting beam.

After the UE determines the uplink transmitting beam, the UE may transmit the target channel and/or signal on the first resource and on the determined uplink transmitting beam, so as to implement beamforming on the target channel and/or signal.

In the information transmission method provided by this embodiment of the present invention, the base station configures the at least one first resource used to transmit the target channel and/or signal for the UE, and transmits the first indication information used to indicate the correspondence between the first resource and the beam to the UE, so that the UE can determine, based on the first resource and the first indication information, a beam required for transmitting the target channel and/or signal. Therefore, when the target channel or signal or both are an SRS, the UE can transmit the SRS by using the determined beam required for transmitting the target channel and/or signal, so as to implement beamforming on the SRS.

Figure 5:
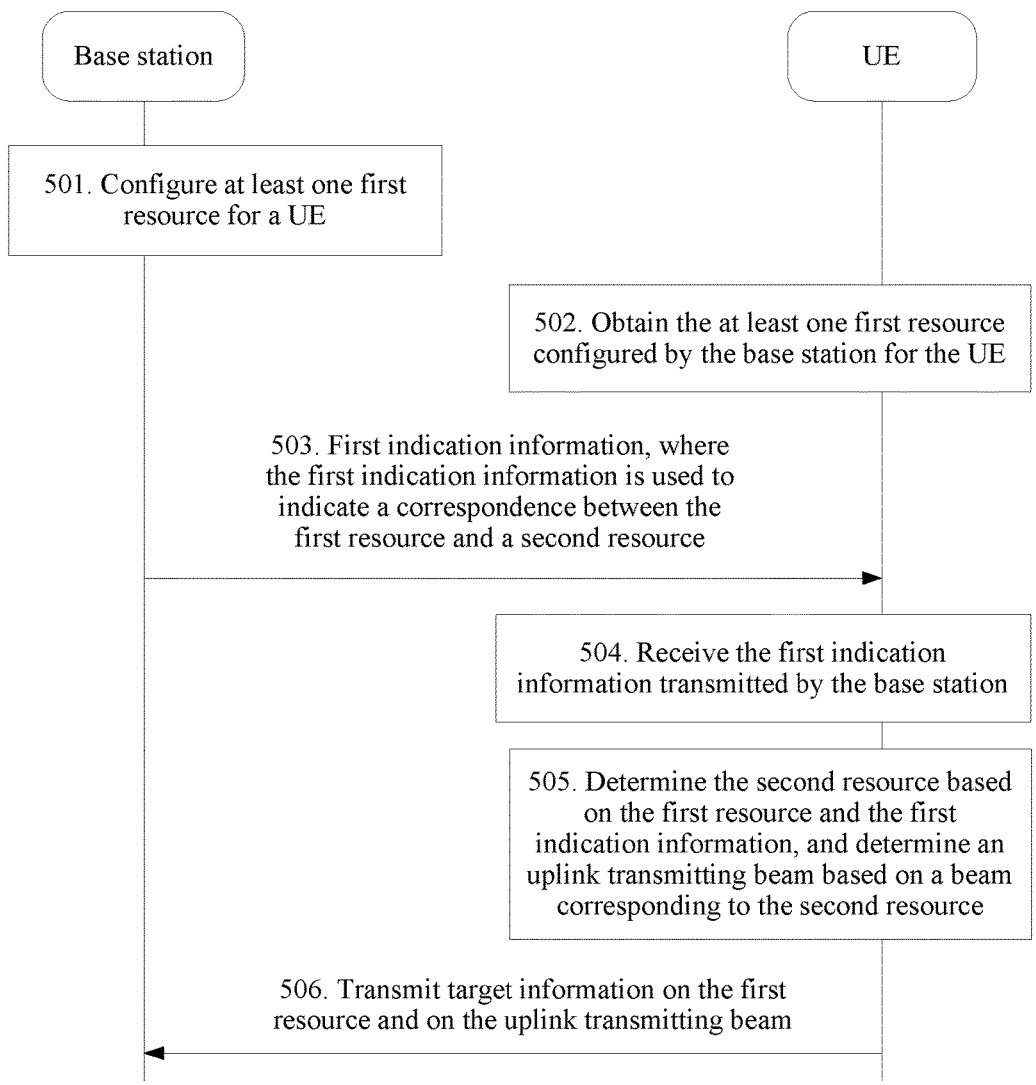
FIG. 5 is a flowchart of another information transmission method according to an embodiment of the present invention.
Figures 1, 5:
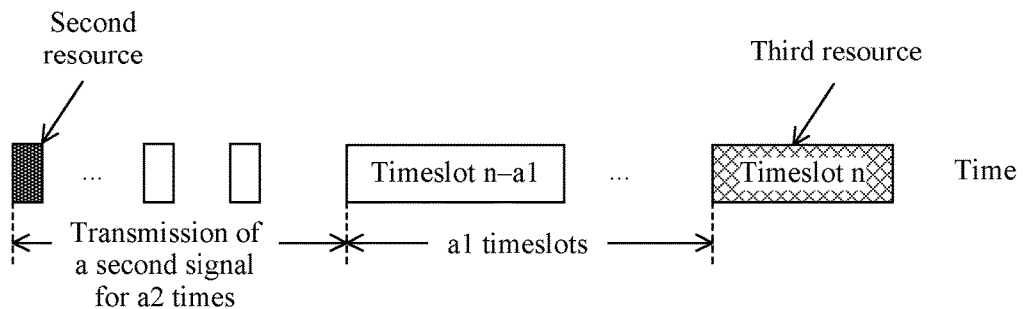
Figures 2, 5:
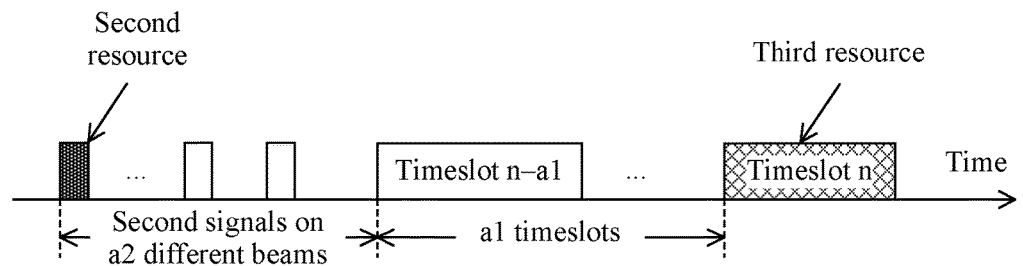
Figures 3, 5:
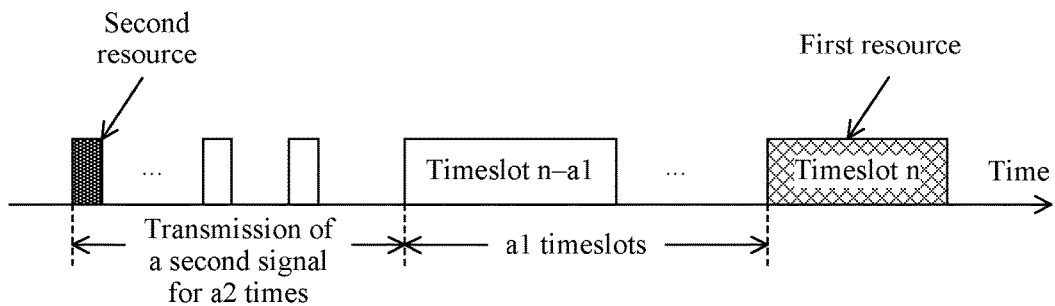
Figures 4, 5:
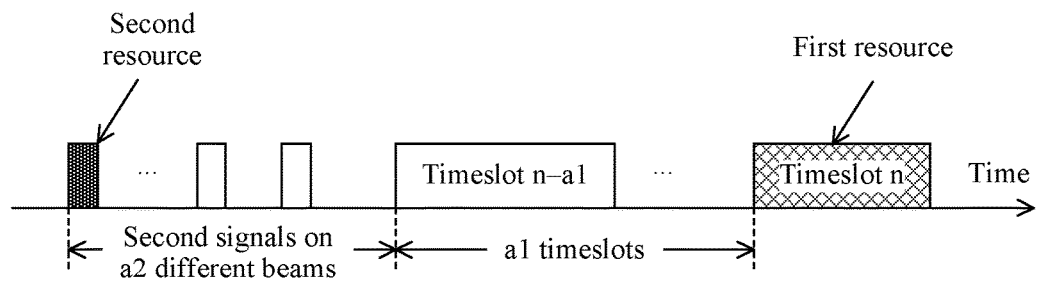
Figure 5:
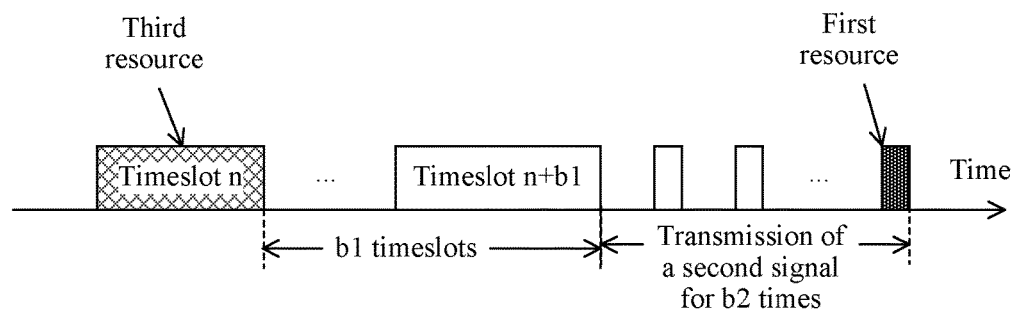

FIG. 5 is a flowchart of another information transmission method according to an embodiment of the present invention. As shown in FIG. 5, the method may include the following steps.

501. A base station configures at least one first resource for a UE.

The first resource is used by the UE to transmit a target channel and/or signal, or the first resource is used by the UE to receive a target channel and/or signal.

To implement beamforming on the target channel and/or signal (for example, an SRS), the base station may configure at least one first resource (for example, one or more of a time domain resource, a frequency domain resource, a code domain resource, and an antenna port) for the UE to transmit the target channel and/or signal.

The at least one first resource forms a resource group, and the resource group may include at least one resource subgroup.

Optionally, all first resources in a same resource subgroup may be a same frequency domain resource or a same code domain resource.

Optionally, the base station may further configure a resource group use manner for the UE. For example, the use manner may be: periodically using the configured resource group to transmit the target channel and/or signal; or instead of periodically using the configured resource group to transmit the target channel and/or signal, using the configured resource group to transmit the target channel and/or signal after receiving DCI transmitted by the base station; or semi-persistently using the configured resource group to transmit the target channel and/or signal, that is, after receiving DCI or MAC CE transmitted by the base station, periodically using the configured resource group to transmit the target channel and/or signal, and stopping transmission after receiving new DCI or new MAC CE transmitted by the base station.

Optionally, the base station may further indicate, to the UE, a grouping manner of the configured resource group, that is, indicate, to the UE, a grouping manner of dividing the configured resource group into the at least one resource subgroup.

502. The UE obtains the at least one first resource configured by the base station for the UE.

The base station may notify the UE of the first resource by signaling.

503. The base station transmits first indication information to the UE, where the first indication information is used to indicate a correspondence between the first resource and a second resource.

Before the UE transmits the target channel and/or signal to the base station, the UE transmits other information to the base station by using the second resource and a beam corresponding to the second resource; or before the UE transmits the target channel and/or signal to the base station, the base station transmits other information to the UE by using the second resource and a beam corresponding to the second resource. In other words, a correspondence between the second resource and the beam is known, and on this basis, the base station may transmit, to the UE, the first indication information used to indicate the correspondence between the first resource and the second resource, so that the UE determines, based on the first indication information, a beam for transmitting the target channel and/or signal, or determines a beam used by the base station to receive the target channel and/or signal on the first resource.

In order that beamforming can be implemented when the UE transmits the target channel and/or signal, the base station indicates, to the UE by using the first indication information, the correspondence between the first resource in the resource group configured for the UE and the second resource. The second resource includes at least one of: a time domain resource, a frequency domain resource, a code domain resource, and an antenna port that are used by the UE to transmit information to the base station before the UE transmits the target channel and/or signal; or the second resource includes at least one of: a time domain resource, a frequency domain resource, a code domain resource, and an antenna port that are used by the base station to transmit information to the UE before the UE transmits the target channel and/or signal. Optionally, the second resource in this embodiment of the present invention may be a resource used to transmit at least one of the following channels and/or signals: an SRS, a PRACH, a PUSCH, a PUCCH, an uplink tracking signal, an uplink discovery signal, an uplink beam reference signal, an uplink mobility reference signal, an uplink demodulation reference signal, a primary synchronization signal, a secondary synchronization signal, a synchronization signal block, a demodulation reference signal of a physical broadcast channel, a CSI-RS, a tracking reference signal (TRS), a phase tracking reference signal (PT-RS), a demodulation reference signal of a physical downlink control channel, and a demodulation reference signal of a physical downlink shared channel. Optionally, the physical downlink control channel may be a control resource set (CORESET), or may be a physical downlink control channel carrying a random access response or control information of system information. Optionally, the physical downlink shared channel may be a physical downlink shared channel carrying system information.

In other words, the base station may transmit, to the UE, the correspondence between the first resource and the second resource that is known to be in a correspondence to the beam, so that the UE determines the required beam.

In specific implementation, the base station may indicate, to the UE, a correspondence between each first resource in the resource group configured for the UE and a second resource in the following different manners. Optionally, in the following implementation, the correspondence between the first resource and the second resource includes at least one of the following: a quasi co-location QCL relationship exists between an antenna port for the target channel and/or signal and an antenna port for a channel and/or signal transmitted on the second resource; a transmitting beam used for the target channel and/or signal is the same as a transmitting beam used for a channel and/or signal transmitted on the second resource; a transmitting beam used for the target channel and/or signal corresponds to a receiving beam used for a channel and/or signal transmitted on the second resource; and a spatial filter used for the target channel and/or signal is the same as a spatial filter used for a channel and/or signal transmitted on the second resource.

Optionally, a correspondence between an identity of the second resource and the second resource may be predefined, or may be configured by the base station. For example, when the second resource is used to transmit an SRS, the identity of the second resource may be an SRI (SRS resource indicator), or a correspondence between the identity of the second resource and an SRI or an SRS resource is configured or predefined by the base station, so that the identity of the second resource may correspond to some SRS resources or SRIs, thereby reducing overheads of a second resource indicator. For another example, when the second resource is a CSI-RS, the identity of the second resource may be a CRI (CSI-RS resource indicator), or the base station may configure or predefine a correspondence between the identity of the second resource and a CRI or a CSI-RS resource or a CRI reported by the user equipment. For example, the identity of the second resource may be a low overhead indicator (LOI), so that the identity of the second resource corresponds to some CSI-RS resources or CRIs, thereby reducing overheads of the second resource indicator.

Manner 1: The first indication information includes a correspondence between each first resource in the resource subgroup and the second resource.

The following manner may be used to indicate the correspondence between each first resource in the resource subgroup and the second resource: The first indication information specifically includes an identity of each first resource in the resource subgroup, and an identity of a second resource corresponding to the identity of each first resource; or the first indication information specifically includes information used to indicate that a QCL relationship exists between an antenna port for a target channel and/or signal transmitted on each first resource and an antenna port for a signal on a second resource; or the first indication information specifically includes an identity of a second resource corresponding to each first resource.

Optionally, when the first indication information includes the identity of the second resource corresponding to each first resource, the first indication information may include one or more identities of second resources. Optionally, a quantity of identities of second resources is the same as a quantity of first resources. Optionally, the correspondence between the first resource and each of the second resources indicated by the first indication information may be predefined. For example, each of the second resources indicated by the first indication information corresponds to the first resource in sequence.

In addition, further, on a basis of the manner 1, the first indication information further includes a correspondence between each first resource and an optional range of beams.

Manner 2: The first indication information includes a correspondence between each resource subgroup and the second resource.

The following manner may be used to indicate the correspondence between each resource subgroup and the second resource: The first indication information specifically includes an identity of each resource subgroup, and an identity of a second resource corresponding to the identity of each resource subgroup; or the first indication information specifically includes information used to indicate that a QCL relationship exists between an antenna port for a signal on each resource subgroup and an antenna port for a signal on a second resource; or the first indication information may specifically include an identity of a second resource corresponding to each resource subgroup.

The base station uses the first indication information to indicate that all first resources in a same resource subgroup correspond to a same second resource. In other words, on all the first resources in the same resource subgroup, the UE needs to transmit target channels and/or signals by using a same transmitting beam. In this case, correspondingly, a pre-definition or pre-configuration manner may be used so that, on the first resources in the same resource subgroup, the base station receives the target channels and/or signals by using different receiving beams.

Manner 3: The first indication information includes a correspondence between each resource subgroup and a second-resource group, where the second-resource group includes one or more second resources. The following manner may be used to indicate the correspondence between the resource subgroup and the second-resource group: The first indication information specifically includes an identity of the resource subgroup, and an identity of a second resource in the second-resource group corresponding to the identity of the resource subgroup; or the first indication information specifically includes an identity of the resource subgroup, and an identity of the second-resource group corresponding to the identity of the resource subgroup.

Manner 4: The first indication information includes an identity of a second resource in a second-resource group corresponding to a resource subgroup.

Manner 5: The first indication information includes an identity of a second-resource group corresponding to the resource group.

Optionally, in the manner 3 to the manner 5, a quantity of second resources in the second-resource group is the same as a quantity of resource subgroups in the resource group.

Optionally, in the manner 3 to the manner 5, a correspondence, for example, a sequential correspondence, between second resources in the second-resource group and resource subgroups in the resource group may be predefined.

Optionally, for example, the second resource is an SRS resource. For another example, the second resource is a CSI-RS resource. For another example, the first resource is a port in an SRS resource, a first-resource subgroup is an SRS resource including one or more SRS ports, and a first-resource group is an SRS resource group including one or more SRS resources.

Optionally, a method for transmitting the first indication information may include: configuring, by the base station, a plurality of candidate second-resource groups by using higher layer signaling such as RRC signaling or MAC CE signaling; and then indicating, by the base station, one of the candidate second-resource groups as the second-resource group by using MAC CE signaling or DCI signaling.

Further optionally, one or more candidate second-resource groups form a set of candidate second-resource groups; the base station configures one or more sets of candidate second-resource groups by using higher layer signaling such as RRC signaling or MAC CE signaling; then the base station indicates one of the sets of candidate second-resource groups by using signaling such as RRC signaling or MAC CE signaling; and then the base station indicates, by using MAC CE or DCI signaling, a candidate second-resource group in the indicated set of candidate second-resource groups as the second-resource group.

Further optionally, quantities of second resources in second-resource groups included in a same set of candidate second-resource groups are the same, and quantities of second resources in second-resource groups included in different sets of candidate second-resource groups may be different.

Further optionally, the UE may determine a set of candidate second-resource groups based on a quantity of first-resource subgroups in a first-resource group. For example, a quantity of second resources in a second-resource group in the determined set of candidate second-resource groups is equal to the quantity of first-resource subgroups in the first-resource group. A feasible embodiment is provided in Table 1. The UE determines, based on the quantity of first-resource subgroups in the first-resource group, columns in the table. In other words, the UE determines a set of candidate second-resource groups. For example, if the resource group includes one first-resource subgroup, a set 0 of candidate second-resource groups is selected, where each second-resource group in the set 0 of candidate second-resource groups includes one second resource; because the second-resource group includes only one second resource in this case, a beam indicator may directly indicate an identity of the second resource. For another example, assuming that the resource group includes two first-resource subgroups, a set 1 of candidate second-resource groups is selected, where each second-resource group in the set 1 of candidate second-resource groups includes two second resources. For another example, assuming that the resource group includes four first-resource subgroups, a set 2 of candidate second-resource groups is selected, where each second-resource group in the set 2 of candidate second-resource groups includes four second resources. This predefined correspondence can ensure that a first-resource subgroup corresponds to a second resource. In addition, the base station determines rows in the table by using a beam indicator in a MAC CE or DCI indicator table. For example, if bits in a corresponding field in MAC CE or DCI are "00", a resource group 0 is selected. It should be noted that, rows and columns in the following table are merely examples and may be interchanged, and quantities of the rows and/or the columns may also increase or decrease, or may also be a part of another table. A value of a field in the following table is a binary numeral, or may be indicated by a decimal, octal, or hexadecimal numeral. In the table, a correspondence between an identity of a second-resource group and a field used to indicate a correspondence between a first resource and a second resource, in the MAC CE or the DCI, or a correspondence between an identity of a second resource and a field used to indicate a correspondence between a first resource and a second resource, in the MAC CE or the DCI, may be reflected in a form of a list, a formula, a character string, an array, a code segment, or the like. In the table, a quantity of first-resource subgroups in a first column may also be another numeric value, and is used merely as an example herein.

TABLE 1

| Field used to indicate a correspondence between a first resource and a second resource, in the MAC CE or the DCI | One first-resource subgroup | Two first-resource subgroups | Four first-resource subgroups |
|---|---|---|---|
| 00 | A second-resource group 0 in the set 0 of candidate second-resource groups, or an identity 0 of a second resource | A second-resource group 0 in the set 1 of candidate second-resource groups | A second-resource group 0 in the set 2 of candidate second-resource groups |
| 01 | A second-resource group 1 in the set 0 of candidate second-resource groups, or an identity 1 of a second resource | A second-resource group 1 in the set 1 of candidate second-resource groups | A second-resource group 1 in the set 2 of candidate second-resource groups |
| 10 | A second-resource group 2 in the set 0 of candidate second-resource groups, or an identity 2 of a second resource | A second-resource group 2 in the set 1 of candidate second-resource groups | A second-resource group 2 in the set 2 of candidate second-resource groups |
| 11 | A second-resource group 3 in the set 0 of candidate second-resource groups, or an identity 3 of a second resource | A second-resource group 3 in the set 1 of candidate second-resource groups | A second-resource group 3 in the set 2 of candidate second-resource groups |

Further, assuming that the second resource is an SRS resource or a CSI-RS resource, and that the first-resource subgroup is an SRS resource, Table 1 may be changed into the following Table 2. An identity of the SRS/CSI-RS resource may be an SRI or a CRI, or the base station may configure or predefine a correspondence between the SRI or CRI and the identity of the SRS/CSI-RS resource.

A value of a field in the following table is a binary numeral, or may be indicated by a decimal, octal, or hexadecimal numeral. In the table, a correspondence between an identity of an SRS/CSI-RS resource group and a field used to indicate a correspondence between an SRS resource and an SRS/CSI-RS resource, in the MAC CE or the DCI, or a correspondence between an identity of an SRS/CSI-RS resource and a field used to indicate a correspondence between an SRS resource and an SRS/CSI-RS resource, in the MAC CE or the DCI, may be reflected in a form of a list, a formula, a character string, an array, a code segment, or the like. In the table, a quantity of SRS resources in a first column may also be another numeric value, and is used merely as an example herein.

TABLE 2

| Field used to indicate a correspondence between an SRS resource and an SRS/CSI-RS resource, in the MAC CE or the DCI | An SRS resource group includes one SRS resource | An SRS resource group includes two SRS resources | An SRS resource group includes four SRS resources |
|---|---|---|---|
| 00 | An SRS/CSI-RS resource group 0 in a set 0 of SRS/CSI-RS resource groups, or an identity 0 of an SRS/CSI-RS resource | An SRS/CSI-RS resource group 0 in a set 1 of SRS/CSI-RS resource groups | An SRS/CSI-RS resource group 0 in a set 2 of SRS/CSI-RS resource groups |
| 01 | An SRS/CSI-RS resource group 1 in a set 0 of SRS/CSI-RS resource groups, or an identity 1 of an SRS/CSI-RS resource | An SRS/CSI-RS resource group 1 in a set 1 of SRS/CSI-RS resource groups | An SRS/CSI-RS resource group 1 in a set 2 of SRS/CSI-RS resource groups |
| 10 | An SRS/CSI-RS resource group 2 in a set 0 of SRS/CSI-RS resource groups, or an identity 2 of an SRS/CSI-RS resource | An SRS/CSI-RS resource group 2 in a set 1 of SRS/CSI-RS resource groups | An SRS/CSI-RS resource group 2 in a set 2 of SRS/CSI-RS resource groups |
| 11 | An SRS/CSI-RS resource group 3 in a set 0 of SRS/CSI-RS resource groups, or an identity 3 of an SRS/CSI-RS resource | An SRS/CSI-RS resource group 3 in a set 1 of SRS/CSI-RS resource groups | An SRS/CSI-RS resource group 3 in a set 2 of SRS/CSI-RS resource groups |

In addition, further, on a basis of the manner 2 to the manner 5, the first indication information further includes a correspondence between each resource subgroup and an optional range of beams.

Manner 6: The first indication information includes a correspondence between each first resource and the second resource.

The following manner may be used to indicate the correspondence between each first resource and the second resource: The first indication information specifically includes an identity of each first resource, and an identity of a second resource corresponding to the identity of each first resource; or the first indication information specifically includes information used to indicate that a QCL relationship exists between an antenna port for a signal on each first resource and an antenna port for a signal on a second resource; or the first indication information includes an identity of a second resource corresponding to a first resource.

Manner 7: The first indication information includes a correspondence between each first resource and a second-resource group, where the second-resource group includes at least one second resource.

The following manner may be used to indicate the correspondence between each first resource and the second-resource group: The first indication information specifically includes an identity of each first resource, and an identity of each second resource in a second-resource group corresponding to the identity of each first resource; or the first indication information specifically includes an identity of each first resource, and an identity of a second-resource group corresponding to the identity of each first resource; or the first indication information specifically includes information used to indicate that a QCL relationship exists between an antenna port for a signal on each first resource and an antenna port for a signal on a second-resource group; or the first indication information specifically includes an identity of a second-resource group corresponding to the first resource.

Manner 8: The first indication information includes a correspondence between each first resource and an optional range of beams.

Optionally, in the foregoing manners 1 to 8, the first indication information may be carried in same signaling or may be carried in different signaling. For example, when the first indication information is carried in different signaling, the identity of the first resource or the identity of the first-resource subgroup may be carried in signaling 1, and information other than the identity of the first resource and the identity of the first-resource subgroup in the first indication information in the foregoing implementations may be carried in signaling 2. For another example, when the first signaling is carried in DCI, the DCI may not include the identity of the first resource or the identity of the first-resource subgroup or the identity of the first-resource group; or when the first signaling is carried in the MAC CE, first MAC CE may include the identity of the first resource or the identity of the first-resource subgroup or the identity of the first-resource group, and the identity of the corresponding second resource or the identity of the second-resource group.

Optionally, in the foregoing implementations 1 to 8, the first indication information may be further used to indicate that the user equipment itself selects a transmitting beam for the target channel and/or signal, or a signal having a QCL relationship with the target channel and/or signal.

Optionally, in the foregoing implementations 1 to 8, the first indication information may be further used to indicate that a previously used $k^{th}$ transmitting beam is used for the target channel and/or signal or that the first resource corresponds to a second resource indicated previously at a $k^{th}$ time, where k may be configured or predefined by the base station, for example, k=1 or k=2. For example, the field used to indicate the correspondence between the first resource and the second resource, in the MAC CE or the DCI in Table 1 in the manner 5, may be further used to indicate that a previously used $k^{th}$ transmitting beam is used for the target channel and/or signal or that the second resource is a second resource indicated previously at a $k^{th}$ time; or the field used to indicate the correspondence between the SRS resource and the SRS/CSI-RS resource, in the MAC CE or the DCI in Table 2 in the manner 5, may be further used to indicate that a previously used $k^{th}$ transmitting beam is used for the target channel and/or signal or that the SRS/CSI-RS resource is an SRS/CSI-RS resource indicated previously at a $k^{th}$ time.

Optionally, in the foregoing implementations 1 to 8, the first indication information may be further used to indicate that a transmitting beam used for the target channel and/or signal is determined by the UE itself, or that an antenna port having a QCL relationship with the antenna port used for the target channel and/or signal is not limited. For example, the field used to indicate the correspondence between the first resource and the second resource, in the MAC CE or the DCI in Table 1 in the manner 5, may be further used to indicate that a transmitting beam used for the target channel and/or signal is determined by the UE itself, or that an antenna port having a QCL relationship with the antenna port used for the target channel and/or signal is not limited; or the field used to indicate the correspondence between the SRS resource and the SRS/CSI-RS resource, in the MAC CE or the DCI in Table 2 in the manner 5, may be further used to indicate that a transmitting beam used for the target channel and/or signal is determined by the UE itself, or that an antenna port having a QCL relationship with the antenna port used for the SRS is not limited.

Optionally, in the foregoing implementations 1 to 8, the base station may transmit third indication information used to indicate whether the first indication information exists, or whether the first indication information includes the identity of the second resource or the identity of the second-resource group, so as to reduce signaling overheads when there is no need to indicate the beam.

Optionally, in the foregoing implementations 1 to 8, a time domain spacing between the second resource and a third resource or the first resource is predefined or configured by the base station. The third resource is some or all of resources for transmitting the first indication information.

For example, the first indication information is carried in RRC signaling or MAC CE signaling, or the identity of the second resource or the identity of the second-resource group in the first indication information is carried in RRC signaling or MAC CE signaling; in this case, the third resource may be a timeslot or a subframe or a symbol or a mini-timeslot in which a PDSCH carrying the RRC signaling or the MAC CE signaling is located. A timeslot is used as an example in this embodiment. For another example, the first indication information is carried in DCI, or the identity of the second resource or the identity of the second-resource group in the first indication information is carried in DCI; in this case, the third resource may be a timeslot or a subframe or a symbol or a mini-timeslot in which a PDCCH carrying the DCI is located. A timeslot is used as an example in this embodiment.

Optionally, if the second resource carries an aperiodic signal, such as an aperiodic SRS or an aperiodic CSI-RS, the predefined second resource is a resource for transmitting the aperiodic signal, and a time domain spacing between the second resource and the third resource or the first resource is a spacing between a timeslot in which the aperiodic signal is located and a timeslot of the third resource or the first resource.

Optionally, if the second resource carries a periodic signal or a semi-persistent signal, such as a periodic or semi-persistent SRS or CSI-RS, the base station may configure different beams by using signaling in a process of transmitting the signal periodically. Therefore, the second resource needs to be defined as a resource occupied at a specific time of transmitting the corresponding signal to be transmitted periodically.

Specifically, the first indication information is used to indicate a resource indicator for a second signal transmitted on the second resource. For example, the second signal is an SRS or a CSI-RS, and the resource indicator for the second signal is an SRI or a CRI or an identity thereof. The second resource may be included in the second-resource group, and the indication method may be the indication method in the foregoing manners 1 to 8. The time domain spacing between the second resource and the third resource or the first resource is predefined or configured by the base station in the following implementation methods.

Implementation method 1: The second resource may be a resource for a second signal transmitted at an $a2^{th}$-to-last time before a1 timeslots before the third resource. For example, if the third resource is a timeslot n or a timeslot in which the third resource is located is a timeslot n, the second resource is a resource for a second signal transmitted at an $a2^{th}$-to-last time before n–a1 timeslots, as shown in FIG. 5-1. a1 may be configured or predefined by the base station, for example, a1=0 or a1=1. a2 may also be configured or predefined by the base station, for example, a2=1. a1 may be a positive value, a negative value, or 0, where a1=0 may also be understood as "a1 is undefined", that is, the second resource may be a resource for a second signal transmitted at an $a2^{th}$-to-last time before the third resource.

Implementation method 2: The second resource may be a resource for a second signal that is on an $a2^{th}$-to-last beam different from that of the third resource or has a non-QCL relationship with a signal on the third resource, before a1 timeslots before the third resource. For example, if the third resource is a timeslot n or a timeslot in which the third resource is located is a timeslot n, the second resource is a resource for a second signal that is on an $a2^{th}$-to-last beam different from that of the third resource or has a non-QCL relationship with a signal on the third resource, before n–a1 timeslots, as shown in FIG. 5-2. Different beams may be further understood as different spatial filters, or having a non-QCL relationship. a1 may be configured or predefined by the base station, for example, a1=0 or a1=1. a2 may also be configured or predefined by the base station, for example, a2=1. a1 may be a positive value, a negative value, or 0, where a1=0 may also be understood as "a1 is undefined", that is, the second resource may be a resource for a second signal on an $a2^{th}$-to-last different beam before the third resource. In comparison with the implementation method 1, in the implementation method 2, a plurality of a2 values may correspond to a same beam. Therefore, overheads of an a2 indication can be reduced.

Implementation method 3: The second resource may be a resource for a second signal transmitted at an $a2^{th}$-to-last time before a1 timeslots before the first resource. For example, if a timeslot in which the first resource is located is a timeslot n, the second resource is a resource for a second signal transmitted at an $a2^{th}$-to-last time before n–a1 timeslots, as shown in FIG. 5-3. a1 may be configured or predefined by the base station, for example, a1=0 or a1=1. a2 may also be configured or predefined by the base station, for example, a2=1. a1 may be a positive value, a negative value, or 0, where a1=0 may also be understood as "a1 is undefined", that is, the second resource may be a resource for a second signal transmitted at an $a2^{th}$-to-last time before the first resource.

Implementation method 4: The second resource may be a resource for a second signal that is on an $a2^{th}$-to-last beam different from that of the first resource, before a1 timeslots before the first resource. For example, if a timeslot in which the first resource is located is a timeslot n, the second resource is a resource for a second signal that is on an $a2^{th}$-to-last beam different from that of the first resource or has a non-QCL relationship with the signal on the first resource, before n−a1 timeslots, as shown in FIG. 5-4. Different beams may be further understood as different spatial filters, or having a non-QCL relationship. a1 may be configured or predefined by the base station, for example, a1=0 or a1=1. a2 may also be configured or predefined by the base station, for example, a2=1. a1 may be a positive value, a negative value, or 0, where a1=0 may also be understood as "a1 is undefined", that is, the second resource may be a resource for a second signal on an $a2^{th}$-to-last different beam before the first resource. In comparison with the implementation method 3, in the implementation method 4, a plurality of a2 values may correspond to a same beam. Therefore, overheads of an a2 indication can be reduced.

Optionally, in the foregoing implementations 1 to 8, a time domain spacing between the first resource and a third resource or the second resource is predefined or configured by the base station. The third resource is some or all of resources for transmitting the first indication information. For example, the first indication information is carried in RRC signaling or MAC CE signaling, or the identity of the second resource or the identity of the second-resource group in the first indication information is carried in RRC signaling or MAC CE signaling; in this case, the third resource may be a timeslot or a subframe or a symbol or a mini-timeslot in which a PDSCH carrying the RRC signaling or the MAC CE signaling is located. A timeslot is used as an example in this embodiment. For another example, the first indication information is carried in DCI, or the identity of the second resource or the identity of the second-resource group in the first indication information is carried in DCI; in this case, the third resource may be a timeslot or a subframe or a symbol or a mini-timeslot in which a PDCCH carrying the DCI is located. A timeslot is used as an example in this embodiment.

Optionally, if the first resource carries an aperiodic target channel and/or signal, such as an aperiodic SRS or an aperiodic CSI-RS, the predefined first resource is a resource for transmitting the aperiodic target channel and/or signal, and a time domain spacing between the first resource and the third resource or the second resource is a spacing between a timeslot in which the aperiodic target channel and/or signal is located and a timeslot of the third resource or the second resource.

Optionally, if the first resource carries a periodic signal or a semi-persistent target channel and/or signal, such as a periodic or semi-persistent SRS or CSI-RS, considering that there is an effective delay or a fuzzy time for the first indication information, a specific effective time of the first indication information needs to be specified.

Specifically, the first indication information is used to indicate the second resource corresponding to the first resource or the correspondence between the first resource and the second resource. For example, the target channel or signal or both are an SRS. The first resource may be included in the first-resource group or the first-resource subgroup, and the indication method may be the indication method in the foregoing manners 1 to 8. The time domain spacing between the first resource and the third resource or the second resource is predefined or configured by the base station in the following implementation methods.

Implementation method 1: The first resource may be a resource for the target channel and/or signal transmitted at a $b2^{th}$ time after b1 timeslots after the third resource, or the first indication information starts to take effect when the target channel and/or signal is transmitted at a $b2^{th}$ time after b1 timeslots after the third resource. For example, if the third resource is a timeslot n or a timeslot in which the third resource is located is a timeslot n, the first resource is a resource for the target channel and/or signal transmitted at a $b2^{th}$ time after n+b1 timeslots, or the first indication information takes effect when the target channel and/or signal is transmitted at a $b2^{th}$ time after n+b1 timeslots, as shown in FIG. 5-5. b1 may be configured or predefined by the base station, for example, b1=0 or b1=1. b2 may also be configured or predefined by the base station, for example, b2=1. b1=0 may also be understood as "b1 is undefined", that is, the first resource may be a resource for the target channel and/or signal transmitted at a $b2^{th}$ time after the third resource, or the first indication information starts to take effect when the target channel and/or signal is transmitted at a $b2^{th}$ time after the third resource.

Figures 5, 6:
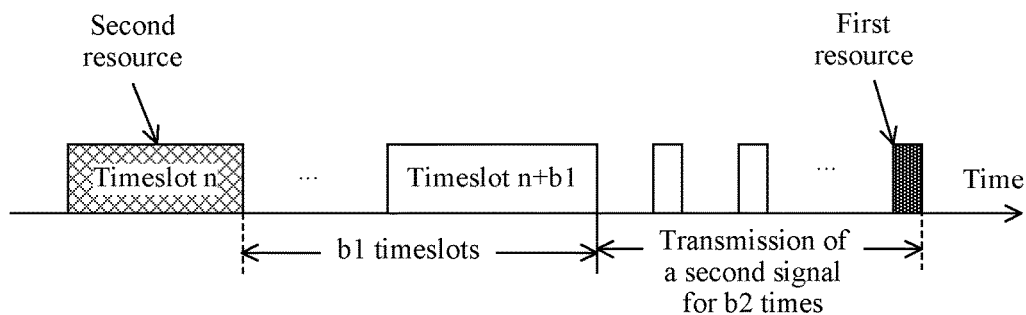
Figure 6:
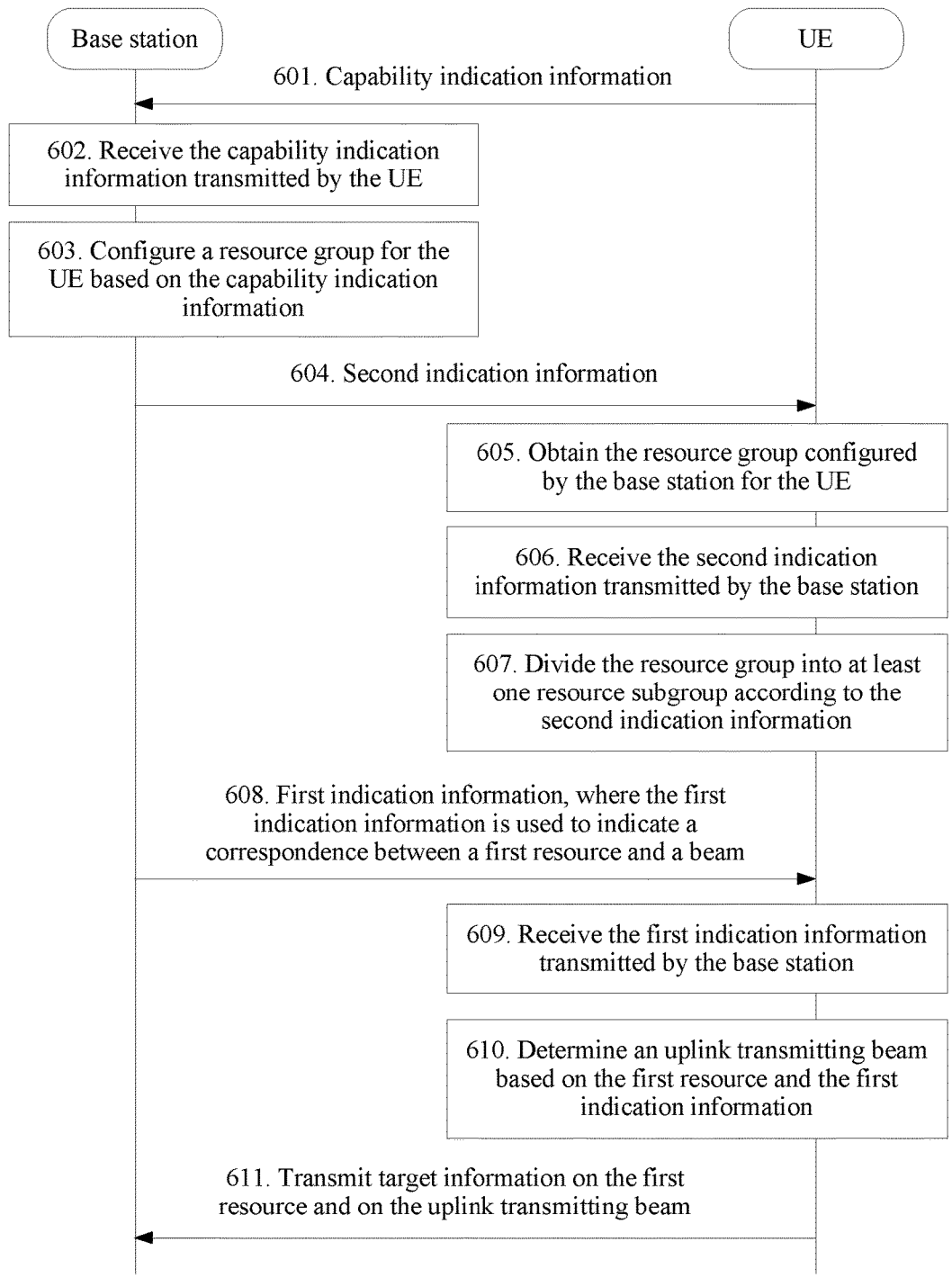

Implementation method 2: The first resource may be a resource for the target channel and/or signal transmitted at a $b2^{th}$ time after b1 timeslots after the second resource, or the first indication information starts to take effect when the target channel and/or signal is transmitted at a $b2^{th}$ time after b1 timeslots after the second resource. For example, if the second resource is a timeslot n or a timeslot in which the second resource is located is a timeslot n, the first resource is a resource for the target channel and/or signal transmitted at a $b2^{th}$ time after n+b1 timeslots, or the first indication information takes effect when the target channel and/or signal is transmitted at a $b2^{th}$ time after n+b1 timeslots, as shown in FIG. 5-6. b1 may be configured or predefined by the base station, for example, b1=0 or b1=1. b2 may also be configured or predefined by the base station, for example, b2=1. b1=0 may also be understood as "b1 is undefined", that is, the first resource may be a resource for the target channel and/or signal transmitted at a $b2^{th}$ time after the second resource, or the first indication information starts to take effect when the target channel and/or signal is transmitted at a $b2^{th}$ time after the second resource.

In another implementation method of this embodiment, information used to indicate the second resource or the second-resource group in the first indication information may be carried in first DCI. The first DCI may be used to trigger transmission of the target channel and/or signal on more than one frequency domain resource part. The frequency domain resource part may be a carrier or a bandwidth part (BWP). The BWP may be a bandwidth configured by the base station for the UE, and has a unique subcarrier spacing and CP type, and may be used to transmit data. In this embodiment, for example, the target channel or signal or both are an SRS. In this case, the first resource or the first-resource subgroup or the first-resource group includes a plurality of frequency domain resource parts. It may be understood that each first resource is located in a frequency domain resource part, or that each first-resource subgroup is located in a frequency domain resource part, or that the first resource is located in a plurality of frequency domain resource parts. Some of the frequency domain resource parts are frequency domain resource parts in which PUSCH transmission is not performed or PUSCH transmission and PUCCH transmission are not performed. In this case, the first indication information is used to indicate beams or corresponding second resources or second-resource groups on a plurality of frequency domain resource parts.

Specifically, the first DCI includes one or more blocks. For example, the first DCI may include a block 1, a block 2, ..., a block C, where C is a positive integer. One or more of the C blocks in the first DCI may be used to carry the information that is used to indicate the second resource or the second-resource group in the first indication information. Optionally, if the C blocks are some bits in the first DCI, another block or more blocks in the first DCI may be used to carry first indication information of other UE. In this case, the first DCI is used to indicate SRS transmission of different user equipments. In this case, one of the C blocks in the first DCI is used to indicate b1 second resources and b2 transmission power control (TPC) parameters, where b1>1, and b2>1. For example, one of the C blocks in the first DCI includes identities of b1 second resources, or includes an identity of one or more second-resource groups of b1 second resources. Specifically, a quantity of bits and specific meanings of one (for example, may be a block in the first DCI) of the C blocks in the first DCI have the following manners:

Manner 1: b2 is determined based on b1, a quantity of carriers, and a quantity of BWPs in each carrier. For example, b2=b1*Quantity of carriers*Quantity of BWPs in each carrier. In this case, a correspondence between b1 second resources and b2 TPCs may be configured by using higher layer signaling such as RRC signaling or MAC CE signaling. For example, TPCs are sorted and classified into b1 groups, and each group corresponds, for example, sequentially corresponds, to one second resource. Therefore, a TPC is determined for each resource and each beam, and adjustment of closed-loop power control is performed. In this case, C=1.

In this manner, each block corresponds to one user equipment, and includes the following bits for the user equipment:

(1) $\lceil \log 2(b1) \rceil$ bits, where $\lceil \cdot \rceil$ indicates round-up, and the base station indicates, by using the $\lceil \log 2(b1) \rceil$ bits in a block of the first DCI, an identity of a second resource or an identity of one or more second-resource groups of second resources used by the user equipment in a BWP in a carrier corresponding to the block.

(2) $\lceil \log 2(b2) \rceil$ bits, where $\lceil \cdot \rceil$ indicates round-up, the base station indicates a power control command of the user equipment by using the $\lceil \log 2(b2) \rceil$ bits in a block of the first DCI, and the power control command may be a TPC. A correspondence between b1 second resources and b2 TPCs may be configured by using higher layer signaling such as RRC signaling or MAC CE signaling, or predefined.

Manner 2: b2 is determined based on b1. For example, b2=b1. In this case, a correspondence between b1 second resources and b2 TPCs may be configured by using higher layer signaling such as RRC signaling or MAC CE signaling, or predefined. For example, a one-to-one correspondence exists between the sorted TPCs and the indicated and sorted second resources. Therefore, a TPC is determined for each beam, and adjustment of closed-loop power control is performed. Further, in this case, C>1. Each of the C blocks in the first DCI corresponds to a BWP in a carrier. For example, C may be determined based on a quantity of carriers and a quantity of BWPs in each carrier. For example, C=Quantity of carriers*Quantity of BWPs in each carrier.

In this manner, each block corresponds to a BWP in a carrier, and includes the following bits for a BWP in the carrier:

(1) $\lceil \log 2(b1) \rceil$ bits, where $\lceil \cdot \rceil$ indicates round-up, and the base station indicates, by using the $\lceil \log 2(b1) \rceil$ bits in a block of the first DCI, an identity of a second resource or an identity of one or more second-resource groups of second resources used by the user equipment in a BWP in the carrier.

(2) $\lceil \log 2(b2) \rceil$ bits, where $\lceil \cdot \rceil$ indicates round-up, the base station indicates a power control command of the user equipment in a BWP in the carrier by using the $\lceil \log 2(b2) \rceil$ bits in a block of the first DCI, and the power control command may be a TPC. A correspondence between b1 second resources and b2 TPCs may be configured by using higher layer signaling such as RRC signaling or MAC CE signaling, or predefined.

In this case, the user equipment may correspond to one or more blocks. In other words, the base station may indicate, by using one or more blocks in the first DCI, an identity of a second resource or an identity of one or more second-resource groups of second resources used by the user equipment.

Manner 3: b2 is determined based on b1 and a quantity of carriers, or is determined based on b1 and a quantity of BWPs. For example, b2=b1*Quantity of carriers, or b2=b1*Quantity of BWPs. In this case, a correspondence between b1 second resources and b2 TPCs may be configured by using higher layer signaling such as RRC signaling or MAC CE signaling. For example, TPCs are sorted and classified into b1 groups, and each group corresponds, for example, sequentially corresponds, to one second resource. Therefore, a TPC is determined for each resource and each beam, and adjustment of closed-loop power control is performed. In this case, C=1.

In this manner, each block corresponds to one user equipment, and includes the following bits for the user equipment:

(1) $\lceil \log 2(b1) \rceil$ bits, where $\lceil \cdot \rceil$ indicates round-up, and the base station indicates, by using the $\lceil \log 2(b1) \rceil$ bits in a block of the first DCI, an identity of a second resource or an identity of one or more second-resource groups of second resources used by the user equipment in a carrier or a BWP corresponding to the block.

(2) $\lceil \log 2(b2) \rceil$ bits, where $\lceil \cdot \rceil$ indicates round-up, the base station indicates a power control command of the user equipment by using the $\lceil \log 2(b2) \rceil$ bits in a block of the first DCI, and the power control command may be a TPC. A correspondence between b1 second resources and b2 TPCs may be configured by using higher layer signaling such as RRC signaling or MAC CE signaling, or predefined.

Manner 4: b2 is determined based on b1. For example, b2=b1. In this case, a correspondence between b1 second resources and b2 TPCs may be configured by using higher layer signaling such as RRC signaling or MAC CE signaling, or predefined. For example, a one-to-one correspondence exists between the sorted TPCs and the indicated and sorted second resources. Therefore, a TPC is determined for each beam, and adjustment of closed-loop power control is performed. Further, in this case, C>1. Each of the C blocks in the first DCI corresponds to a BP in a carrier. For example, C may be determined based on a quantity of carriers or a quantity of BWPs. For example, C=Quantity of carriers, or C=Quantity of BWPs.

In this manner, each block corresponds to a carrier or a BWP, and includes the following bits for the carrier or the BWP:

(1) $\lceil \log 2(b1) \rceil$ bits, where $\lceil \cdot \rceil$ indicates round-up, and the base station indicates, by using the $\lceil \log 2(b1) \rceil$ bits in a block of the first DCI, an identity of a second resource or an identity of one or more second-resource groups of second resources used by the user equipment in the carrier or the BWP.

(2) $\lceil \log 2(b2) \rceil$ bits, where $\lceil \cdot \rceil$ indicates round-up, the base station indicates a power control command of the user equipment for the carrier or the BWP by using the $\lceil \log 2(b2) \rceil$ bits in a block of the first DCI, and the power control command may be a TPC. A correspondence between b1 second resources and b2 TPCs may be configured by using higher layer signaling such as RRC signaling or MAC CE signaling, or predefined.

In this case, the user equipment may correspond to one or more blocks. In other words, the base station may indicate, by using one or more blocks in the first DCI, an identity of a second resource or an identity of one or more second-resource groups of second resources used by the user equipment.

Optionally, the user equipment determines, based on b1, the quantity of carriers, and the quantity of BWPs in each carrier, to use the implementation method 1 or the implementation method 2. For example, when a product of multiplying b1, the quantity of carriers, and the quantity of BWPs in each carrier is greater than L or greater than or equal to L, the implementation method 1 is used; otherwise the implementation method 2 is used. L is preset, or specified by a protocol, or configured by the base station. For example, the base station may configure a value of L by using RRC signaling.

Optionally, the user equipment determines, based on b1 and the quantity of carriers, to use the implementation method 3 or the implementation method 4. Alternatively, the user equipment determines, based on b1 and the quantity of BWPs, to use the implementation method 3 or the implementation method 4. For example, when a product of multiplying b1 and the quantity of carriers is greater than L or greater than or equal to L, the implementation method 3 is used; otherwise the implementation method 4 is used. Alternatively, for example, when a product of multiplying b1 and the quantity of BWPs is greater than L or greater than or equal to L, the implementation method 3 is used; otherwise the implementation method 4 is used. L is preset, or specified by a protocol, or configured by the base station. For example, the base station may configure a value of L by using RRC signaling.

Optionally, in the foregoing implementation method, it is predefined or indicated by the base station that different BWPs in a same carrier correspond to a same second resource or second-resource group.

Optionally, in the foregoing implementation method, the carrier is a component carrier (CC).

Optionally, in the foregoing implementation method, the C blocks in the first DCI may further include information used to trigger SRS transmission. For example, one of the C blocks in the first DCI includes SRS trigger signaling, and the SRS trigger signaling may be used to trigger SRS transmission that is configured by the base station by using higher layer signaling such as RRC signaling or MAC CE signaling.

In an extension of the present invention, the information transmission method may be further extended to a downlink direction. In this case, the base station transmits a target channel and/or signal to the UE, and a first resource is a downlink transmission resource. In this case, the target channel and/or signal may be at least one of the following: a primary synchronization signal, a secondary synchronization signal, a synchronization signal block, a physical broadcast channel, a CSI-RS, a tracking reference signal (TRS), a phase tracking reference signal (PT-RS), a demodulation reference signal (DMRS), a physical downlink control channel, a physical downlink shared channel, and a control resource set CORESET.

When the foregoing information transmission method is used for downlink transmission of the target channel and/or signal, the base station transmits first indication information to the UE, where the first indication information is used to indicate a correspondence between the first resource and a second resource.

Before the base station transmits the target channel and/or signal to the UE, the UE transmits other information to the base station by using the second resource and a corresponding beam; or before the base station transmits the target channel and/or signal to the UE, the base station transmits other information to the UE by using the second resource and a corresponding beam, and the UE receives, by using a corresponding receiving beam, a signal transmitted on the second resource. In other words, the UE already knows a correspondence between the second resource and the receiving beam, and on this basis, the base station may transmit, to the UE, the first indication information used to indicate the correspondence between the first resource and the second resource, so that the UE determines, based on the first indication information, a beam required by the UE for receiving the target channel and/or signal on the first resource, or determines a beam used by the base station to transmit the target channel and/or signal on the first resource. For example, the UE determines, based on the first indication information, that the beam required by the UE for receiving the target channel and/or signal on the first resource is the receiving beam on which the UE receives the signal transmitted on the second resource, or the UE determines, based on the first indication information, that a QCL relationship exists between an antenna port for transmitting the target channel and/or signal and an antenna port for transmitting the signal on the second resource. Specifically, the method for transmitting the first indication information may be any one or a combination of the foregoing manners.

Optionally, in the foregoing implementation, the first indication information may be further used to indicate that a previously used $k^{th}$ receiving beam is used for the target channel and/or signal or that the first resource corresponds to a second resource indicated previously at a $k^{th}$ time, where k may be configured or predefined by the base station, for example, k=1 or k=2. For example, the field used to indicate the correspondence between the first resource and the second resource, in the MAC CE or the DCI in Table 1 in the manner 5, may be further used to indicate that a previously used $k^{th}$ receiving beam is used for the target channel and/or signal or that the second resource is a second resource indicated previously at a $k^{th}$ time.

Optionally, in the foregoing implementation, the first indication information may be further used to indicate that a receiving beam used for the target channel and/or signal is determined by the UE itself, or that an antenna port having a QCL relationship with the antenna port used for the target channel and/or signal is not limited. For example, the field used to indicate the correspondence between the first resource and the second resource, in the MAC CE or the DCI in Table 1 in the manner 5, may be further used to indicate that the receiving beam used for the target channel and/or signal is determined by the UE itself, or that an antenna port having a QCL relationship with the antenna port used for the target channel and/or signal is not limited.

504. The UE receives the first indication information transmitted by the base station.

505. The UE determines the second resource based on the first resource and the first indication information, and determines an uplink transmitting beam or a downlink receiving beam based on a beam corresponding to the second resource.

Optionally, the determining an uplink transmitting beam based on a beam corresponding to the second resource may be further: determining an uplink receiving beam. For example, an uplink receiving beam used for transmitting a channel and/or signal on the second resource may be determined as an uplink receiving beam for the target channel and/or signal, or an uplink receiving beam used for transmitting a channel and/or signal on the second resource is determined, based on a QCL relationship between an antenna port used for transmitting the channel and/or signal on the second resource and the antenna port used for the target channel and/or signal, as an uplink receiving beam for the target channel and/or signal. For another example, a spatial filter used for downlink transmission of a channel and/or signal on the second resource may be determined as a spatial filter used for uplink reception of the target channel and/or signal, or an uplink receiving beam corresponding to a downlink transmitting beam used for downlink transmission of a channel and/or signal on the second resource may be determined as an uplink receiving beam for the target channel and/or signal; or based on a QCL relationship between an antenna port used for transmitting a channel and/or signal on the second resource and the antenna port used for the target channel and/or signal, a spatial filter used for downlink transmission of a channel and/or signal on the second resource may be determined as a spatial filter used for uplink reception of the target channel and/or signal, or an uplink receiving beam corresponding to a downlink transmitting beam used for downlink transmission of a channel and/or signal on the second resource is determined as an uplink receiving beam for the target channel and/or signal.

After the UE receives the first indication information transmitted by the base station, the UE may first determine, based on the correspondence included in the first indication information and the first resource included in the configured resource group, the second resource corresponding to the first resource, and then determine, based on the known correspondence between the second resource and the beam, the beam corresponding to the second resource, and then determine, based on the beam corresponding to the second resource, the uplink transmitting beam or the uplink receiving beam for the target channel and/or signal.

For example, when the UE transmits other information on the second resource and the corresponding beam, the correspondence between the second resource and the uplink transmitting beam is known, and in this case, the beam corresponding to the second resource may be directly determined as the uplink transmitting beam for the target channel and/or signal, or the receiving beam corresponding to the second resource is directly determined as the uplink receiving beam for the target channel and/or signal. When the base station transmits other information on the second resource and the corresponding beam, the correspondence between the second resource and the downlink receiving beam is known, and in this case, the uplink transmitting beam for the target channel and/or signal may be determined based on the beam corresponding to the second resource by using the correspondence between the uplink and downlink beams. Optionally, the beam may also be a spatial filter, or a QCL relationship exists between the antenna port for the signal transmitted on the second resource and the antenna port for the target channel and/or signal.

Optionally, in another implementation solution, in the foregoing step and embodiment, if there is no corresponding first signaling indicating the correspondence between the first resource and the second resource, it is predefined that a correspondence exists between the first resource and a resource occupied for transmitting a target channel and/or signal before the first resource. For example, a beam or a spatial filter for transmitting a target channel and/or signal at a previous time is used to transmit the target channel and/or signal at this time, or for example, a QCL relationship exists between the antenna port for the target channel and/or signal and an antenna port for transmitting a channel and/or signal at a previous time. Optionally, if there is no corresponding first signaling indicating the correspondence between the first resource and the second resource, it is predefined that the user equipment itself determines a transmitting beam used for the target channel and/or signal, or a signal having a QCL relationship with the target channel and/or signal. Optionally, if there is no corresponding first signaling indicating the correspondence between the first resource and the second resource, and the target channel and/or signal is transmitted for the first time, it is predefined that the user equipment itself determines a transmitting beam used for the target channel and/or signal, or a signal having a QCL relationship with the target channel and/or signal, or that a signal having a QCL relationship with the target channel and/or signal is not limited.

Optionally, if the first indication information is used to indicate that a previously used $k^{th}$ transmitting beam is used for the target channel and/or signal or that the first resource corresponds to a second resource indicated previously at a $k^{th}$ time, where k may be configured or predefined by the base station, for example, k=1 or k=2, the UE uses the previously used $k^{th}$ transmitting beam, or determines, based on a correspondence between the first resource and the second resource indicated previously at the $k^{th}$ time, an uplink transmitting beam or a receiving beam, or determines, based on a correspondence between the first resource and the second resource indicated previously at the $k^{th}$ time, that a QCL relationship exists between the antenna port used for the target channel and/or signal and the antenna port used for the signal transmitted on the second resource. Specifically, the method for determining the transmitting beam or the receiving beam or the QCL relationship in this embodiment of the present invention may be used.

Optionally, if the first indication information is used to indicate that the transmitting beam used for the target channel and/or signal is determined by the UE itself, or that the antenna port having a QCL relationship with the antenna port used for the target channel and/or signal is not limited, the UE itself determines the transmitting beam for the target channel and/or signal, or the antenna port having a QCL relationship with the antenna port used for the target channel and/or signal is not limited.

Optionally, in the foregoing step or embodiment, if the UE transmits a third channel and/or signal on some or all of symbols occupied by the target channel and/or signal, the UE needs to determine whether a transmitting beam or a receiving beam for the third channel and/or signal is the same as that for the target channel and/or signal, or the UE needs to determine whether a QCL relationship exists between an antenna port for the third channel and/or signal and the antenna port for the target channel and/or signal. Optionally, the method for indicating the target channel and/or signal in the present invention may be used to indicate the third channel and/or signal, for example, indicate a correspondence between the third channel and/or signal and a fourth resource, or indicate a correspondence between the third channel and/or signal and a beam or a spatial filter or whether a QCL relationship exists between the port for the third channel and/or signal and a port for a signal transmitted on a fourth resource. In this case, the UE may determine, based on whether the second resource is the same as the fourth resource, whether the transmitting beam or the receiving beam for the third channel and/or signal is the same as that for the target channel and/or signal, where the beam may be a spatial filter, or the UE needs to determine whether a QCL relationship exists between the antenna port for the third channel and/or signal and the antenna port for the target channel and/or signal.

Optionally, the third channel and/or signal may be at least one of the following: a sounding reference signal SRS, a physical random access channel PRACH, a physical uplink shared channel PUSCH, a physical uplink control channel PUCCH, an uplink tracking signal, an uplink discovery signal, an uplink beam reference signal, an uplink mobility reference signal, an uplink demodulation reference signal, and an uplink phase tracking reference signal.

Optionally, if the UE determines that the transmitting beam or the receiving beam for the third channel and/or signal is the same as that for the target channel and/or signal, or the UE needs to determine that a QCL relationship exists between the antenna port for the third channel and/or signal and the antenna port for the target channel and/or signal, the UE transmits the target channel and/or signal and the third channel and/or signal. If the UE determines that the transmitting beam or the receiving beam for the third channel and/or signal is different from that for the target channel and/or signal, or the UE determines that no QCL relationship exists between the antenna port for the third channel and/or signal and the antenna port for the target channel and/or signal, the following implementation methods are available.

Implementation method 1: The UE determines, based on a predefined priority, to transmit one of the target channel and/or signal and the third channel and/or signal on the symbols. For example, the predefined priority may be that a priority of a PUSCH is lower than that of an SRS, and that a priority of a PUCCH is higher than that of the SRS. In this case, for example, if the target channel or signal or both are an SRS, and the third channel and/or signal is a PUSCH, the PUSCH is not mapped to a symbol of the SRS, and rate matching is performed. For another example, if the target channel and/or signal is a PUCCH, and the third channel and/or signal is an SRS, the SRS is not mapped to a symbol of the PUCCH. In addition, for example, it may be further defined that a priority of a symbol carrying uplink control information or carrying a DMRS on the PUSCH is higher than that of the SRS, or that a priority of a symbol of a front-loaded DMRS on the PUSCH is higher than that of the SRS, and that a priority of an additional DMRS on the PUSCH is lower than or higher than that of the SRS. For another example, it may be defined that a priority of a PUCCH carrying a CSI is lower than that of the SRS. For example, if the target channel and/or signal is a PUCCH, and the third channel and/or signal is an SRS, the PUCCH is not mapped to a symbol of the SRS. Optionally, a quantity of symbols, a format, a quantity of occupied frequency domain resources, or a quantity of occupied RBs of the PUCCH may be adjusted in a predefined manner, so that the PUCCH is not mapped to a symbol of the SRS and the UE can transmit the PUCCH.

Implementation method 2: The base station configures priority information. For example, the priority in the implementation method 1 may be configured by the base station, for example, configured by using RRC signaling or MAC CE signaling. The UE determines, based on the priority information configured by the base station and the method in the implementation method 1, mapping and/or rate matching between the target channel and/or signal and the third channel and/or signal.

Optionally, in the foregoing implementation method, frequency domain resources occupied by the target channel and/or signal may be different from or partially or completely overlap frequency domain resources occupied by the third channel and/or signal.

Optionally, in the foregoing implementation method, if some or all time-frequency resources of the target channel and/or signal are the same as those of the third channel and/or signal, the following processing methods are available.

Processing method 1: Determine a channel and/or signal of a high priority based on the priority in the foregoing implementation method. The UE maps the channel and/or signal of the high priority based on a configuration of the channel and/or signal of the high priority, and the UE does not transmit a channel and/or signal of a low priority.

Processing method 2: Determine a channel and/or signal of a high priority based on the priority in the foregoing implementation method. The UE maps the channel and/or signal of the high priority based on a configuration of the channel and/or signal of the high priority, and the UE transmits a channel and/or signal of a low priority on a time-frequency resource other than a time-frequency resource of the channel and/or signal of the high priority. Specifically, when the channel and/or signal of the low priority is a PUSCH, the PUSCH is mapped to a time-frequency resource that is used for transmitting the PUSCH and configured or scheduled by the base station, other than the time-frequency resource of the channel and/or signal of the high priority. When the channel and/or signal of the low priority is an SRS, on symbols in which some or all time-frequency resources of the target channel and/or signal are the same as those of the third channel and/or signal, the SRS is mapped to some or all resources in frequency domain resources that are different from the frequency domain resources of the channel and/or signal of the high priority in a configured SRS bandwidth. For example, specifically, it needs to be ensured that a bandwidth to which the SRS is mapped is an integer multiple of four RBs, and the frequency domain resources to which the SRS is mapped are consecutive. Further, the UE may determine a sequence of the SRS based on the frequency domain resources to which the SRS is mapped. When the channel and/or signal of the low priority is a PUCCH, the PUCCH is mapped to time-frequency resources other than the time-frequency resources of the channel and/or signal of the high priority, and the UE determines, based on the resources to which the PUCCH is mapped, at least one of a quantity of symbols, a format, and a bandwidth of the PUCCH, and uplink control information included in the PUCCH, and transmits the PUCCH.

Optionally, the processing method 1 and the processing method 2 may be further used when there is no first indication information, or when there is no transmitting beam.

In an extension of the present invention, the information transmission method may be further extended to a downlink direction. In this case, the UE determines the second resource based on the first resource and the first indication information, and determines a downlink receiving beam based on the beam corresponding to the second resource. For example, the method used in an uplink direction for determining a transmitting beam in this embodiment of the present invention may be used in the downlink direction to determine a receiving beam.

After the UE receives the first indication information transmitted by the base station, the UE may first determine, based on the correspondence included in the first indication information and the first resource included in the configured resource group, the second resource corresponding to the first resource, and then determine, based on the known correspondence between the second resource and the beam and the beam corresponding to the second resource, the downlink receiving beam for the target channel and/or signal.

For example, when the UE receives other information on the second resource and the corresponding beam, the correspondence between the second resource and the downlink receiving beam is known, and in this case, the downlink receiving beam corresponding to the second resource may be directly determined as the downlink receiving beam for the target channel and/or signal. When the UE transmits other information on the second resource and the corresponding beam, the correspondence between the second resource and the uplink transmitting beam is known, and in this case, the downlink receiving beam for the target channel and/or signal may be determined based on the uplink transmitting beam corresponding to the second resource by using the correspondence between the uplink and downlink beams. Optionally, the beam may also be a spatial filter, or a QCL relationship exists between the antenna port for the signal transmitted on the second resource and the antenna port for the target channel and/or signal.

Optionally, in the foregoing step and embodiment, if there is no corresponding first signaling indicating the correspondence between the first resource and the second resource, it is predefined that a correspondence exists between the first resource and a resource occupied for transmitting the target channel and/or signal before the first resource. For example, a beam or a spatial filter for receiving a target channel and/or signal at a previous time is used to transmit the target channel and/or signal at this time, or for example, a QCL relationship exists between the antenna port for the target channel and/or signal and an antenna port for transmitting a channel and/or signal at a previous time. Optionally, if there is no corresponding first signaling indicating the correspondence between the first resource and the second resource, it is predefined that the user equipment itself determines a receiving beam used for the target channel and/or signal, or a signal having a QCL relationship with the target channel and/or signal. Optionally, if there is no corresponding first signaling indicating the correspondence between the first resource and the second resource, and the target channel and/or signal is received for the first time, it is predefined that the user equipment itself determines a receiving beam used for the target channel and/or signal, or a signal having a QCL relationship with the target channel and/or signal.

Optionally, in the foregoing step or embodiment, if the UE receives or the base station transmits a third channel and/or signal on some or all of symbols occupied by the target channel and/or signal, the UE needs to determine whether a transmit or receiving beam for the third channel and/or signal is the same as that for the target channel and/or signal, where the beam may be a spatial filter, or the UE needs to determine whether a QCL relationship exists between an antenna port for the third channel and/or signal and the antenna port for the target channel and/or signal. Optionally, the method for indicating the target channel and/or signal in the present invention may be used to indicate the third channel and/or signal, for example, indicate a correspondence between the third channel and/or signal and a fourth resource, or indicate a correspondence between the third channel and/or signal and a beam or a spatial filter or whether a QCL relationship exists between the port for the third channel and/or signal and a port for a signal transmitted on a fourth resource. In this case, the UE may determine, based on whether the second resource is the same as the fourth resource, whether the receiving beam for the third channel and/or signal is the same as that for the target channel and/or signal, where the beam may be a spatial filter, or the UE needs to determine whether a QCL relationship exists between the antenna port for the third channel and/or signal and the antenna port for the target channel and/or signal.

In this case, the third channel and/or signal is a downlink channel and/or signal, and may be at least one of the following: a primary synchronization signal, a secondary synchronization signal, a synchronization signal block, a physical broadcast channel, a CSI-RS, a tracking reference signal (TRS), a phase tracking reference signal (PT-RS), a demodulation reference signal (DMRS), a physical downlink control channel, a physical downlink shared channel, and a control resource set CORESET.

Optionally, if the UE determines that the receiving beam for the third channel and/or signal is the same as that for the target channel and/or signal, or the UE needs to determine that a QCL relationship exists between the antenna port for the third channel and/or signal and the antenna port for the target channel and/or signal, the UE receives the target channel and/or signal and the third channel and/or signal. If the UE determines that the receiving beam for the third channel and/or signal is different from that for the target channel and/or signal, or the UE determines that no QCL relationship exists between the antenna port for the third channel and/or signal and the antenna port for the target channel and/or signal, the following implementation methods are available.

Implementation method 1: The UE determines, based on a predefined priority, that one of the target channel and/or signal and the third channel and/or signal is received on the symbols or mapped to the symbols. For example, the predefined priority may be that a priority of a PDSCH is lower than that of a CSI-RS, and that a priority of a PDCCH is higher than that of the CSI-RS. In this case, for example, if the target channel and/or signal is a CSI-RS, and the third channel and/or signal is a PDSCH, the PDSCH is not mapped to a symbol of the CSI-RS, and rate matching is performed. For another example, if the target channel and/or signal is a PDCCH, and the third channel and/or signal is a CSI-RS, the CSI-RS is not mapped to a symbol of the PDCCH. In addition, for example, it may be further defined that a priority of a symbol carrying a front-loaded DMRS on the PDSCH is higher than that of the CSI-RS, and that a priority of an additional DMRS on the PDSCH is lower than or higher than that of the SRS. For another example, if the target channel and/or signal is a CSI-RS, and the third channel and/or signal is a synchronization signal or a synchronization signal block, the CSI-RS is not mapped to the symbol.

Implementation method 2: The base station configures priority information. For example, the priority in the implementation method 1 may be configured by the base station, for example, configured by using RRC signaling or MAC CE signaling. The UE determines, based on the priority information configured by the base station and the method in the implementation method 1, mapping and/or rate matching between the target channel and/or signal and the third channel and/or signal.

Optionally, if the UE determines that the receiving beam for the third channel and/or signal is the same as that of a first part of antenna ports for the target channel and/or signal, or the UE needs to determine that a QCL relationship exists between the antenna port for the third channel and/or signal and a first part of antenna ports for the target channel and/or signal, the UE receives the target channel and/or signal on the first part of antenna ports and the third channel and/or signal. For example, when the target channel and/or signal is a PDSCH or a DMRS of a PDSCH, and the third channel and/or signal is a CSI-RS, the first part of antenna ports for the target channel and/or signal may be antenna ports in a DMRS group. If the UE determines that the receiving beam for the third channel and/or signal is different from that of a second part of antenna ports for the target channel and/or signal, or the UE determines that no QCL relationship exists between the antenna port for the third channel and/or signal and a second part of antenna ports for the target channel and/or signal, the following implementation methods are available.

Implementation method 1: The UE determines, based on a predefined priority, that one of the target channel and/or signal on the second part of antenna ports and the third channel and/or signal is received on the symbols or mapped to the symbols. For example, the predefined priority may be that the priority of the PDSCH is lower than that of the CSI-RS. In this case, for example, if the target channel and/or signal is the PDSCH or the DMRS of the PDSCH, and the third channel and/or signal is the CSI-RS, the PDSCH on the second part of antenna ports is not mapped to a symbol of the CSI-RS, and rate matching is performed.

Implementation method 2: The base station configures priority information. For example, the priority in the implementation method 1 may be configured by the base station, for example, configured by using RRC signaling or MAC CE signaling. The UE determines, based on the priority information configured by the base station and the method in the implementation method 1, mapping and/or rate matching between the target channel and/or signal on the second part of antenna ports and the third channel and/or signal.

Optionally, the base station configures an association between the antenna port for the third channel and/or signal and the antenna port for the target channel and/or signal, and the third channel and/or signal and the target channel and/or signal may be simultaneously transmitted on the associated ports. To be specific, if an association exists between an antenna port a for the third channel and/or signal and an antenna port b for the target channel and/or signal, regardless of whether a receiving beam of the antenna port a for the third channel and/or signal is the same as a receiving beam of the antenna port b for the target channel and/or signal, or whether a QCL relationship exists between the antenna port a for the third channel and/or signal and the antenna port b for the target channel and/or signal, the third channel and/or signal may be transmitted on the antenna port a and the target channel and/or signal may be transmitted on the antenna port b simultaneously.

Optionally, the association between the antenna port for the third signal and/or channel and the antenna port for the target channel and/or signal may also be reported by the user equipment.

Optionally, if the first indication information is used to indicate that a previously used $k^{th}$ receiving beam is used for the target channel and/or signal or that the first resource corresponds to a second resource indicated previously at a $k^{th}$ time, where k may be configured or predefined by the base station, for example, k=1 or k=2, the UE uses the previously used $k^{th}$ receiving beam, or determines an uplink transmitting beam or a receiving beam based on a correspondence between the first resource and the second resource indicated previously at the $k^{th}$ time, or determines, based on a correspondence between the first resource and the second resource indicated previously at the $k^{th}$ time, that a QCL relationship exists between the antenna port used for the target channel and/or signal and the antenna port used for the signal transmitted on the second resource. Specifically, the method for determining the transmitting beam or the receiving beam or the QCL relationship in this embodiment of the present invention may be used.

Optionally, if the first indication information is used to indicate that the receiving beam used for the target channel and/or signal is determined by the UE itself or that the antenna port having a QCL relationship with the antenna port used for the target channel and/or signal is not limited, the UE itself determines the receiving beam for the target channel and/or signal, or the antenna port having a QCL relationship with the antenna port used for the target channel and/or signal is not limited.

Optionally, in another implementation solution, in the foregoing step and embodiment, if there is no corresponding first signaling indicating the correspondence between the first resource and the second resource, it is predefined that a correspondence exists between the first resource and a resource occupied for transmitting a target channel and/or signal before the first resource. For example, a beam or a spatial filter for transmitting a target channel and/or signal at a previous time is used to transmit the target channel and/or signal at this time, or for example, a QCL relationship exists between the antenna port for the target channel and/or signal and an antenna port for transmitting a channel and/or signal at a previous time. Optionally, if there is no corresponding first signaling indicating the correspondence between the first resource and the second resource, it is predefined that the user equipment itself needs to determine a receiving beam used for the target channel and/or signal, or a signal having a QCL relationship with the target channel and/or signal. Optionally, if there is no corresponding first signaling indicating the correspondence between the first resource and the second resource, and the target channel and/or signal is transmitted for the first time, it is predefined that the user equipment itself needs to determine a receiving beam used for the target channel and/or signal, or a signal having a QCL relationship with the target channel and/or signal, or that a signal having a QCL relationship with the target channel and/or signal is not limited.

506. The UE transmits a target channel and/or signal on the first resource and on the uplink transmitting beam.

It should be noted that, detailed descriptions of step 501 to step 506 in this embodiment of the present invention are similar to detailed descriptions of step 401 to step 406 in another embodiment of the present invention. For the detailed descriptions of step 501 to step 506 in this embodiment of the present invention, refer to the detailed descriptions of step 401 to step 406 in another embodiment of the present invention. Details are not further described herein again.

In the information transmission method provided by this embodiment of the present invention, the base station configures the at least one first resource used to transmit the target channel and/or signal for the UE, and transmits the first indication information used to indicate the correspondence between the first resource and the second resource to the UE, so that the UE can determine, based on the first resource and the first indication information, a beam required for transmitting the target channel and/or signal. Therefore, when the target channel or signal or both are an SRS, the UE can transmit the SRS by using the determined beam required for transmitting the target channel and/or signal, so as to implement beamforming on the SRS.

FIG. 6 is a flowchart of another information transmission method according to an embodiment of the present invention. As shown in FIG. 6, the method may include the following steps.

601. A UE transmits capability indication information to a base station.

To enable the base station to configure a resource for the UE based on a beam capability of the UE, the UE may report its own beam capability to the base station. Specifically, the UE may report its own beam capability by transmitting the capability indication information to the base station.

For example, the UE may transmit the capability indication information to the base station by using a message 3 (Message 3) and/or uplink higher layer signaling.

The capability indication information includes a maximum quantity of beams supported by the UE in a capability type, or the capability indication information includes a quantized value of a maximum quantity of beams supported by the UE in a capability type. The capability type may include a beam management stage and/or an optional range of beams. In addition, the capability type may be predefined, or may be configured by the base station.

For example, when the capability type includes the beam management stage, the beam management stage may include a U-1 stage, a U-2 stage, and a U-3 stage. At the U-1 stage, the base station may measure different transmitting beams of the UE, so as to support selection of a transmitting beam of the UE or selection of a receiving beam of the base station. At the U-2 stage, the base station may measure its own different receiving beams (in this case, correspondingly, the UE may transmit signals on a same transmitting beam to the base station), so as to support possible receiving beam switching within the base station or between base stations. At the U-3 stage, the base station may measure its own different receiving beams (in this case, correspondingly, the UE may transmit signals on different transmitting beams to the base station), so that the UE can change its own transmitting beam in a beamforming scenario.

When the capability type includes the optional range of beams, the optional range of beams (referring to transmitting beams) may include 0 degrees to 360 degrees, 45 degrees to 135 degrees, or the like.

Figure 7:
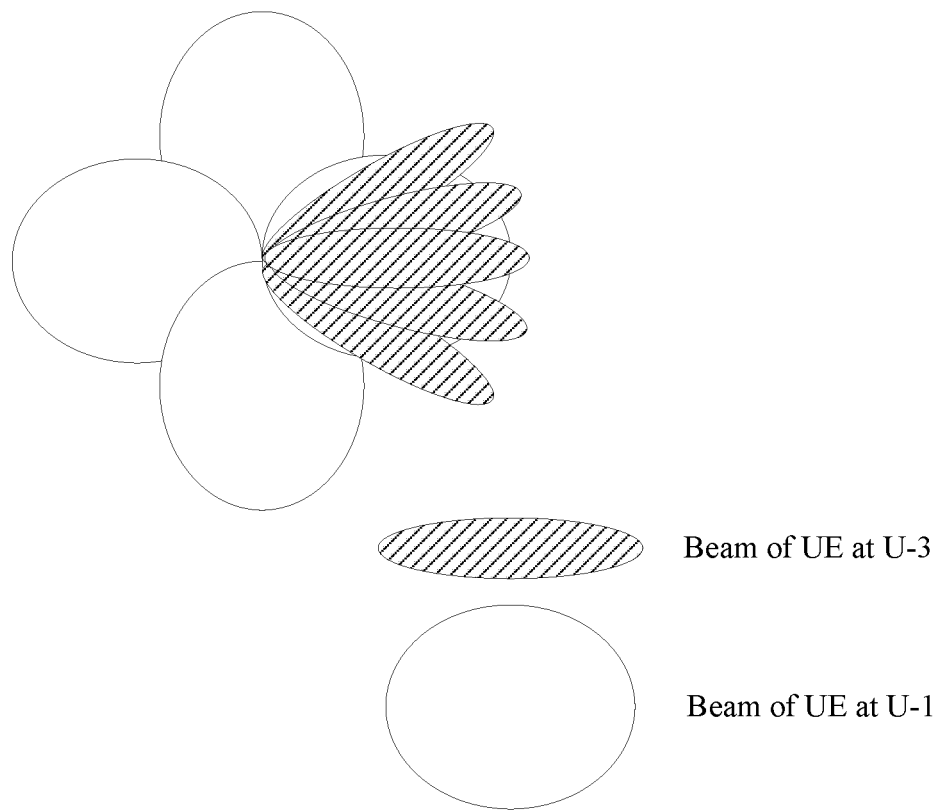
FIG. 7 is a schematic diagram for indicating a beam capability of a UE according to an embodiment of the present invention.

For example, when the capability type includes the beam management stage, and the maximum quantity of beams supported by the UE in the capability type is used in capability indication information reporting, as shown in FIG. 7, assuming that the maximum quantity of beams supported by the UE at the U-1 stage is 4 and the maximum quantity of beams supported by the UE at the U-3 stage is 5, the capability indication information transmitted by the UE to the base station may include: the maximum quantity of beams supported at the U-1 stage is 4, and the maximum quantity of beams supported at the U-3 stage is 5.

For another example, when the capability type includes the optional range of beams, and the quantized value of the maximum quantity of beams supported by the UE in the capability type is used in capability indication information reporting, assuming that the maximum quantity of beams supported by the UE at 0 degrees to 360 degrees is 16, the maximum quantity of beams supported by the UE at 45 degrees to 135 degrees is 4, the corresponding quantized value is 2 when the quantity of beams is greater than or equal to 8 and less than 16, and the corresponding quantized value is 1 when the quantity of beams is greater than or equal to 1 and less than 8, the capability indication information transmitted by the UE to the base station may include: the quantized value of the maximum quantity of beams supported at 0 degrees to 360 degrees is 2, and the quantized value of the maximum quantity of beams supported at 45 degrees to 135 degrees is 1.

602. The base station receives the capability indication information transmitted by the UE.

603. The base station configures a resource group for the UE based on the capability indication information.

The resource group may include at least one resource subgroup, the resource subgroup includes at least one first resource, and the first resource is used by the UE to transmit a target channel and/or signal.

In this embodiment of the present invention, the first resource may include at least one of the following: a time domain resource, a frequency domain resource, a code domain resource, and an antenna port. The target channel and/or signal include/includes at least one of the following: an SRS, a PRACH, a PUSCH, a PUCCH, an uplink tracking signal, an uplink discovery signal, an uplink beam reference signal, an uplink mobility reference signal, and an uplink demodulation reference signal.

After the base station receives the capability indication information transmitted by the UE, the base station may configure, based on the maximum quantity of beams supported by the UE in different capability types or the quantized value of the maximum quantity of beams supported, a resource group corresponding to a corresponding capability type for the UE. A principle is: a quantity of resource subgroups that may be obtained by dividing the resource group configured for the UE is less than or equal to the maximum quantity of beams of the UE in the corresponding capability type.

It should be noted that, detailed descriptions of step 603 are similar to detailed descriptions of step 401 in another embodiment of the present invention. For the detailed descriptions of step 603 in this embodiment of the present invention, refer to the detailed descriptions of step 401 in another embodiment of the present invention. Details are not further described herein in this embodiment of the present invention.

604. The base station transmits second indication information to the UE.

To implement division of the resource group, the base station may further transmit, to the UE, the second indication information that is used by the UE to divide the resource group into the at least one resource subgroup.

605. The UE obtains the resource group configured by the base station for the UE.

606. The UE receives the second indication information transmitted by the base station.

607. The UE divides the resource group into at least one resource subgroup based on the second indication information.

After the UE obtains the resource group configured by the base station, and receives the second indication information transmitted by the base station, the UE may divide the obtained resource group into the at least one resource subgroup in a grouping manner indicated by the second indication information.

608. The base station transmits first indication information to the UE, where the first indication information is used to indicate a correspondence between a first resource and a beam.

The beam may be an uplink transmitting beam, or may be a downlink receiving beam. In order that beamforming can be implemented when the UE transmits the target channel and/or signal, the base station indicates, to the UE by using the first indication information, a correspondence between each first resource in the resource group configured for the UE and a beam.

In specific implementation, the base station may indicate, to the UE, the correspondence between each first resource in the resource group configured for the UE and the beam in the following different manners.

Manner 1: The first indication information includes an identity of each first resource in the resource subgroup, and a number of a beam corresponding to the identity of each first resource.

A same identity may be used to denote first resources in different resource subgroups, and in this case, for all resource subgroups included in the resource group, the correspondence may be used to determine that the first resources correspond to a same beam.

Manner 2: The first indication information includes an identity of each resource subgroup, and a number of a beam corresponding to the identity of each resource subgroup. In other words, all first resources included in each resource subgroup correspond to a same beam. If the beam is a downlink transmitting beam or an uplink receiving beam, the user equipment transmits, on each resource subgroup, the target channel and/or signal by using an uplink transmitting beam paired with the downlink transmitting beam or the uplink receiving beam.

Manner 3: The first indication information includes an identity of each resource subgroup, and a number of each beam in a beam group corresponding to the identity of each resource subgroup, where the beam group includes at least one beam.

For example, the beam group may be a transmitting beam that is of the UE at the U-3 stage and included in a transmitting beam at the U-1 stage, or may be a beam group defined by the base station.

Manner 4: The first indication information includes an identity of each resource subgroup, and a number of a beam group corresponding to the identity of each resource subgroup.

In other words, in the manner 3 and the manner 4, each resource subgroup corresponds to a beam group. Certainly, numbers of beams in beam groups or numbers of beam groups corresponding to identities of a plurality of resource subgroups may be the same. In other words, a plurality of resource subgroups may correspond to one beam group.

Manner 5: The first indication information includes a number of each beam in a beam group.

Manner 6: The first indication information includes a number of a beam group.

In other words, in the manner 5 and the manner 6, all resource subgroups correspond to one beam group.

Because the resource group is divided into the at least one resource subgroup, and the correspondence between each first resource in the resource group and the beam is indicated in the manner 2 to the manner 6, signaling overheads of the first indication information can be reduced effectively.

Manner 7: The first indication information includes an identity of each resource subgroup, and an optional range of beams corresponding to the identity of each resource subgroup.

When the base station does not know the beam capability of the UE, the base station may indicate, to the UE, the correspondence between each first resource in the resource group configured for the UE and the beam in the manner 7, so that the UE itself can select a beam in a range, and more precise beam search can be implemented.

Manner 8: The first indication information includes an identity of each first resource, and a number of a beam corresponding to the identity of each first resource.

Manner 9: The first indication information includes an identity of each first resource, and a number of each beam in a beam group corresponding to the identity of each first resource, where the beam group includes at least one beam (different first resources may correspond to a same beam group).

Manner 10: The first indication information includes an identity of each first resource, and a number of a beam group corresponding to the identity of each first resource (identities of different first resources may correspond to a number of a same beam group).

In other words, in the manner 9 and the manner 10, each first resource corresponds to one beam group. Certainly, numbers of beams in beam groups or numbers of beam groups corresponding to identities of a plurality of first resources may be the same. In other words, a plurality of first resources may correspond to one beam group.

Manner 11: The first indication information includes an identity of each first resource, and an optional range of beams corresponding to the identity of each first resource. When the base station does not know the beam capability of the UE, the base station may indicate, to the UE in the manner 11, the correspondence between each first resource in the resource group configured for the UE and the beam.

Before the base station transmits the first indication information to the UE, the base station further needs to transmit configuration information used to indicate a correspondence between the beam and a number of the beam to the UE, where the number of the beam may be a sequence number of the beam selected by the base station.

609. The UE receives the first indication information transmitted by the base station.

610. The UE determines an uplink transmitting beam based on the first resource and the first indication information.

When the base station indicates, to the UE in the manner 1 in step 608, the correspondence between each first resource in the resource group configured for the UE and the beam, after the UE receives the first indication information, if a target channel and/or signal needs to be transmitted on a first resource, the UE may directly determine, based on the identity of each first resource in the resource subgroup and the number of the beam corresponding to the identity of each first resource included in the first indication information, a number of a beam corresponding to the first resource, and then determine an uplink transmitting beam based on the beam corresponding to the number of the beam.

When the base station indicates, to the UE in the manner 2 in step 608, the correspondence between each first resource in the resource group configured for the UE and the beam, after the UE receives the first indication information, if a target channel and/or signal needs to be transmitted on a first resource, the UE may first determine an identity of a resource subgroup to which the first resource belongs, then determine, based on the determined identity of the resource subgroup, the identity of each resource subgroup, and the number of the beam corresponding to the identity of each resource subgroup included in the first indication information, a number of a beam corresponding to the identity of the resource subgroup, and determine an uplink transmitting beam based on the beam corresponding to the number of the beam. If the beam is a downlink transmitting beam or an uplink receiving beam, the user equipment transmits, on each resource subgroup, the target channel and/or signal by using an uplink transmitting beam paired with the downlink transmitting beam or the uplink receiving beam.

When the base station indicates, to the UE in the manner 3 in step 608, the correspondence between each first resource in the resource group configured for the UE and the beam, after the UE receives the first indication information, if a target channel and/or signal needs to be transmitted on a first resource, the UE may first determine an identity of a resource subgroup to which the first resource belongs, then determine, based on the determined identity of the resource subgroup, the identity of each resource subgroup, and the number of the beam corresponding to the identity of each resource subgroup included in the first indication information, a number of each beam in a beam group corresponding to the identity of the resource subgroup, and determine an uplink transmitting beam based on a beam in the beam group.

When the base station indicates, to the UE in the manner 4, the correspondence between each first resource in the resource group configured for the UE and the beam, a specific process of determining an uplink transmitting beam by the UE based on the first resource and the first indication information is similar to the process of determining an uplink transmitting beam by the UE when the base station indicates the correspondence between the first resource and the beam to the UE in the manner 3. Details are not further described herein in this embodiment of the present invention.

When the base station indicates, to the UE in the manner 5 or the manner 6, the correspondence between each first resource in the resource group configured for the UE and the beam, after the UE receives the first indication information, if a target channel and/or signal needs to be transmitted on a first resource, the UE may determine an uplink transmitting beam based on a beam in a beam group. All first resources in a resource subgroup to which the first resource belongs correspond to one uplink transmitting beam.

When the base station indicates, to the UE in the manner 7, the correspondence between each first resource in the resource group configured for the UE and the beam, after the UE receives the first indication information, if a target channel and/or signal needs to be transmitted on a first resource, the UE may first determine an identity of a resource subgroup to which the first resource belongs, then determine, based on the determined identity of the resource subgroup, the identity of each resource subgroup, and the optional range of beams corresponding to the identity of each resource subgroup included in the first indication information, an optional range of beams corresponding to the identity of the resource subgroup, and determine an uplink transmitting beam based on the optional range of beams.

When the base station indicates, to the UE in the manner 8 in step 608, the correspondence between each first resource in the resource group configured for the UE and the beam, after the UE receives the first indication information, if a target channel and/or signal needs to be transmitted on a first resource, the UE may directly determine, based on the identity of the first resource and the number of the beam corresponding to the identity of each first resource included in the first indication information, a number of a beam corresponding to the first resource, and then determine an uplink transmitting beam based on the beam corresponding to the number of the beam.

When the base station indicates, to the UE in the manner 9 in step 608, the correspondence between each first resource in the resource group configured for the UE and the beam, after the UE receives the first indication information, if a target channel and/or signal needs to be transmitted on a first resource, the UE may directly determine, based on the identity of the first resource and the number of each beam in the beam group corresponding to the identity of each first resource included in the first indication information, a number of each beam in a beam group corresponding to the identity of the first resource, and determine an uplink transmitting beam based on a beam in the beam group.

When the base station indicates, to the UE in the manner 10 or the manner 11, the correspondence between each first resource in the resource group configured for the UE and the beam, a specific process of determining an uplink transmitting beam by the UE based on the first resource and the first indication information is similar to the process of determining an uplink transmitting beam by the UE when the base station indicates the correspondence between the first resource and the beam to the UE in the manner 9. Details are not further described herein in this embodiment of the present invention.

It should be noted that, detailed descriptions of step 610 are similar to detailed descriptions of step 405 in another embodiment of the present invention. For the detailed descriptions of step 610 in this embodiment of the present invention, refer to the detailed descriptions of step 405 in another embodiment. Details are not further described herein in this embodiment of the present invention.

611. The UE transmits a target channel and/or signal on the first resource and on the uplink transmitting beam.

After the UE determines the uplink transmitting beam, the UE may transmit the target channel and/or signal on the first resource and on the determined uplink transmitting beam, so as to implement beamforming on the target channel and/or signal.

In the information transmission method provided by this embodiment of the present invention, the base station configures the at least one first resource used to transmit the target channel and/or signal for the UE, and transmits the first indication information used to indicate the correspondence between the first resource and the beam to the UE, so that the UE can determine, based on the first resource and the first indication information, a beam required for transmitting the target channel and/or signal. Therefore, when the target channel or signal or both are an SRS, the UE can transmit the SRS by using the determined beam required for transmitting the target channel and/or signal, so as to implement beamforming on the SRS.

Figure 8:
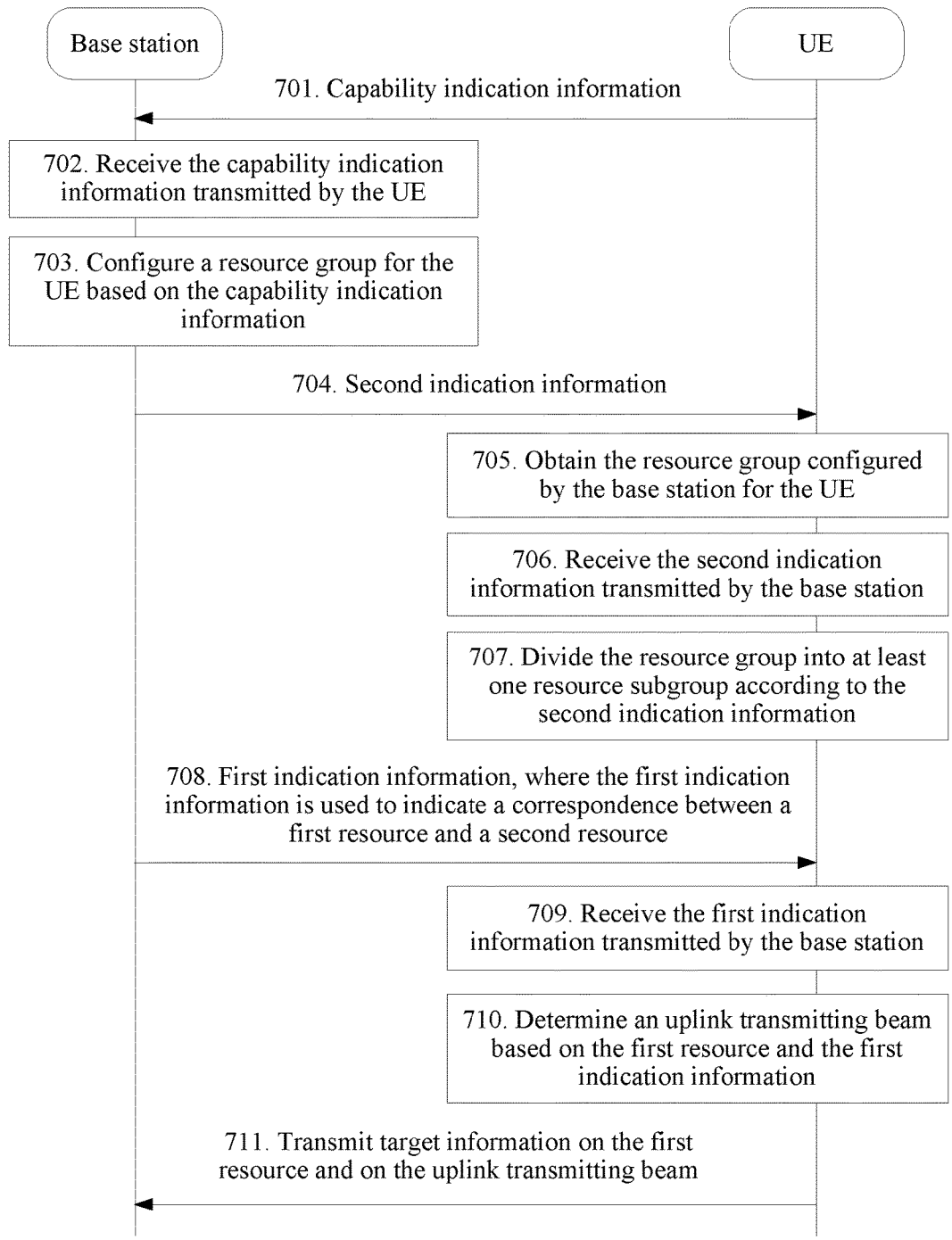
FIG. 8 is a flowchart of another information transmission method according to an embodiment of the present invention.

FIG. 8 is a flowchart of another information transmission method according to an embodiment of the present invention. As shown in FIG. 8, the method may include the following steps.

701. A UE transmits capability indication information to a base station.

702. The base station receives the capability indication information transmitted by the UE.

703. The base station configures a resource group for the UE based on the capability indication information.

704. The base station transmits second indication information to the UE.

705. The UE obtains the resource group configured by the base station for the UE.

706. The UE receives the second indication information transmitted by the base station.

707. The UE divides the resource group into at least one resource subgroup based on the second indication information.

708. The base station transmits first indication information to the UE, where the first indication information is used to indicate a correspondence between a first resource and a second resource.

In order that beamforming can be implemented when the UE transmits a target channel and/or signal, the base station indicates, to the UE by using the first indication information, a correspondence between each first resource in the resource group configured for the UE and a second resource. The second resource includes at least one of: a time domain resource, a frequency domain resource, a code domain resource, and an antenna port that are used by the UE to transmit information to the base station before the UE transmits the target channel and/or signal; or the second resource includes at least one of: a time domain resource, a frequency domain resource, a code domain resource, and an antenna port that are used by the base station to transmit information to the UE before the UE transmits the target channel and/or signal. In other words, the base station may transmit, to the UE, the correspondence between the first resource and the second resource that is known to be in a correspondence to a beam, so that the UE determines a beam required for beamforming.

In specific implementation, the base station may indicate, to the UE, a correspondence between each first resource in the resource group configured for the UE and a second resource in the following different manners.

Manner 1: The first indication information includes a correspondence between each first resource in the resource subgroup and the second resource.

The following manner may be used to indicate the correspondence between each first resource in the resource subgroup and the second resource: The first indication information specifically includes an identity of each first resource in the resource subgroup, and an identity of a second resource corresponding to the identity of each first resource; or the first indication information specifically includes information used to indicate that a QCL relationship exists between an antenna port for a signal on each first resource and an antenna port for a signal on a second resource.

In addition, further, on a basis of the manner 1, the first indication information further includes a correspondence between each first resource and an optional range of beams.

Manner 2: The first indication information includes a correspondence between each resource subgroup and the second resource.

The following manner may be used to indicate the correspondence between each resource subgroup and the second resource: The first indication information specifically includes an identity of each resource subgroup, and an identity of a second resource corresponding to the identity of each resource subgroup; or the first indication information specifically includes information used to indicate that a QCL relationship exists between an antenna port for a signal on each resource subgroup and an antenna port for a signal on a second resource.

Manner 3: The first indication information includes a correspondence between each resource subgroup and a second-resource group, where the second-resource group includes at least one second resource.

The following manner may be used to indicate the correspondence between each resource subgroup and the second-resource group: The first indication information specifically includes an identity of each resource subgroup, and an identity of each second resource in a second-resource group corresponding to the identity of each resource subgroup; or the first indication information specifically includes an identity of each resource subgroup, and an identity of a second-resource group corresponding to the identity of each resource subgroup.

Manner 4: The first indication information includes an identity of each second resource in a second-resource group.

Manner 5: The first indication information includes an identity of a second-resource group.

In addition, further, on a basis of the manner 2 to the manner 5, the first indication information further includes a correspondence between each resource subgroup and an optional range of beams.

Manner 6: The first indication information includes a correspondence between each first resource and the second resource.

The following manner may be used to indicate the correspondence between each first resource and the second resource: The first indication information specifically includes an identity of each first resource, and an identity of a second resource corresponding to the identity of each first resource; or the first indication information specifically includes information used to indicate that a QCL relationship exists between an antenna port for a signal on each first resource and an antenna port for a signal on a second resource.

Manner 7: The first indication information includes a correspondence between each first resource and a second-resource group, where the second-resource group includes at least one second resource.

The following manner may be used to indicate the correspondence between each first resource and the second-resource group: The first indication information specifically includes an identity of each first resource, and an identity of each second resource in a second-resource group corresponding to the identity of each first resource; or the first indication information specifically includes an identity of each first resource, and an identity of a second-resource group corresponding to the identity of each first resource; or the first indication information specifically includes information used to indicate that a QCL relationship exists between an antenna port for a signal on each first resource and an antenna port for a signal on a second-resource group.

Manner 8: The first indication information includes a correspondence between each first resource and an optional range of beams.

Optionally, the solution of the embodiment corresponding to FIG. 5 may also be used in this embodiment.

709. The UE receives the first indication information transmitted by the base station.

710. The UE determines the second resource based on the first resource and the first indication information, and determines an uplink transmitting beam corresponding to the second resource.

After the UE receives the first indication information transmitted by the base station, the UE may first determine, based on the correspondence included in the first indication information and the first resource included in the configured resource group, the second resource corresponding to the first resource, and then determine, based on the known correspondence between the second resource and the beam and the beam corresponding to the second resource, the uplink transmitting beam.

It should be noted that, in this embodiment of the present invention, the process of determining the second resource according to the first indication information in this embodiment of the present invention is similar to the process of determining a beam based on the first indication information in step 610 in another embodiment of the present invention. In this embodiment of the present invention, a specific process of determining the second resource based on the first indication information is not further described herein. For details, refer to the detailed descriptions of determining a beam based on the first indication information in step 610 in another embodiment of the present invention.

In addition, further, in the manner 1 in step 708, when the first indication information further includes the correspondence between each first resource and the optional range of beams, after the UE determines the second resource, the UE may use the beam corresponding to the second resource as a reference beam, and then determine an uplink transmitting beam in the optional range of beams based on the reference beam and the optional range of beams. Certainly, in the manner 2 to the manner 5 in step 708, when the first indication information further includes the correspondence between each resource subgroup and the optional range of beams, after the UE determines the second resource, the UE may also use the beam corresponding to the second resource as a reference beam, and then determine an uplink transmitting beam in the optional range of beams based on the reference beam and the optional range of beams.

It should be noted that, detailed descriptions of step 710 are similar to detailed descriptions of step 505 in another embodiment of the present invention. For the detailed descriptions of step 710 in this embodiment of the present invention, refer to the detailed descriptions of step 505 in another embodiment. Details are not further described herein in this embodiment of the present invention.

711. The UE transmits a target channel and/or signal on the first resource and on the uplink transmitting beam.

In the information transmission method provided by this embodiment of the present invention, the base station configures the at least one first resource used to transmit the target channel and/or signal for the UE, and transmits the first indication information used to indicate the correspondence between the first resource and the second resource to the UE, so that the UE can determine, based on the first resource and the first indication information, a beam required for transmitting the target channel and/or signal. Therefore, when the target channel or signal or both are an SRS, the UE can transmit the SRS by using the determined beam required for transmitting the target channel and/or signal, so as to implement beamforming on the SRS.

It should be noted that, the indication method in the embodiment corresponding to FIG. 5 may also be applied to the foregoing embodiment.

Figure 9:
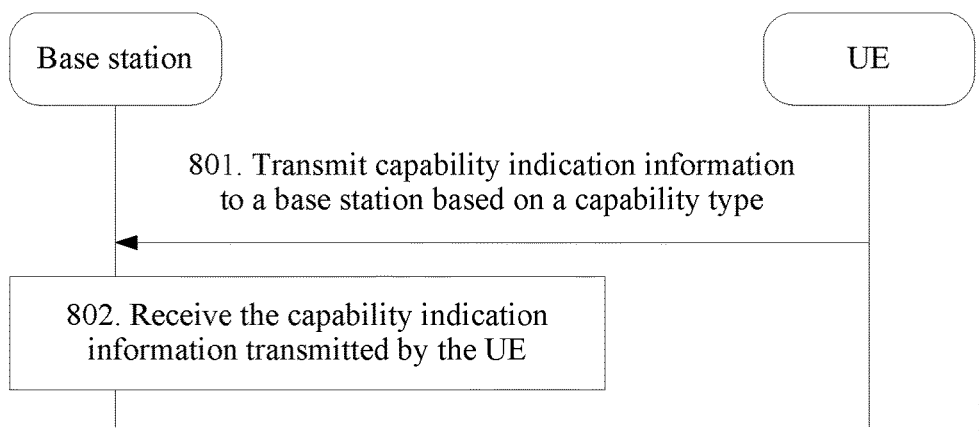
FIG. 9 is a flowchart of a capability reporting method according to an embodiment of the present invention.

FIG. 9 is a flowchart of a capability reporting method according to an embodiment of the present invention. As shown in FIG. 9, the method may include the following steps.

801. A UE transmits capability indication information to a base station based on a capability type.

The capability indication information includes a maximum quantity of beams supported by the UE in the capability type, or the capability indication information includes a quantized value of a maximum quantity of beams supported by the UE in the capability type.

It should be noted that, detailed descriptions of step 801 are similar to detailed descriptions of step 601 in another embodiment of the present invention. For the detailed descriptions of step 801, refer to the detailed descriptions of step 601 in another embodiment of the present invention. Details are not further described herein in this embodiment of the present invention.

802. The base station receives the capability indication information transmitted by the UE.

In the capability reporting method provided by this embodiment of the present invention, the UE transmits, to the base station based on the capability type, the capability indication information including the maximum quantity of beams supported by the UE in the capability type or the quantized value of the maximum quantity of beams supported by the UE in the capability type, so that after the base station receives the capability indication information transmitted by the UE, the base station can allocate a first resource to the UE based on the capability indication information of the UE. This avoids resource waste caused by allocation of excessive resources to the UE, or a problem of incomplete beam search caused by allocation of insufficient first resources to the UE.

Figure 10:
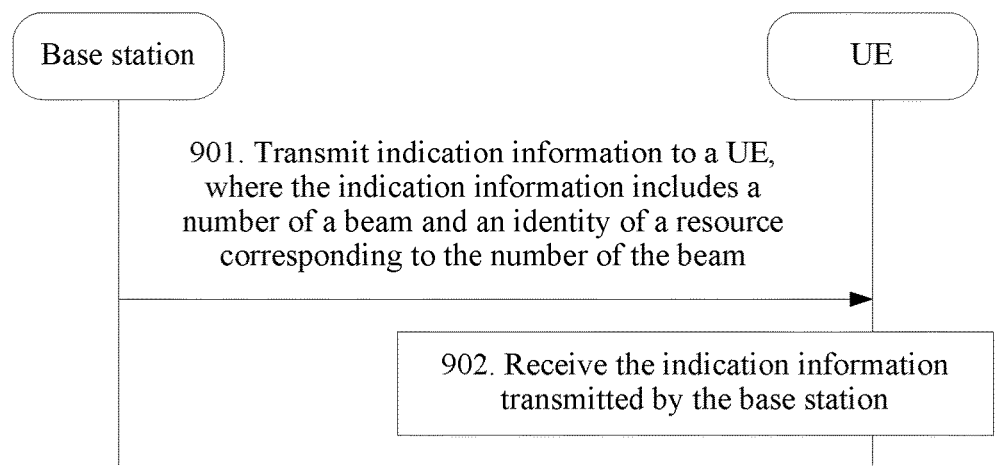
FIG. 10 is a flowchart of a resource indication method according to an embodiment of the present invention.

FIG. 10 is a flowchart of a resource indication method according to an embodiment of the present invention. As shown in FIG. 10, the method may include the following steps.

901. A base station transmits indication information to a UE, where the indication information includes a number of a beam and an identity of a resource corresponding to the number of the beam, or a number of a resource and an identity of the resource corresponding to the number of the resource.

The beam may be a port, or may be precoding. The resource may include at least one of the following: a time domain resource, a frequency domain resource, a code domain resource, and an antenna port. The beam may be a downlink receiving beam, or a downlink transmitting beam, or (a pair of) a downlink receiving beam and a downlink transmitting beam, or an uplink transmitting beam, or an uplink receiving beam, or a pair of an uplink transmitting beam and an uplink receiving beam, or a pair of a downlink receiving beam and an uplink transmitting beam.

Figure 11:
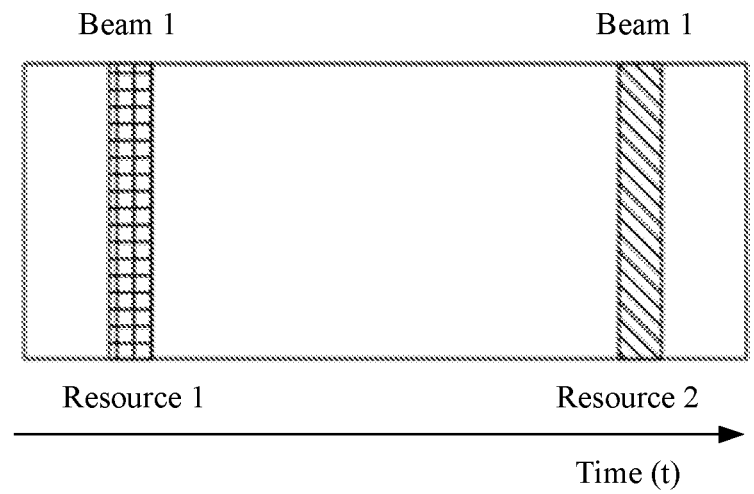
FIG. 11 is a schematic diagram of a correspondence between resources and beams according to an embodiment of the present invention.

As shown in FIG. 11, different resources may correspond to a same beam. When the base station indicates, to the UE, that a beam 1 (1 is a number of the beam) corresponds to a resource 1, the UE may determine that the beam 1 is a beam corresponding to the resource 1. After the base station indicates, to the UE, that the beam 1 corresponds to the resource 1, if the base station indicates, to the UE, that the beam 1 corresponds to a resource 2, after the UE receives the indication transmitted by the base station and indicating that the beam 1 corresponds to the resource 2, the UE may determine that the beam 1 is a beam corresponding to the resource 2. In addition, in a period of time between transmitting the two indications by the base station, the UE always determines that the beam 1 is a beam corresponding to the resource 1, until the indication indicating that the beam 1 corresponds to the resource 2 is received.

902. The UE receives the indication information transmitted by the base station.

In the resource indication method provided by this embodiment of the present invention, the base station transmits, to the UE, the indication information including the number of the beam and the identity of the resource corresponding to the number of the beam, or the base station transmits, to the UE, the indication information including the number of the resource and the identity of the resource corresponding to the number of the resource, so that the UE determines, based on the indication information, a beam or a candidate set of beams required for transmitting information, and transmits the information by using the determined beam, so as to implement beamforming. The base station may number only some resource identities, so as to reduce signaling overheads when the base station indicates the number of the beam or the number of the resource.

The solutions provided by the embodiments of the present invention are described above mainly from a perspective of interaction between network elements. It may be understood that, to implement the foregoing functions, each network element, for example, the base station or the UE, includes corresponding hardware structures and/or software modules for performing the functions. A person skilled in the art should be easily aware that, algorithm steps in the examples described with reference to the embodiments disclosed in the specification can be implemented by hardware or a combination of hardware and computer software in the present invention. Whether a function is performed by hardware or hardware driven by computer software depends on particular applications and design constraint conditions of the technical solutions. A person skilled in the art may use different methods to implement the described functions for each particular application, but it should not be considered that the implementation goes beyond the scope of the present invention.

In the embodiments of the present invention, functional modules in the base station and the UE may be defined according to the foregoing method examples. For example, each functional module may be defined in a correspondence to each function, or two or more functions may be integrated in one processing module. The integrated module may be implemented in a form of hardware, or may be implemented in a form of a software functional module. It should be noted that, division of modules in the embodiments of the present invention is merely an example, and is only division of logical functions. Other division manners may be available in actual implementation.

Figure 12:
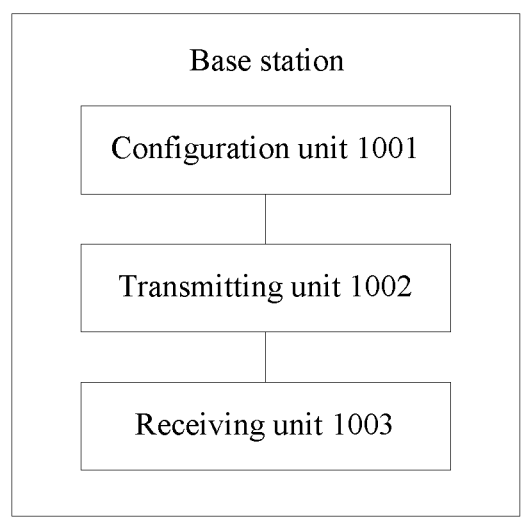
FIG. 12 is a schematic structural diagram of another base station according to an embodiment of the present invention.

When each functional module is defined in a correspondence to each function, FIG. 12 is a possible schematic structural diagram of a base station in the foregoing embodiment. As shown in FIG. 12, the base station may include a configuration unit 1001, a transmitting unit 1002, and a receiving unit 1003.

The configuration unit 1001 is configured to support the base station in performing step 401 in the information transmission method shown in FIG. 4, step 501 in the information transmission method shown in FIG. 5, step 603 in the information transmission method shown in FIG. 6, and step 703 in the information transmission method shown in FIG. 8.

The transmitting unit 1002 is configured to support the base station in performing step 403 in the information transmission method shown in FIG. 4, step 503 in the information transmission method shown in FIG. 5, step 604 and step 608 in the information transmission method shown in FIG. 6, step 704 and step 708 in the information transmission method shown in FIG. 8, and step 901 in the resource indication method shown in FIG. 10.

The receiving unit 1003 is configured to support the base station in performing step 602 in the information transmission method shown in FIG. 6, step 702 in the information transmission method shown in FIG. 8, and step 802 in the capability reporting method shown in FIG. 9.

It should be noted that, all related content of steps in the foregoing method embodiments may be cited in function descriptions of corresponding functional modules. Details are not further described herein.

The base station provided by this embodiment of the present invention is configured to perform the foregoing information transmission method, so as to achieve a same effect as the foregoing information transmission method; or is configured to perform the foregoing resource indication method, so as to achieve a same effect as the foregoing resource indication method; or is configured to perform the foregoing capability reporting method, so as to achieve a same effect as the foregoing capability reporting method.

Figure 13:
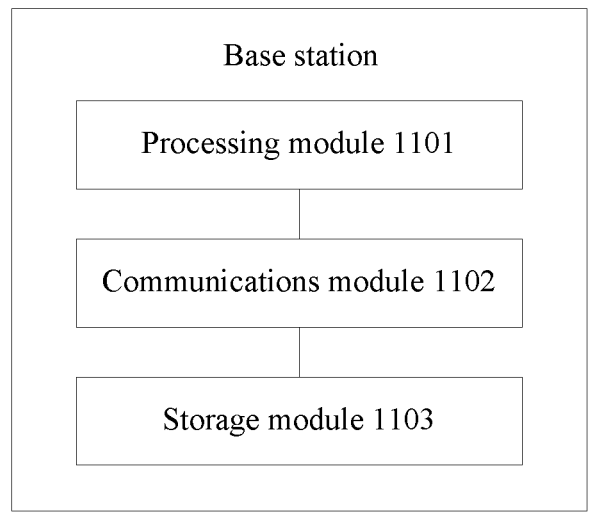
FIG. 13 is a schematic structural diagram of another base station according to an embodiment of the present invention.

When an integrated module is used, FIG. 13 is another possible schematic structural diagram of a base station in the foregoing embodiment. As shown in FIG. 13, the base station includes a processing module 1101 and a communications module 1102.

The processing module 1101 is configured to control and manage actions of the base station. For example, the processing module 1101 is configured to support the base station in performing step 401 in the information transmission method shown in FIG. 4, step 501 in the information transmission method shown in FIG. 5, step 603 in the information transmission method shown in FIG. 6, and step 703 in the information transmission method shown in FIG. 8, and/or used in other processes of the technology described in the specification. The communications module 1102 is configured to support communication between the base station and another network entity, for example, communication with a functional module or a network entity shown in FIG. 1, FIG. 3, FIG. 14, or FIG. 15. For example, the communications module 1102 is configured to support the base station in performing step 403 in the information transmission method shown in FIG. 4, step 503 in the information transmission method shown in FIG. 5, step 602, step 604, and step 608 in the information transmission method shown in FIG. 6, step 704 and step 708 in the information transmission method shown in FIG. 8, step 802 in the capability reporting method shown in FIG. 9, and step 901 in the resource indication method shown in FIG. 10. The base station may further include a storage module 1103, configured to store program code and data of the base station.

The processing module 1101 may be a processor or a controller. The processing module 1101 may implement or execute various illustrative logical blocks, modules, and circuits described in the disclosure of the present invention. The processor may also be a combination for implementing a computing function, for example, a combination including one or more microprocessors, a combination of a DSP and a microprocessor, or the like. The communications module 1102 may be a transceiver, a transceiver circuit, a communications interface, or the like. The storage module 1103 may be a memory.

When the processing module 1101 is a processor, the communications module 1102 is a transceiver, and the storage module 1103 is a memory, the base station in this embodiment of the present invention may be the base station shown in FIG. 2.

Figure 14:
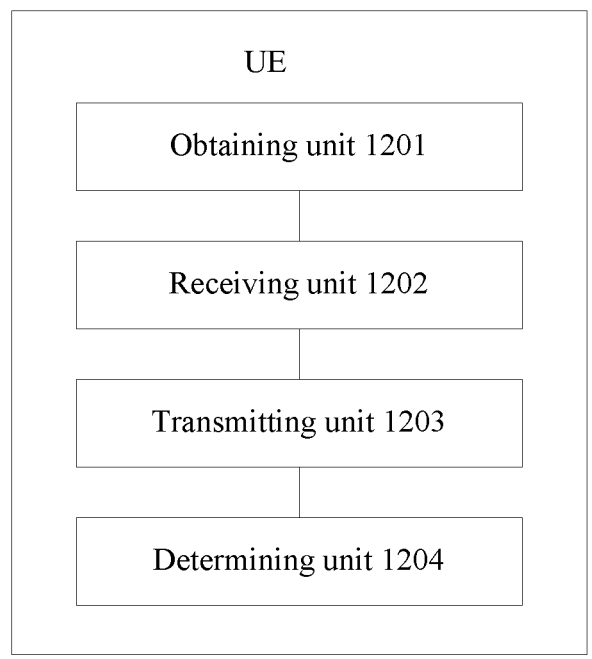
FIG. 14 is a schematic structural diagram of another UE according to an embodiment of the present invention.

When each functional module is defined in a correspondence to each function, FIG. 14 is a possible schematic structural diagram of the UE in the foregoing embodiment.

As shown in FIG. 14, the UE may include an obtaining unit 1201, a receiving unit 1202, a transmitting unit 1203, and a determining unit 1204.

The obtaining unit 1201 is configured to support the UE in performing step 402 in the information transmission method shown in FIG. 4, step 502 in the information transmission method shown in FIG. 5, step 605 in the information transmission method shown in FIG. 6, and step 705 in the information transmission method shown in FIG. 8.

The receiving unit 1202 is configured to support the UE in performing step 404 in the information transmission method shown in FIG. 4, step 504 in the information transmission method shown in FIG. 5, step 606 and step 609 in the information transmission method shown in FIG. 6, step 706 and step 709 in the information transmission method shown in FIG. 8, and step 902 in the resource indication method shown in FIG. 10.

The transmitting unit 1203 is configured to support the UE in performing step 406 in the information transmission method shown in FIG. 4, step 506 in the information transmission method shown in FIG. 5, step 601 and step 611 in the information transmission method shown in FIG. 6, step 701 and step 711 in the information transmission method shown in FIG. 8, and step 801 in the capability reporting method shown in FIG. 9.

The determining unit 1204 is configured to support the UE in performing step 405 in the information transmission method shown in FIG. 4, step 505 in the information transmission method shown in FIG. 5, step 607 and step 610 in the information transmission method shown in FIG. 6, and step 707 and step 710 in the information transmission method shown in FIG. 8.

It should be noted that, all related content of steps in the foregoing method embodiments may be cited in function descriptions of corresponding functional modules. Details are not further described herein.

The UE provided by this embodiment of the present invention is configured to perform the foregoing information transmission method, so as to achieve a same effect as the foregoing information transmission method; or is configured to perform the foregoing resource indication method, so as to achieve a same effect as the foregoing resource indication method; or is configured to perform the foregoing capability reporting method, so as to achieve a same effect as the foregoing capability reporting method.

Figure 15:
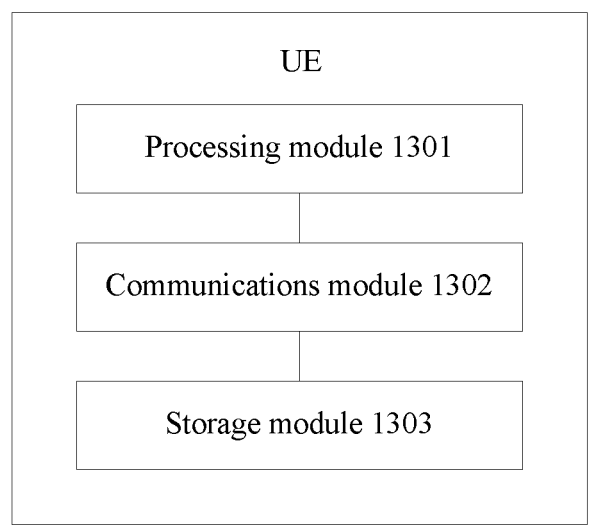
FIG. 15 is a schematic structural diagram of another UE according to an embodiment of the present invention.

When an integrated unit is used, FIG. 15 is another possible schematic structural diagram of the UE in the foregoing embodiment. As shown in FIG. 15, the UE includes a processing module 1301 and a communications module 1302.

The processing module 1301 is configured to control and manage actions of the UE, for example, configured to perform step 402 and step 405 in the information transmission method shown in FIG. 4, step 502 and step 505 in the information transmission method shown in FIG. 5, step 605, step 607, and step 610 in the information transmission method shown in FIG. 6, and step 705, step 707, and step 710 in the information transmission method shown in FIG. 8. The communications module 1302 is configured to support communication between the UE and another network entity, for example, communication with a functional module or a network entity shown in FIG. 1, FIG. 2, FIG. 12, or FIG. 13. For example, the communications module 1302 supports the UE in performing step 404 and step 406 in the information transmission method shown in FIG. 4, step 504 and step 506 in the information transmission method shown in FIG. 5, step 601, step 606, step 609, and step 611 in the information transmission method shown in FIG. 6, step 701, step 706, step 709, and step 711 in the information transmission method shown in FIG. 8, step 801 in the capability reporting method shown in FIG. 9, and step 902 in the resource indication method shown in FIG. 10. The UE may further include a storage module 1303, configured to store program code and data of the UE.

The processing module 1301 may be a processor or a controller. The processing module 1301 may implement or execute various illustrative logical blocks, modules, and circuits described in the disclosure of the present invention. The processor may also be a combination for implementing a computing function, for example, a combination including one or more microprocessors, a combination of a DSP and a microprocessor, or the like. The communications module 1302 may be a transceiver, a transceiver circuit, a communications interface, or the like. The storage module 1303 may be a memory.

When the processing module 1301 is a processor, the communications module 1302 is a transceiver, and the storage module 1303 is a memory, the UE in this embodiment of the present invention may be the UE shown in FIG. 3.

The foregoing descriptions about implementations allow a person skilled in the art to understand that, for the purpose of convenient and brief description, division of the foregoing functional modules is taken as an example for illustration. In actual application, the foregoing functions can be allocated to different modules and implemented according to a requirement, that is, an inner structure of an apparatus is divided into different functional modules to implement all or part of the functions described above.

In the several embodiments provided in this application, it should be understood that the disclosed apparatus and method may be implemented in other manners. For example, the described apparatus embodiment is merely an example. For example, the module or unit division is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions in the embodiments of the present invention essentially, or the part contributing to the prior art, or all or some of the technical solutions may be implemented in the form of a software product. The software product is stored in a storage medium and includes several instructions for instructing a device (which may be a single-chip microcomputer, a chip or the like) or a processor to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, an optical disc, or the like.

The descriptions are only specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An information transmission method, comprising:
   configuring, by a base station, a first resource for a user equipment (UE), the first resource being configured to be used by the UE to transmit a first signal comprising a sounding reference signal (SRS); and
   transmitting, by the base station, first indication information to the UE;
   the first indication information indicating a correspondence between the first resource and a second resource, the second resource being configured to be used by the UE to transmit a second signal to the base station before the transmission of the first signal, the correspondence being used by the UE to determine a first beam for transmitting the first signal, and the first beam for transmitting the first signal being the same as a second beam for transmitting the second signal.

2. The method according to claim 1, wherein the first resource is comprised in a resource group.

3. The method according to claim 1, wherein the first resource comprises at least one of a time domain resource, a frequency domain resource, a code domain resource, or an antenna port.

4. The method according to claim 2, wherein the first indication information comprises a correspondence between each resource in the resource group and the second resource.

5. The method according to claim 4, wherein the first indication information comprises an identity of each resource in the resource group and an identity of the second resource.

6. An information transmission method, comprising:
   obtaining, by a user equipment (UE), a first resource configured by a base station for the UE, the first resource being configured to be used by the UE to transmit a first signal comprising a sounding reference signal (SRS); and
   receiving, by the UE, first indication information transmitted by the base station;
   the first indication information indicating a correspondence between the first resource and a second resource, the second resource being configured to be used by the UE to transmit a second signal to the base station before the transmission of the first signal, the correspondence being used by the UE to determine a first beam for transmitting the first signal, and the first beam for transmitting the first signal being the same as a second beam for transmitting the second signal.

7. The method according to claim 6, wherein the first resource is comprised in a resource group.

8. The method according to claim 6, wherein the first resource comprises at least one of a time domain resource, a frequency domain resource, a code domain resource, or an antenna port.

9. The method according to claim 7, wherein the first indication information comprises a correspondence between each resource in the resource group and the second resource.

10. The method according to claim 9, wherein the first indication information comprises an identity of each resource in the resource group and an identity of the second resource.

11. A base station, comprising:
    a processor;
    a memory coupled to the processor, the memory comprising instructions that, when executed by the processor, cause the base station to:
       configure a first resource for a user equipment (UE), the first resource being configured to be used by the UE to transmit a first signal comprising a sounding reference signal (SRS); and
       transmit first indication information to the UE;
       the first indication information indicating a correspondence between the first resource and a second resource, the second resource being configured to be used by the UE to transmit a second signal to the base station before the transmission of the first signal, the correspondence being used by the UE to determine a first beam for transmitting the first signal, and the first beam for transmitting the first signal being the same as a second beam for transmitting the second signal.

12. The method according to claim 11, wherein the first resource is comprised in a resource group.

13. The method according to claim 11, wherein the first resource comprises at least one of a time domain resource, a frequency domain resource, a code domain resource, or an antenna port.

14. The method according to claim 12, wherein the first indication information comprises a correspondence between each resource in the resource group and the second resource.

15. The method according to claim 14, wherein the first indication information comprises an identity of each resource in the resource group and an identity of the second resource.

16. A user equipment (UE), comprising:
    a processor;
    a memory coupled to the processor, the memory comprising instructions that, when executed by the processor, cause the UE to:
       obtain a first resource configured by a base station for the UE, the first resource being configured to be used by the UE to transmit a first signal comprising a sounding reference signal (SRS); and
       receive first indication information transmitted by the base station;
       the first indication information indicating a correspondence between the first resource and a second resource, the second resource being configured to be used by the UE to transmit a second signal to the base station before the transmission of the first signal, the correspondence being used by the UE to determine a first beam for transmitting the first signal, and the first beam for transmitting the first signal being the same as a second beam for transmitting the second signal.

17. The method according to claim 16, wherein the first resource is comprised in a resource group.

18. The method according to claim 16, wherein the first resource comprises at least one of a time domain resource, a frequency domain resource, a code domain resource, or an antenna port.

19. The method according to claim 17, wherein the first indication information comprises a correspondence between each resource in the resource group and the second resource.

20. The method according to claim 19, wherein the first indication information comprises an identity of each resource in the resource group and an identity of the second resource.

\* \* \* \* \*

UNITED STATES PATENT AND TRADEMARK OFFICE
CERTIFICATE OF CORRECTION

PATENT NO. : 10,498,511 B2  
APPLICATION NO. : 16/289121  
DATED : December 3, 2019  
INVENTOR(S) : Yi Qin et al.

Page 1 of 1

It is certified that error appears in the above-identified patent and that said Letters Patent is hereby corrected as shown below:

In the Claims

Column 84, Lines 32, 34, 38 and 41, for the preambles of Claims 12 to 15, "method" should be changed to --base station--.

Column 84, Line 66, for the preamble of Claim 17, "method" should be changed to --user equipment--.

Column 85, Lines 1, 5 and 8, for the preambles of Claims 18 to 20, "method" should be changed to --user equipment--.

Signed and Sealed this  
Eighteenth Day of August, 2020

Andrei Iancu  
*Director of the United States Patent and Trademark Office*